(12) United States Patent
Keeley et al.

(10) Patent No.: US 7,512,581 B2
(45) Date of Patent: **\*Mar. 31, 2009**

(54) ELECTRONIC CIRCUIT IMPLEMENTING KNOWLEDGE ENHANCED ELECTRONIC LOGIC SOLUTIONS

(76) Inventors: Thomas M. Keeley, 1040 Thornridge Ct., Brookfield, WI (US) 53045; Helena G. Keeley, 1040 Thornridge Ct., Brookfield, WI (US) 53045

( \* ) Notice: Subject to any disclaimer, the term of this patent is extended or adjusted under 35 U.S.C. 154(b) by 846 days.

This patent is subject to a terminal disclaimer.

(21) Appl. No.: 10/960,626

(22) Filed: Oct. 7, 2004

(65) Prior Publication Data

US 2006/0112046 A1 May 25, 2006

Related U.S. Application Data

(60) Provisional application No. 60/509,924, filed on Oct. 9, 2003.

(51) Int. Cl.
*G06F 17/00* (2006.01)

(52) U.S. Cl. .................. 706/53; 345/440; 345/637; 717/109

(58) Field of Classification Search .................. 706/53
See application file for complete search history.

(56) References Cited

U.S. PATENT DOCUMENTS

| | | | |
|---|---|---|---|
| 5,499,319 A | 3/1996 | Sultan et al. | |
| 5,631,974 A | 5/1997 | Lau-Kee et al. | |
| 5,649,192 A | 7/1997 | Stucky | |
| 5,675,820 A | 10/1997 | Jurovics et al. | |
| 5,701,400 A | 12/1997 | Amado | |
| 5,732,397 A | 3/1998 | DeTore et al. | |
| 5,737,539 A | 4/1998 | Edelson et al. | |
| 5,751,915 A | 5/1998 | Werbos | |

(Continued)

FOREIGN PATENT DOCUMENTS

WO    WO 99/44162    9/1999

OTHER PUBLICATIONS

Constantin Von Altrock, Fuzzy Logic & NeuroFuzzy Applications Explained, 1995, pp. 29-40, 97-105, 126, 137, 143, 182 and 206, Prentice Hall PTR.

(Continued)

*Primary Examiner*—David R Vincent
*Assistant Examiner*—Mai T Tran
(74) *Attorney, Agent, or Firm*—Boyle Fredrickson, S.C.

(57) ABSTRACT

An electronic circuit for use in providing computational decision-making capabilities. The circuit implements a hierarchy of decision-making cells, with outputs derived from input signals supplying argument values, configuration signals for controlling the decision making model and wires between cells defining relationships between cells that modify the decision-making model of dependent cells. The cells are primarily characterized by modified values that may represent outputs although they may have a variety of other function features such as importance values and threshold values. The arguments are characterized by argument values that may represent inputs. The arguments are associated with particular cells and the values of the arguments associated with a given cell are combined to determine the value of that cell. The wires between different cells define different types of functional relationships between them. Circuits are developed through the creation and manipulation of the graphical items of the interface using visually oriented processes such as drop down windows and drag and drop techniques.

10 Claims, 40 Drawing Sheets

U.S. PATENT DOCUMENTS

| | | | |
|---|---|---|---|
| 5,818,975 | A | 10/1998 | Goodwin et al. |
| 5,884,273 | A | 3/1999 | Sattizahn et al. |
| 5,920,877 | A | 7/1999 | Kolster |
| 5,990,888 | A | 11/1999 | Blades et al. |
| 5,999,923 | A | 12/1999 | Kowalski et al. |
| 6,018,346 | A | 1/2000 | Moran et al. |
| 6,023,692 | A | 2/2000 | Nichols |
| 6,067,719 | A | 5/2000 | Forman |
| 6,078,924 | A | 6/2000 | Ainsbury et al. |
| 6,088,689 | A | 7/2000 | Kohn et al. |
| 6,098,062 | A | 8/2000 | Janssen |
| 6,154,757 | A | 11/2000 | Krause et al. |
| 6,195,643 | B1 | 2/2001 | Maxwell |
| 6,198,839 | B1 | 3/2001 | Kuan et al. |
| 6,256,032 | B1 | 7/2001 | Hugh |
| 6,283,761 | B1 | 9/2001 | Joao |
| 6,394,263 | B1 | 5/2002 | McCrory |
| 6,426,761 | B1 | 7/2002 | Kanevsky et al. |
| 6,502,114 | B1 | 12/2002 | Forcier |
| 6,539,374 | B2 | 3/2003 | Jung |
| 6,544,294 | B1 | 4/2003 | Greenfield et al. |
| 6,671,693 | B1 | 12/2003 | Marpe et al. |
| 6,684,385 | B1 | 1/2004 | Bailey et al. |
| 6,760,039 | B2 | 7/2004 | Keeley |
| 6,782,374 | B2 | 8/2004 | Nichols |
| 6,833,842 | B2 | 12/2004 | Keeley |
| 2002/0059272 | A1 | 5/2002 | Porter |
| 2003/0083760 | A1* | 5/2003 | Keeley ......................... 700/86 |

OTHER PUBLICATIONS

Expert Choice 2000 Product Brief, "The Software and Methodology that Has Changed How Decisions are Made," www.expertchoice.com/productbrief/, Sep. 12, 2002.

How Does Fuzzy Logic Work?, http://www.aptronix.com/fide/howfuzzy.htm, Sep. 11, 2002.

* cited by examiner

ELECTRONIC CIRCUIT IMPLEMENTING KNOWLEDGE ENHANCED ELECTRONIC LOGIC SOLUTIONS

CROSS-REFERENCE TO RELATED APPLICATIONS

This patent application is based on provisional filings 60/509,924 entitled "Application of KEEL Technology" and filed on Oct. 9, 2003 and claims the benefit thereof.

BACKGROUND OF THE INVENTION

The present invention relates to an electronic circuit and more particularly to an electronic circuit that implements the logic for computational decision making which simulates human decision making.

Formal processes that describe human decision-making have been discussed for many years. As early as 1738, Daniel Bernouilli announced the concept of decision theory in an attempt to explain the non-linear value of money. Both knowledge capture and decision-making have long been addressed from the standpoint of academic research. Dr. Horst Rittel and Dr. Melvin Webber, in their paper titled "Dilemmas in a general Theory of Planning", identified the difference between "tame" problems (those where a formula can be used to calculate an answer) and "wicked" problems (where the answer lies in the gray area, somewhere between good and bad). They focused their work on city planning activities and created the "Issues Based Information System" (IBIS) process in order to decompose a problem by structuring the information in the form of a decision tree including decisions and arguments. Researchers working on the decision-making processes determined long ago that problems are best broken down or decomposed in order to solve them. Many decision-making methodologies focus on choosing the best option or alternative. These techniques usually emphasize decomposing the decision into criteria or attributes against which all alternatives should be compared. First, each criteria is rated as to its importance in the final decision and then each optional solution is compared against each of the criteria. These processes have been given several names in the academic literature such as Multi Attribute Decision Making (MADM), Multi-Attribute Value Theory (MAVT), Multi-Attribute Utility Theory (MAUT) and Multi-Criteria Decision Analysis (MCDA). A similar spin-off has been Analytical Hierarchy Process (AHA) decision making that has focused on making pair wise comparisons. These processes work well when comparing similar options where the same criteria are applicable. This type of decision is applicable to choosing a particular car or choosing between an apple and an orange but not when balancing choices where the criteria are inconsistent. Further, these processes have not been adapted for use in computational decision-making programs for embedded systems or for real time control.

Artificial Intelligence and Expert Systems have taken many forms since the topics were first conceived. Rule-based systems were commonly referred to as reverse chaining or forward chaining. Reverse chaining systems started with a solution and worked back through all the data to determine whether the solution was valid. This approach worked for simple decisions when some data might be missing. Forward chaining systems start with the data and try to determine the solution. Rule-based systems supplied the concepts of confidence factors or certainty factors as part of the math behind the results. These types of systems were commonly used to evaluate static problems where the rules are fixed and the impact of each rule is stable. In many real world decision-making situations rule based systems quickly become complex and hard to understand. Computer programs based on rule based systems are usually expensive to develop and difficult to debug. Further, they can be inflexible and if changes occur may require complete recoding of system solutions.

Fuzzy Logic was developed as a mechanism to circumvent the need for rigorous mathematical modeling. Fudge factors in control systems were replaced by self-explanatory linguistic descriptions that use soft terms that most humans can easily understand to describe a situation. Discrete data items are translated or fuzzified into different levels of participation in membership functions that describe the input domain in easily understood terms. The membership functions are characterized by simple geometric patterns which extend across different regions of the input domain. Likewise the output range is described by membership functions having geometric patterns which extend across different regions in the output range. Linguistic type if-then rules are then formulated to define the transfer of membership participation from the input membership functions to the output membership functions. The output is then defuzzified according to a combinational strategy such as center of gravity. Software packages exist which provide program development interfaces that enable the generation of typical input and output membership functions and the on-screen generation of transfer rules. Such software may also allow for multiple inputs and outputs which may be visually displayed as blocks on the left and right sides of a program development screen with blocks for the fuzzy logic rules shown in between. Some programs then allow fuzzy logic program code may be automatically generated based on the functions and rules defined on the program development screen. Fuzzy logic can be used for decision-making but is not well adapted to handling multiple inputs and outputs or for enabling complex interactions between the components of the system. Fuzzy logic rules may have the advantage of allowing simple descriptions but they are likewise limited in what they can provide. It is often difficult to explain the results of fuzzy logic decisions because the result is determined by geometric based participation in various membership domains.

Neural nets were developed to mimic the structure of the human brain and can provide a form of decision-making. Each neuron in a neural net processes incoming inputs and supplies outgoing outputs. The outputs are linked to other neurons which are frequently deployed in multiple interconnected layers across which signals are transferred from inputs on one side to outputs on the other side with some of the neurons providing interfaces to the outside world. Neural nets are "trained" to establish a pattern of desired behavior. Learning algorithms modify individual neurons by weighting or reinforcing certain of their connections with other neurons. Neural nets are fascinating to contemplate but require a lot of program code, are hard to properly train and are not well adapted for dealing with applications requiring sharp changes in output based on limited input variation.

Knowledge Enhanced Electronic Logic (KEEL®) was developed as a software technique to model human decision making for embedded microprocessor based devices and software applications, where completely explainable results are obtained, and where a small memory footprint is achieved. It solves multiple inter-related problems by iteratively processing each problem and passing the results to related problems. The process completes when all problems have achieved stable results. KEEL® answers are traceable because the reasoning can be explicitly viewed in the development environment. When KEEL® designs are implemented on conventional computer systems they require a significant amount of data movement, because of the serial processing of instructions. When implemented in an embedded microprocessor based device or in a software application, the performance of the decision making logic is satisfactory for many applications, but in some cases higher performance is necessary.

BRIEF SUMMARY OF THE INVENTION

The present invention comprises a circuit for implementing KEEL designs using either digital or analog (or hybrid analog/digital) logic circuitry in order to provide a higher speed decision making model than one created as a software or firmware solution using existing KEEL development tools.

The circuit uses multiple hierarchical tree structures electronic components modeling positions (or decisions) which function as outputs and of electronic components modeling arguments (or challenges) which function as inputs, each of which is associated a particular position. In KEEL designs, each position is primarily characterized by a modified value which usually corresponds to a final or intermediate output and includes other functional features such as position importance, a position threshold and a position clipper window. Each argument is characterized by an argument value and usually corresponds to an initial or intermediate input. The values of the arguments associated with a given position are combined to determine the modified value of that position. Arguments may be supporting arguments which raise the modified value of the position or objecting arguments which decrease the modified value of the position. A complete circuit usually includes a large number of positions and arguments. The circuit also uses sets of linkages which may be used to define functional relationships between the different positions and arguments. The linkages allow different positions and arguments to be conveniently connected and combined into complex functional structures.

The existing KEEL graphical programming interface provides graphical representations of the positions as position value bars within importance boxes and of the arguments as slider bars deployed in proximity to the positions. The importance boxes provide a visual indication of the level of importance and the value bars provide a visual indication of the modified values of the positions. The slider bars provide a visual indication of the argument values which may be coupled to outside inputs, connected to other positions or manually set by the developer. A set of connection points is associated with each position and a connection point is associated with each argument. Each position includes connection points associated with its modified value, importance, threshold, clipper window upper limit and clipper window lower limit. The connection points are used in forming linkages providing functions related to the points of connection. The importance of a position scales the overall modified value of the position. The threshold is graphically adjustable so it can be set at any level along the position assembly. The threshold generates a zero output or full output depending on whether the modified value is less than or equal to or more than the threshold set point. The clipper window upper and lower limits are graphically adjustable so they can be set at any level along the position assembly and generate outputs in accordance with the level of a position's modified value in relation to the clipper window. Groups of positions can be identified where only the highest modified value will be used for the positions within the group.

A design may be generated by specifying positions and arguments associated with these positions through the use of drop down windows. Linkages are then formed by clicking on connection points and using the cursor to create linkages by dragging and dropping linkage lines between connection points. The linkages provide overall functionality in accordance with their points and order of connection. The interface allows a computational decision making program to be conveniently developed by a highly visual programming methodology. A design may also be formed out of parts by merging multiple program segments together.

The overall data structure comprises a position data table, an argument data table and as linkage data structure including data arrays associated with each type of linkage. The position data table stores basic position data such as modified value, importance, threshold set point, clipper set points and a position ID and is accessed in accordance with an index count value. The argument data table stores basic argument data such as argument value, type (supporting or objecting) and parent (a position ID) and is accessed in accordance with an index count value. The data arrays of the linkage data structures store basic data entries by linkage type specifying the linkage connections in accordance with an index count value.

The electronic circuit derived from the design produces signal values equivalent to the position importance output values, position modified value outputs, threshold output values, and clipper window output values. The electronic circuit accepts input signals for argument values (supporting and objecting), clipper window configuration values, upper and lower clipper window setting configuration values, threshold configuration values, and position importance configuration values.

The electronic circuit wiring design is created using the information from linkage tables.

The electronic circuit is composed of several basic subassemblies for arriving at stable modified values for the positions. The complete circuit is composed of one or more KEEL Cells and zero or more Group Logic Cells.

The KEEL Cell is composed of a Support Accumulator Logic, an optional Objecting Accumulator Logic, an optional Threshold Logic, and an optional Clipper Logic.

The inputs to a KEEL Cell are a Position "Importance Config" signal, one or more input Supporting Argument signals, zero or more input Blocking Argument signals, zero or one Threshold Config signal, zero or one Lower Clipper Window Config signal, zero or one Upper Clipper Window Config signal, and zero or one Clipper Window Bias signal.

The outputs from a KEEL Cell are zero or one Position Importance signal, zero or one Modified Value signal, zero or one Threshold signal, zero or one Clipper Challenge Value signal and zero or one Clipper Importance Value signal.

The Supporting Accumulator combines the input Supporting Argument(s) and the Position Importance and creates an Accumulated Support signal as its output.

A Blocking Accumulator combines the input Objecting Argument(s) and the Accumulated Support signal and creates the Modified Value signal as its output.

The Threshold Logic incorporates the Threshold Comparator.

The Threshold Comparator accepts its input from the Modified Value signal and references the Threshold Set Point value and creates a Threshold Value Signal of full value if the Modified Value signal is larger than the Threshold Set Point signal or of zero value if the Modified Value signal is lower or equal to the Threshold Set Point signal.

The Clipper Window Logic accepts input from the Modified Value signal and from a) the Upper Clipper Window Config signal and the Lower Clipper Window Config signal or from b) the Clipper Window Config signal. The Clipper Window Logic sets two internal signal values: an Upper Clipper Set Point signal and a Lower Clipper Set Point signal. If the Clipper Window Logic utilizes the Clipper Window Config signal, then both the Upper Clipper Threshold signal and the Lower Clipper Threshold signal are adjusted equally throughout the range of the Clipper Window Config signal, such that the Upper Clipper Set Point signal rises to the Position Importance Bias signal value when the Clipper Window Config signal reaches its maximum value, or lowers the Lower Clipper Set Point value to 0 (or its lowest value) when the Clipper Window Config signal reaches 0 (or its lowest value) while retaining the absolute differential between the Upper Clipper Set Point and the Lower Clipper Set Point signals.

The Group Logic Cells are used when the circuit design uses group functionality to select the highest value KEEL Cell Modified Value signal.

The Group Logic Cells take their input signals from the respective Modified Values of the KEEL Logic Cells based the design where the user selects which KEEL Cells participate in which group.

The Group Logic contains a Group Comparator that identifies the Modified Value input that has the highest value and sets a Group Modified Value associated with the respective input Modified Value. Within the Group Logic, each input Modified Value has a fixed Priority Bias that insures that one input Modified Value will still be selected, even if all of the input Modified Values are the same.

The Group Modified Value for each of the Group Logic Modified Value input signals is set to either maximum value or 0 (lowest value) depending on whether the input Modified Value is the selected highest value or not.

The KEEL design environment allows a circuit to be defined where multiple KEEL Logic Cells and Group Logic Cells are linked together in the same manner that is described for embedded KEEL engine solutions and for software applications.

It is an object of the present invention to provide a digital circuit that emulates the functionality of KEEL firmware or software.

It is another object of the present invention to provide an analog circuit that emulates the functionality of KEEL firmware or software.

It is another object of the present invention to provide a hybrid analog/digital circuit that emulates the functionality of KEEL firmware or software.

It is a yet further object of the invention to define the cells to be included in the ASIC cell library to support KEEL based solutions.

It is a yet further object of the present to a digital circuit which is characterized by simple, compact and efficient data structures that can be integrated from an ASIC cell library.

It is yet another object of the present invention to process information in parallel rather than serial fashion.

It is yet another object of the present invention to calculate the system cycle timing based on the maximum number of supporting and objecting arguments to any one position.

It is yet another object of the present invention to accumulate all inputs in one system cycle rather than sequentially.

It is yet another object of the present invention to accumulate all inputs in one system cycle in a digital design.

It is yet another object of the present invention to distribute all internal inputs in one system cycle in a digital design.

It is yet another object of the present invention to accept all inputs at any point in time in an analog design.

It is yet another object of the present invention to publish all external outputs simultaneously in an analog design.

Other objects and advantages are its ability to retain the advantages of existing KEEL solutions by allowing decisions and actions to be explained with the use of existing KEEL development tools and by allowing system designers the ability to take existing software and firmware based designs and port them to higher performance analog, digital or hybrid analog/digital solutions.

It is a yet further object of the present invention for the development of electronic circuits having an architecture which reflects a hierarchical tree structure of positions and arguments and includes a variety of different types of linkages which define different types of functional relationships between the positions and arguments.

It is yet another object of the present invention to provide for an electronic circuit having an architecture which reflects a structure of positions and arguments and which includes linkages enabling one position to drive the importance of another position or the value of an argument.

It is a yet further object of the present invention for the development of an electronic circuit having an architecture which reflects a structure of positions and arguments and which includes linkages enabling threshold and clipper window functionality between different positions and arguments.

It is yet another object of the present invention to provide for the development of an electronic circuit featuring Knowledge Enhanced Electronic Logic ("KEEL") which provides for effective computational decision making which simulates human decision making.

DETAILED DESCRIPTION OF THE INVENTION

Figure 1:
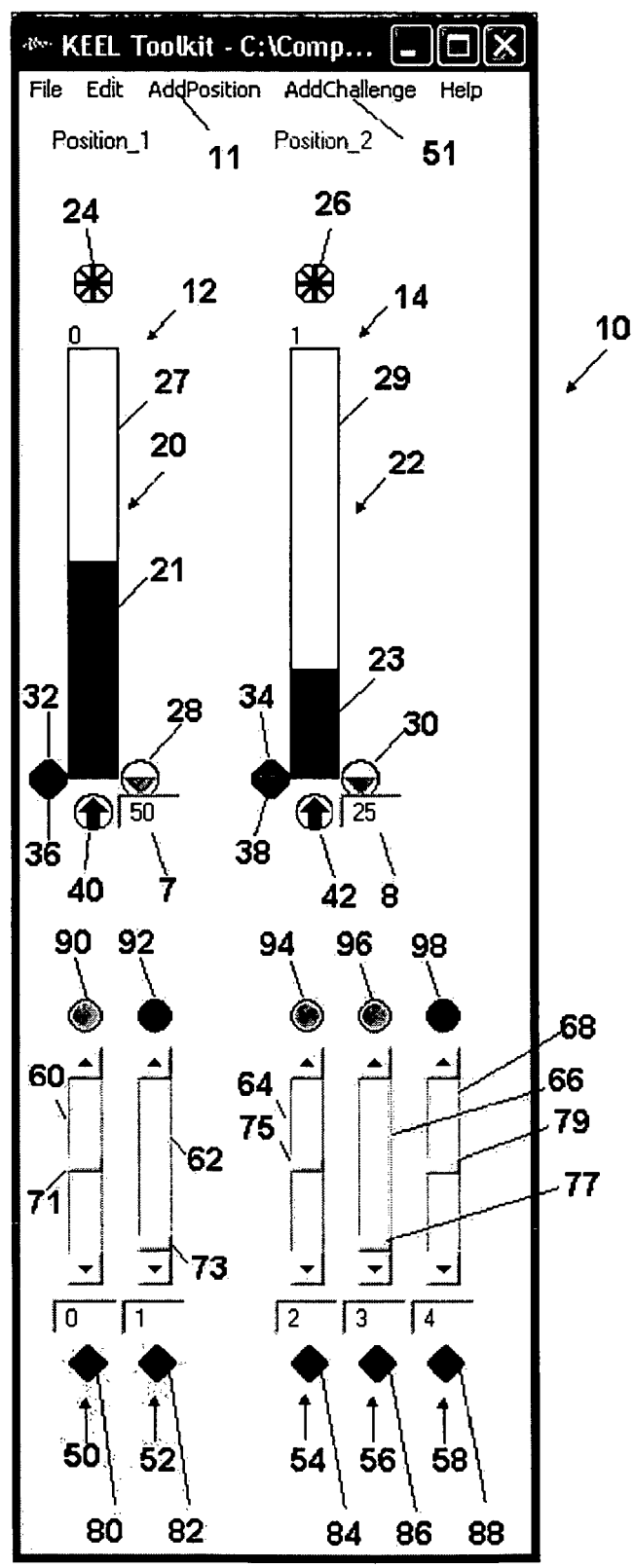
FIG. 1 provides a screen view of the main programming window of the graphical programming interface of the present invention showing two positions or decisions and five arguments or challenges illustrating the basic tree structure of positions and supporting and objecting arguments.

Referring now to FIG. 1, a graphical programming interface 10 in accordance with the present invention is shown as including two positions or actions 12 and 14. The positions 12 and 14 comprise position assemblies 20 and 22 that include rectangular importance boxes 27 and 29 and position value bars 21 and 23 disposed within rectangular boxes 27 and 29. The level of the value bars 21 and 23 provides a visual indication of the level of each position's modified value. The vertical height of boxes 27 and 29 provides a visual indication of the value of the importance of each position. The graphical programming interface 10 may include a large number of positions such as positions 12 and 14.

Figure 2:
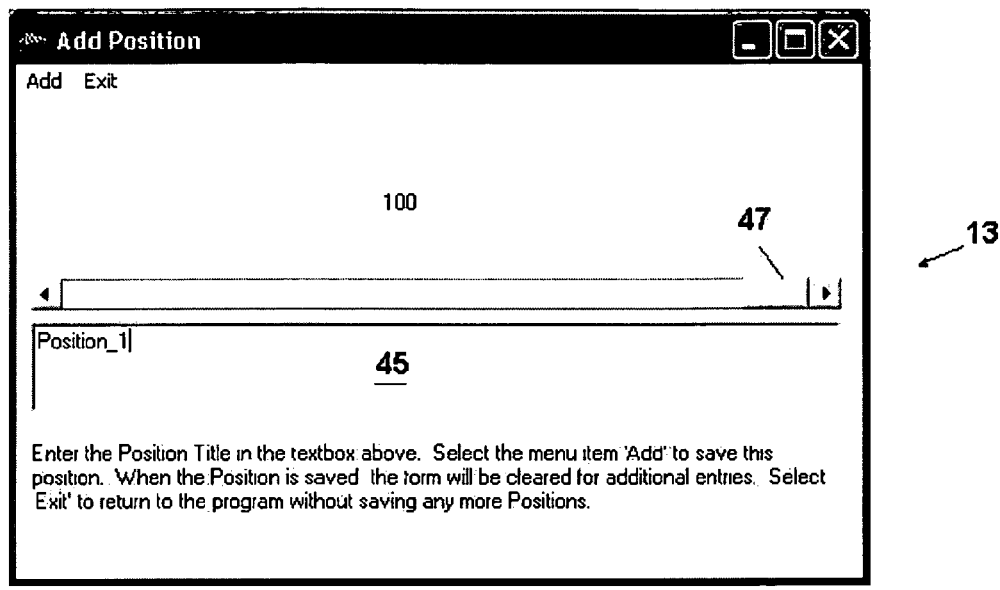
FIG. 2 provides a screen view of the Add Position menu for the graphical programming interface of the present invention showing the process of adding a position (or decision) to the main programming screen.

Referring now also to FIG. 2, once an application window is opened, positions such as positions 12 and 14 are created within the window by selecting an add position entry on a drop down menu or selecting an Add Position button 11 (FIG. 1) on a button bar which engages a drop down window 13 allowing the position to be named in a text box 45 and its importance value to be manually set by manipulating a slider 47. The interface software draws the positions within the application window with multiple positions being transversely spaced apart across the window.

Referring now again to FIG. 1, the positions 12 and 14 also include connection points by which functional linkages can be established. Importance connection points 24 and 26 are indicated by an icon showing an asterisk in a small irregularly shaped circle and are located immediately above the position assemblies. Threshold connection points 28 and 30 are indicated by an icon showing a small downward pointing triangle within a small circle and are moveably positioned along the right side of the position assemblies. Clipper upper limit connection points 32 and 34 are indicated by an icon showing a small pyramid and are moveably positioned along the left side of the position assemblies. Clipper lower limit connection points 36 and 38 are indicated by an icon showing a small upside down pyramid and are moveably positioned on the left side of the position assemblies below the upper limit connection points 32 and 34. Modified position value connection points 40 and 42 are indicated by an icon showing an upward pointing arrow within a small circle and are located immediately below the position assemblies. The connection points allow the positions and arguments to be functionally linked and combined together in a variety of ways using drag and drop techniques in order to form complex systems. Each position such as positions 12 and 14 includes importance, threshold, clipper upper limit, clipper lower limit and modified value connection points all or none of which may or may not be utilized in each case depending on the requirements of each application. The specific functionality associated with the connection points will be explained later.

The graphical interface 10 also includes three supporting and two objecting arguments or challenges 50, 52, 54, 56 and 58. The arguments 50, 52, 54, 56 and 58 include sliders 71, 73, 75, 77 and 79 that show input values normalized to a range of 0-100 within argument slider frames 60, 62, 64, 66 and 68. The argument values may be manually set or linked with outside input signals from sensors or the like or connected to various connection points associated with the positions 12 and 14 as will be explained later.

Figure 3:
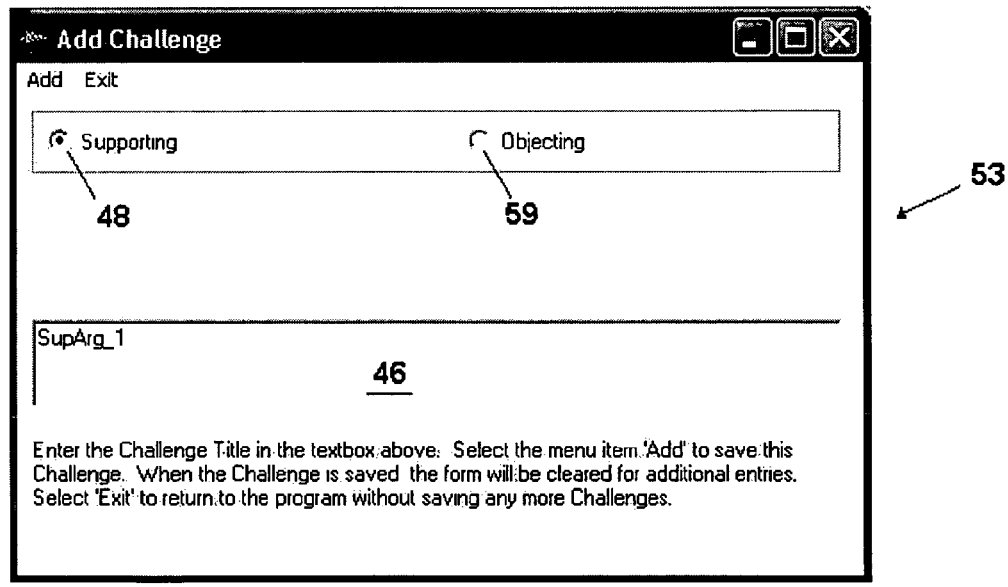
FIG. 3 provides a screen view of the Add Challenge (or argument) menu for the graphical programming interface of the present invention showing the process of adding an argument for a position on the main programming screen.

Referring now also to FIG. 3, arguments such as arguments 50, 52, 54, 56 and 58 are created by first selecting a position to which the argument will apply by clicking on the position and by selecting an add challenge entry on a drop down menu, or selecting an Add Challenge button 51 (FIG. 1) on a button bar which engages a drop down window 53 allowing the argument to be named in a text box 46 and for it to be designated as a supporting or objecting argument using radio buttons 48 and 59. The interface software draws the arguments within the application window below the positions with which they are associated with the supporting arguments and objecting arguments shown in the order they are created.

Referring now again to FIG. 1, the arguments 50, 52, 54, 56 and 58 also include connection points. Input connection points 80, 82, 84, 86 and 88 are indicated by icons in the shape of small diamonds which are located immediately below the argument slider bars and also by icons in the shape of small filled circles 90, 92, 94, 96 and 98 located immediately above the slider bars. The lighter colored circles such as the circles of icons 90, 94 and 96 indicate supporting arguments. The darker colored circles such as the circles of icons 92 and 98 indicate objecting arguments.

One supporting argument 50 and one objecting argument 52 are associated with the position 12 and two supporting reasons or arguments 54 and 56 and one objecting reason or argument 58 is associated with the position 14. The supporting and objecting arguments 50 and 52 which are associated with position 12 are accumulated and combined to derive the modified value for the position 12 as shown by the position value bar 21 and in text box 7. The supporting and objecting arguments 54, 56 and 58 which are associated with position 14 are accumulated and combined to derive the modified value for the position 14 as shown by the position value bar 23 and in text box 8. The graphical programming interface 10 may include a large number of both supporting and objecting arguments such as arguments 50, 52, 54, 56 and 58.

The modified value of position 12 is calculated in software in accordance with the evaluation algorithm:

$PS_1 = PI*S_1/100$ $PO_1 = PS_1*(100-O_1)/100$ $PF = PO_1$

Where—
PI=position importance value
$PS_1$=intermediate evaluation of supporting arguments after first (only) supporting argument
$S_1$=supporting argument value
$O_1$=objecting argument value
$PO_1$=intermediate evaluation of objecting arguments after the first (only) objecting argument
PF=final combined result—new modified position value The modified value of position 14 is calculated in software in accordance with the evaluation algorithm:

$PS_1 = PI*S_1/100$ $PS_2 = ((PI-PS_1)*S_2/100)+PS_1$ $PO_1 = PS2*(100-O_1)/100$ $PF = PO_1$

Where—
PI=position importance value
$PS_1$=intermediate evaluation of supporting arguments after the first supporting argument
$PS_2$=intermediate evaluation of supporting arguments after the second supporting argument
$S_1$=first supporting argument
$S_2$=second supporting argument
$O_1$=first objecting argument
$PO_1$=intermediate evaluation of objecting arguments after the first (only) objecting argument
PF=final combined result—new modified position value All supporting arguments are successively combined into an overall supporting argument value. Each supporting argument increases the values of the intermediate modified value figures. Objecting arguments are then successively combined staring with the final figure of the modified value after all supporting arguments have been combined into an overall result. Each objecting argument reduces the values of the intermediate modified value figures. The final intermediate modified value figure is the final result.

In the general case the formula for combining supporting values may be shown as follows:

$$PS_1 = PI*S_1/100$$
$$PS_2 = ((PI-PS_1)*S_2/100)+PS_1$$
$$PS_3 = ((PI-PS_2)*S_3/100)+PS_2$$
$$\ldots$$
$$PS_N = ((PI-PS_{N-1})*S_N/100)+PS_{N-1}$$

Where—
PI=position importance value
$S_1$=first supporting argument
$S_2$=second supporting argument
$S_3$=third supporting argument
$S_N$=Nth and final supporting argument
$PS_1$=accumulated results after first supporting argument
$PS_2$=accumulated results after second supporting argument
$PS_3$=accumulated results after third supporting argument
$PS_N$=accumulated results after Nth and final supporting argument The objecting arguments work off of the results of combining the supporting arguments and reduce the resulting evaluation. In the general case the formula for combining objecting values may be shown as follows:

$$PO_1 = PS_N*(100-O_1)/100$$
$$PO_2 = PO_1*(100-O_2)/100$$
$$PO_3 = PO_2*(100-O_3)/100$$
$$\ldots$$
$$PO_N = PO_{N-1}*(100-O_N)/100$$
$$PF = PO_N$$

Where—
$PS_N$=accumulated results from supporting arguments
$O_1$=first objecting argument
$O_2$=second objecting argument
$O_3$=third objecting argument
$O_N$=Nth and final objecting argument
$PO_1$=accumulated results after the first objecting argument
$PO_2$=accumulated results after the second objecting argument
$PO_3$=accumulated results after the third objecting argument $PO_N$=accumulated result after Nth and final objecting argument PF=final combined result—new modified position value It should be noted that $PO_N = PO_{N-1}*(100-O_N)/100$ is algebraically and computationally equivalent to $PO_N = PO_{N-1} - (PO_{N-1}*O_N/100)$ In the alternative embodiment the modified value of the positions 12 and 14 may be calculated based on a different technique such as a difference between weighted sums of supporting and objecting arguments such as:

$$PV=(SV-OV)/(SV+OV) \text{ for } SV>OV, \text{ otherwise } PV=0$$

For N supporting arguments and M objecting arguments Where—

$$SV=(S_1+S_2+S_3\ldots+S_N)$$

$$OV=(O_1+O_2+O_3\ldots+O_M)$$

FIG. 1 also graphically illustrates the interaction between positions 12 and 14 and arguments 50, 52, 54, 56 and 58. The supporting argument 50 is manually set to a value of 50 while the objecting argument 52 is set to zero. Consequently, the modified value of position 12 can be seen at text box 7 as registering at 50 and likewise can be seen to be at about 50 by the level of the position value bar 21. The supporting argument 54 is manually set to a value of 50 while the objecting argument 58 is set to a value of 50. Consequently, the modified value of position 14 can be seen at text box 8 as registering at 25 and likewise can be seen to be at about 25 by the level of the position value bar 23.

Figure 4:
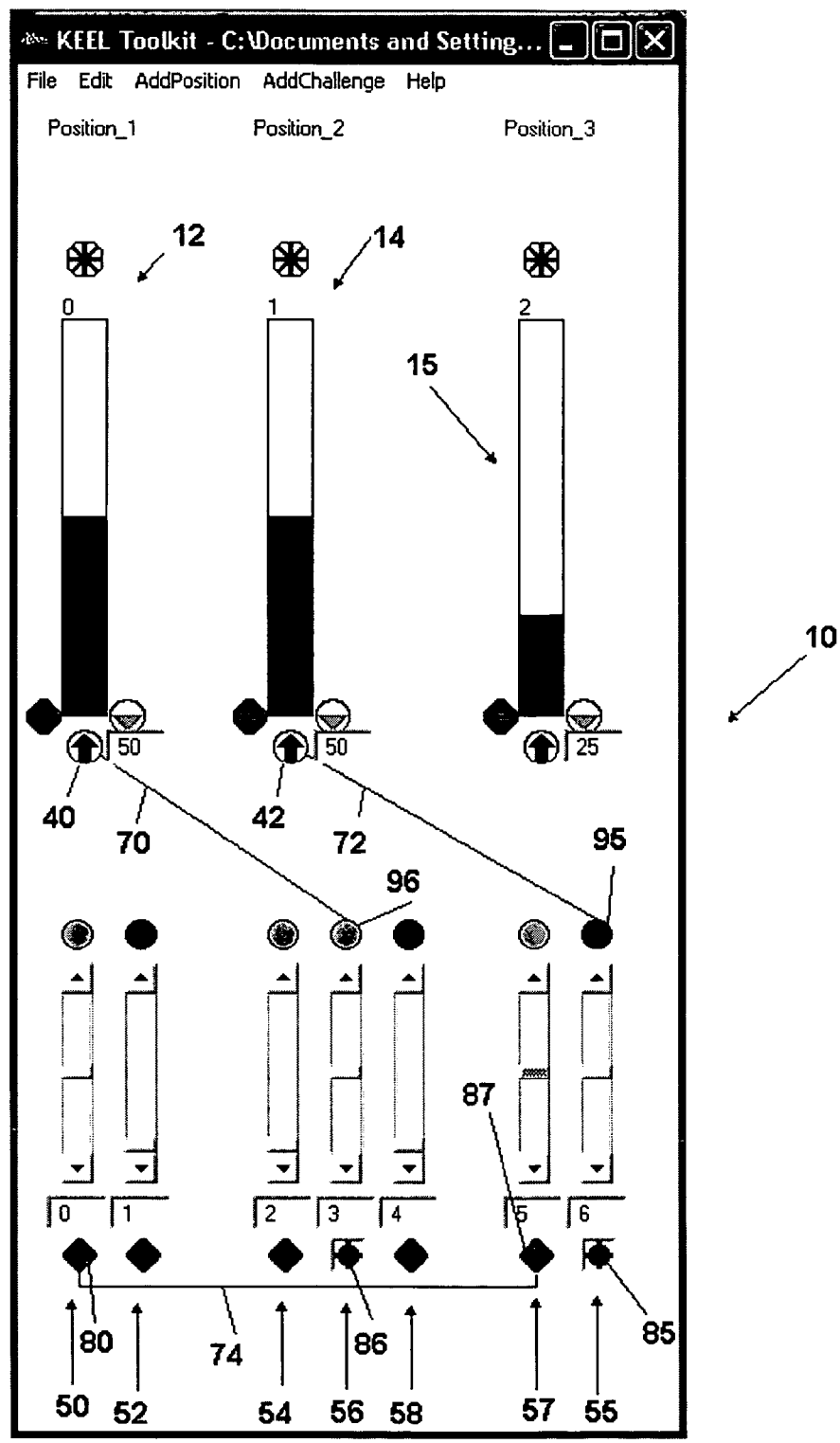
FIG. 4 provides a screen view of the main programming window of the graphical programming interface of the present invention illustrating linkages between positions and arguments and more specifically showing three positions and seven arguments with two of the positions linked to arguments for other positions so that the argument values are controlled by the modified values of those two positions.

Referring now to FIG. 4, the operation of modified position to argument connections or linkages 70 and 72 between position 12 and argument 56 associated with position 14 and between position 14 and argument 55 associated with position 15 are shown. The modified value of position 12 is linked or wired at modified value connection point 40 to the argument 56 at argument connection point 96. The modified value of position 14 is linked or wired at modified value connection point 42 to the argument 55 at argument connection point 95. The linkages are performed by clicking on the connection point 40 with the cursor and then dragging and dropping the cursor on the connection point 86 and by clicking on the connection point 42 with the cursor and then dragging and dropping the cursor on the connection point 85. It should be noted that while drag and drop techniques are efficient and convenient the interface could provide for the linkages could be formed by alternative techniques. The linkages 70 and 72 are graphically represented on the interface by thin lines extending between the connection points of the affected positions and arguments. All linkages are graphically represented on the interface by lines running between connection points. The linkages represent functional relationships between the positions, arguments and features associated with the connection points. It should be noted that once linkages are established the icons at the connection points 86 and 85 of the arguments 56 and 55 which are being driven by linkages 70 and 72 from other positions change from diamonds into small circles having four points. It should also be noted that the linkages are graphically depicted as extending between points 40 and 96 and 42 and 95 for the sake of convenience and to avoid clutter on the interface 10. The points 96 and 95 are not operatively active for creating new linkages but serve merely as diagrammatically convenient attachment points. In accordance with the functional relationship established by the linkages 70 and 72, the modified values of positions 12 and 14 drive the values of arguments 56 and 55. For illustrative purposes, the supporting argument 50 is manually set to an argument value of 50. Accordingly, the modified value of the position 12 registers as 50. This value drives the argument 56 through the link 70 to a value of 50 which in turn drives the position 14 to a value of 50. Since for illustrative purposes, the supporting argument 50 is manually set to an argument value of 50, this drives argument 57 to a value of 50 through link 74. The modified value of the position 14 registers as 50. This value drives the objecting argument 55 through the link 72 to a value of 50 which in turn drives the position 15 to a value of 25 in consideration of the fact that the supporting argument 57 is set to 50 via link 74. The graphical programming interface 10 may include a large number of linkages such as the linkages 70 and 72.

Referring again to FIG. 4, the supporting arguments 50 and 57 are connected or linked by linkage 74 running below the arguments 50, 52, 54, 56, 58, 57. The arguments 50 and 57 may thereby be conveniently set to identical values. Changes in one argument value will drive the other argument value. The linkage 74 is performed by clicking on the connection point 80 with the cursor and then dragging and dropping the cursor on the connection point 87 although the same linkage could be established by clicking on the connection point 87 and then dragging and dropping the cursor on connection point 80. The linkage 74 is graphically represented by a thin line extending between connection points. The graphical programming interface 10 may include a large number of linkages such as the linkages 74 which may even connect multiple arguments.

Figure 5:
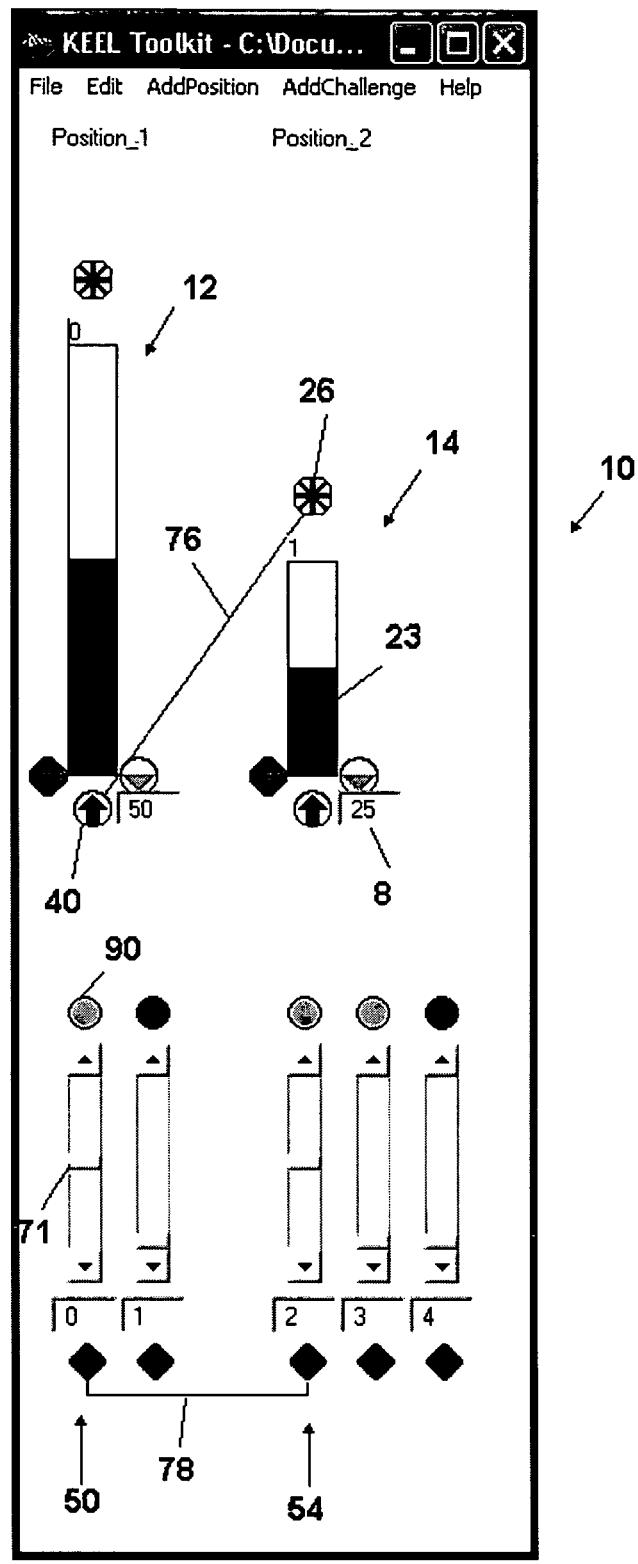
FIG. 5 provides a screen view of the main programming window of the graphical programming interface of the present invention illustrating linkages between positions and linkages between arguments and more specifically showing two positions and five arguments with the importance of one position controlled by the modified value of another position and with one argument value controlled by another argument value.

Referring now to FIG. 5, the operation of a modified position to position importance connection or linkage 76 between positions 12 and 14 is shown. The modified value of position 12 is linked or wired at modified value connection point 40 to the position 14 at importance connection point 26. The linkage is created by clicking on the connection point 40 with the cursor and thereafter dragging and dropping the cursor on the connection point 26. The linkage 76 is graphically represented by a thin line extending between connection points (as are all linkages). The linkage 76 represents a functional relationship between the position 12 and its modified value and the position 14 and its importance value. The modified value of the position 12 drives the value of the importance of position 14. The importance of a position "scales" its modified value from 0-100 on a percent basis so that for example an importance of 60 reduces a modified value of 80 to 48. For illustrative purposes, the supporting argument 50 is manually set to an argument value of 50 with slider 71. Accordingly, the modified value of the position 12 registers as 50. The argument 50 also drives the argument 54 through the action of the link 78 to a value of 50. The linkage 76 drives the importance of position 14 to a value of 50 in accordance with the modified value of position 12. The modified value of position 14 is driven to 25 as shown at text box 8 and by position bar 23 by the value of argument 54 as adjusted in accordance with the importance determined by position 12 through linkage 76. It should also be noted that the importance of any position can be manually set at the time of its creation by adjusting the slider 17 associated with its drop down window 13 as shown in FIG. 2. The graphical programming interface 10 may include a large number of linkages such as the linkage 76.

Figure 6:
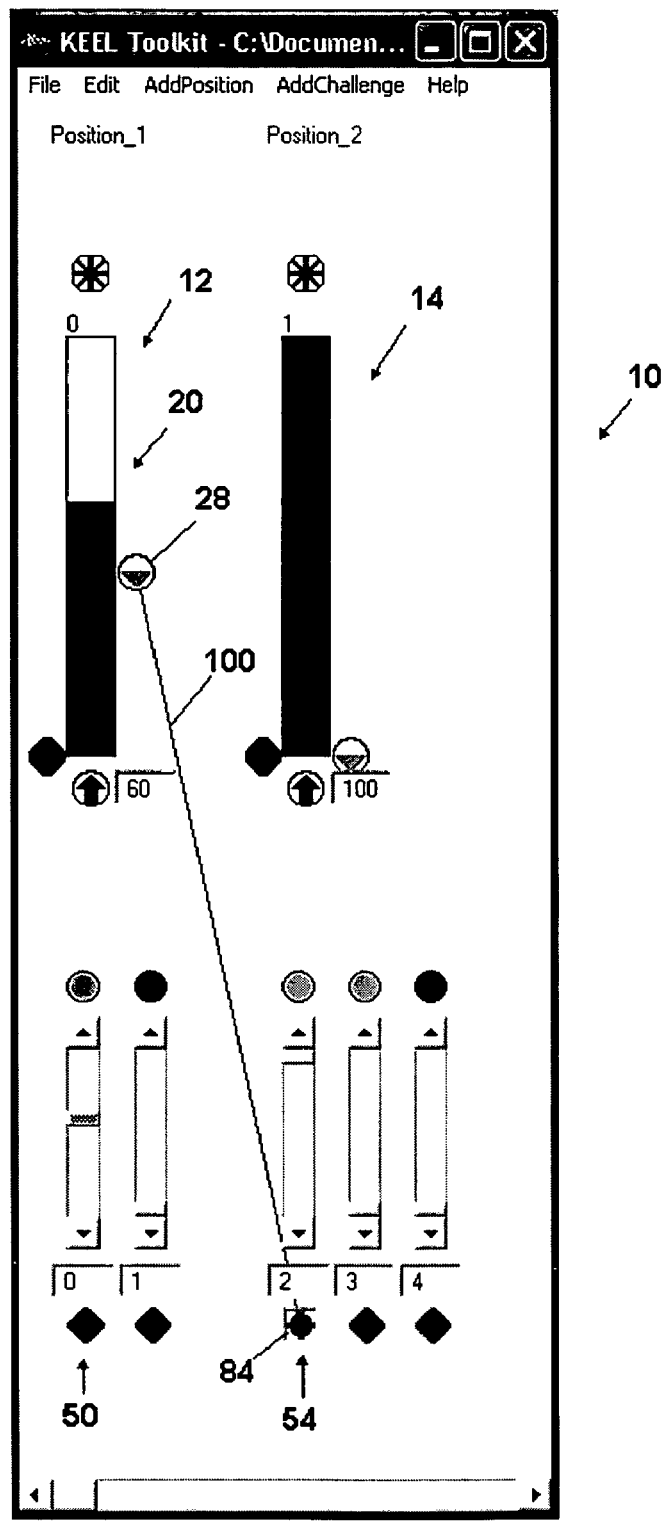
FIG. 6 provides a screen view of the main programming window of the graphical programming interface of the present invention illustrating linkages between thresholds and arguments and more specifically showing two positions and five arguments with an argument value for one position controlled by the threshold of another position.

Referring now to FIG. 6, the operation of a threshold to argument connection or linkage 100 between position 12 and argument 54 and its associated position 14 is shown. The set point of the threshold for position 12 can be adjusted by having its connection point clicked with the cursor and dragged and dropped anywhere along the right side of the position assembly 20 while the control key and the right mouse button are depressed to set the threshold at any value between 0 and 100. The threshold connection point graphically represents the threshold's set point for triggering its functions in accordance with the height of its vertical position along the left side of the position assembly. It should however be understood that the exact sequence of keystrokes to perform actions like moving threshold points is a matter of design choice and that the interface could be programmed to use different sequences without affecting the functionality of the software. The threshold for position 12 is linked or wired at threshold connection point 28 to argument 54 at argument connection point 84. The linkage 100 is performed by clicking on the threshold connection point 28 with the right mouse button and then dragging and dropping the cursor onto the connection point 84. In accordance with the linkage 100, the threshold thereby drives the value of the of argument 54 to either 0 if the modified value of position 12 is equal to or below the threshold or to 100 if the modified value of the position 12 is above the threshold. For illustrative purposes, the supporting argument 50 is manually set to an argument value of 60. The modified value of the position 12 registers as 60. By operation of the threshold for position 12 and linkage 100 this value drives the argument 54 to a value of 100 since the modified value of position 12 is above the threshold and the modified value of position 14 is then driven to 100 by argument 54. The graphical programming interface 10 may include a large number of linkages such as the linkage 100.

Figure 7:
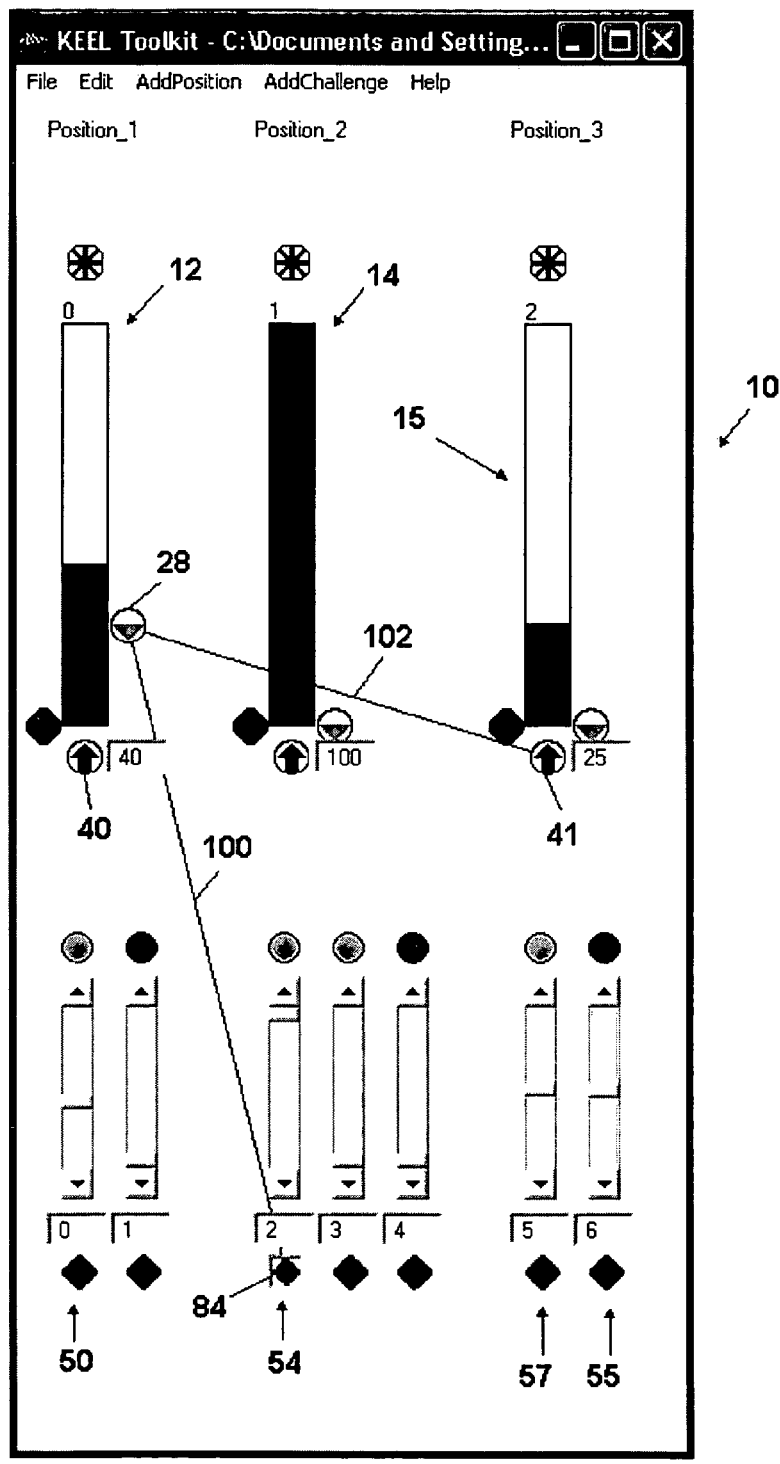
FIG. 7 provides a screen view of the main programming window of the graphical programming interface of the present invention illustrating linkages between positions and thresholds and more specifically showing three positions and seven arguments with the threshold set point of one position controlled by the modified value of another position and with an argument value for yet another position controlled by the threshold.

Referring now to FIG. 7, the operation of a threshold to argument connection or linkage 100 between position 12 and argument 54 and its associated position 14 is shown at the same time as the operation of a modified position to threshold linkage 102 between positions 15 and 12 is illustrated. The linkage 102 allows the set point of the threshold to be automatically adjusted. The threshold for position 12 is linked or wired at threshold connection point 28 to argument 54 at argument connection point 84 as previously described with respect to FIG. 6. The modified value of position 15 is linked at connection point 41 to the threshold associated with position 12 at threshold connection point 28. The linkage 102 is created by clicking on the modified value connection point 41 with the cursor and then dragging and dropping the cursor on the threshold connection point 28. In accordance with the linkage 102 the set point of the threshold for position 12 is controlled to be the same as the modified position value of position 15. For illustrative purposes, the supporting argument 50 is manually set to an argument value of 40 and the supporting and objecting arguments 55 and 57 are manually set to argument values of 50. The modified value of the position 12 registers as 40. By operation of linkage 102 the threshold set point for position 12 is set to 25 which correspond to the modified value of position 15. By operation of the linkage 100 the threshold drives the argument 54 to a value of 100 since the modified value of position 12 is above the threshold set point of 25 as controlled by position 15 and the modified value of position 14 is then driven to 100 by argument 54. The graphical programming interface 10 may include a large number of linkages such as the linkages 100 and 102.

Figure 8:
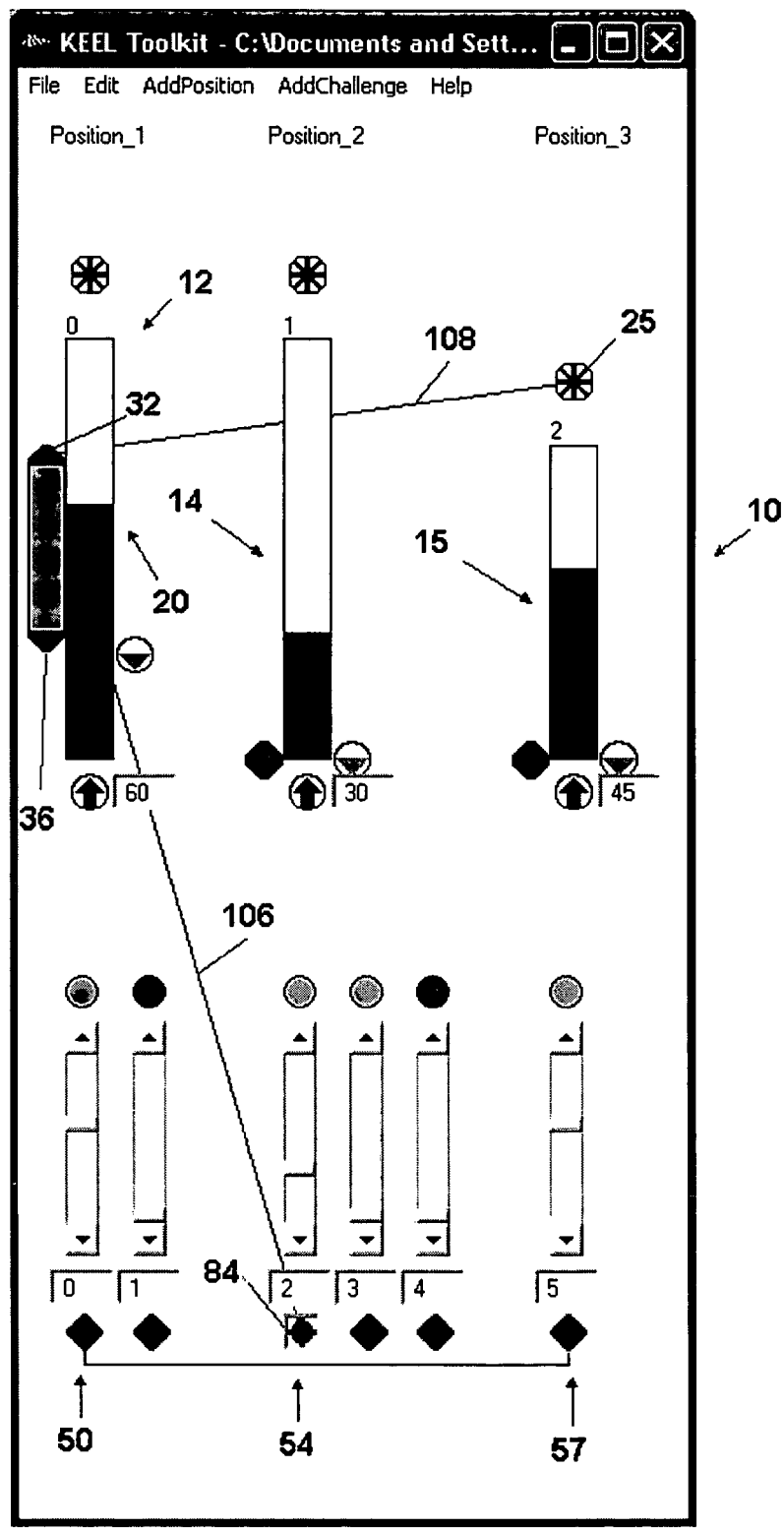
FIG. 8 provides a screen view of the main programming window of the graphical programming interface of the present invention illustrating linkages between clipper windows and positions and arguments and linkages between arguments and more specifically showing three positions and six arguments with the importance of one position controlled by the clipper window of another position and with an argument value for yet another position also controlled by the clipper window and also with one argument controlling the value of another argument.

Referring now to FIG. 8, the operation of a clipper or clipper window to argument connection or linkage 106 between position 12 and argument 54 and its associated position 14 is shown as well as the operation of a clipper or clipper window to position importance linkage 108 between position 12 and position 15. The operation of the clipper window may be adjusted by having its upper and lower limit connection points 32 and 36 clicked with the cursor and dragged and dropped anywhere along the left side of the position assembly 20 while the control key and right mouse button are depressed to set the clipper upper and lower limit set points at any values between 0 and 100 (so long as the lower limit is below the upper limit). The clipper upper and lower limit connection points graphically represent the clipper's set points for triggering its functions in accordance with their vertical position along the left side of their position assembly. For general purposes it should be noted that a clipper window's upper set point is based on a percentage of the position importance and the clipper window's lower set point is based on a percentage of the upper clipper window set point. Knowing the position importance value and percentage values of the upper and lower clipper set point values, count values can be calculated for both upper and lower clipper set points when these count values are needed to drive argument values. The upper connection points of clippers such as the connection point 32 of the clipper for position 12 are used for linking the outputs of clippers to other connection points. The clipper window for position 12 is linked or wired at clipper connection point 32 to argument 54 at argument connection point 84. The clipper window for position 12 is also linked or wired at clipper connection point 32 to position 15 at importance connection point 25. The linkages 106 and 108 are constructed by clicking on the clipper connection point 32 with the cursor and then dragging and dropping the cursor onto the connection point 84 and by clicking on the clipper connection point 32 with the cursor and then dragging and dropping the cursor onto the connection point 25. It should be noted that clipper windows have both percentage and derived count value functions associated with them. The count values are used when they drive argument values and the percent values are used when they drive importance values. In accordance with linkage 108 the clipper window for position 12 thereby drives the value of the importance of position 15 to the clipper's percent value. In accordance with the linkage 106, the clipper window for position 12 also drives the value of the argument 54 to the clipper's derived count value. The count value of a clipper window is a function of the amount by which the modified value of the position it is associated with exceeds its clipper lower limit set point. However, the count value of a clipper window is limited by its upper limit set point and its value will not increase further once its upper limit set point is reached even if the modified value of the position with which it is associated increases beyond the upper set point. For illustrative purposes, the supporting argument 50 is manually set to an argument value of 60. The modified value of the position 12 registers as 60. By operation of the clipper window for position 12 and linkage 106 the argument 54 is driven to a value of 30 since the modified value of position 12 is 30 counts above the clipper's lower limit (while still below the upper limit). The percent value of a clipper is a function of the amount by which the modified value of the position it is associated with exceeds its clipper lower limit set point as a percent of the total range of the clipper or rather as a percent of the difference between the upper and lower limit set points. For illustrative purposes, the supporting argument 50 is manually set to an argument value of 60. The modified value of the position 12 registers as 60. By operation of the clipper window for position 12 and linkage 108 the importance of position 15 is driven to 75 since the modified value of position 12 is 75 percent of the way between the clipper's lower limit and upper limit. The graphical programming interface 10 may include a large number of linkages such as the linkages 106 and 108.

Figure 9:
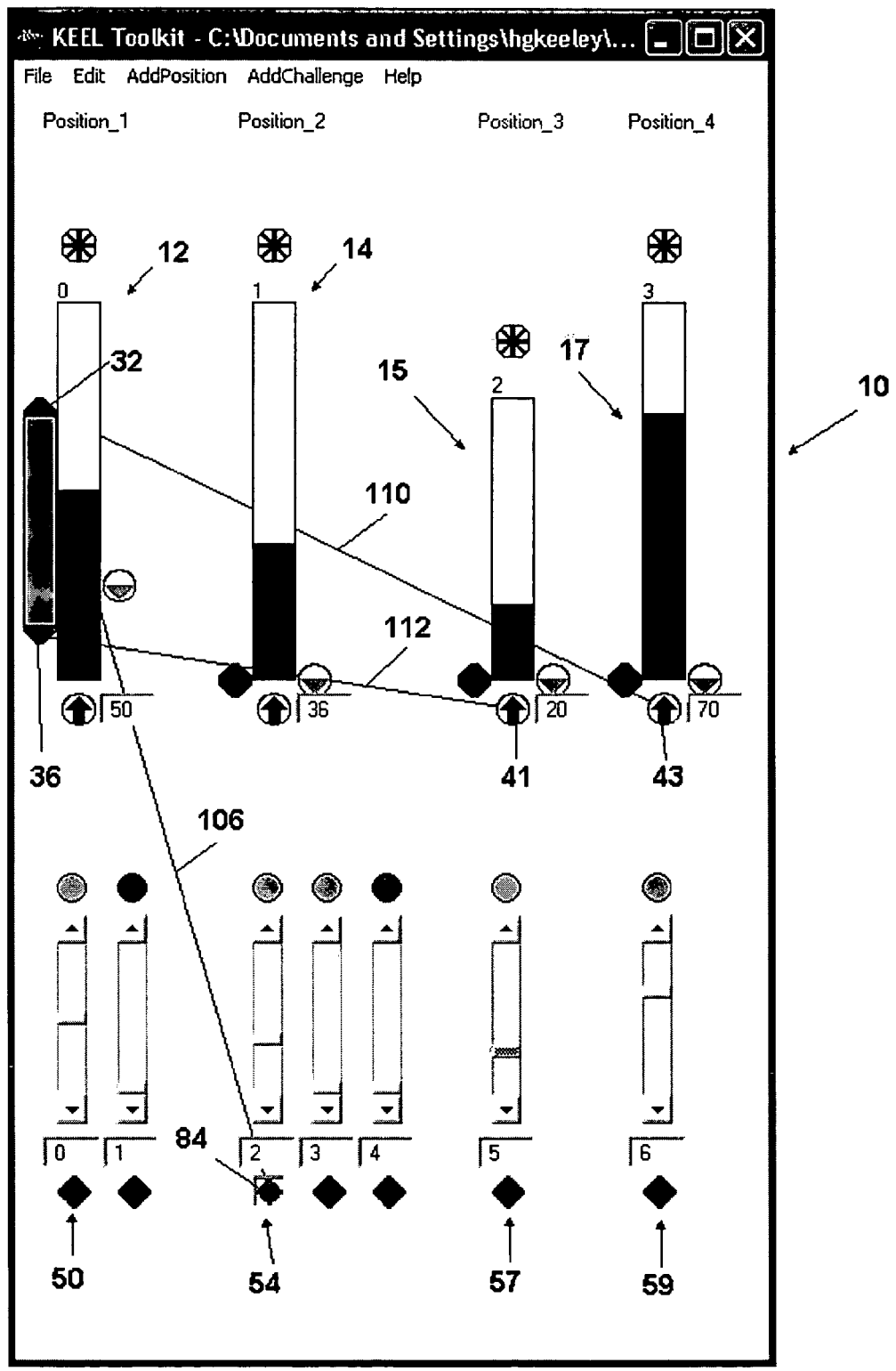
FIG. 9 provides a screen view of the main programming window of the graphical programming interface of the present invention illustrating linkages between clipper windows and positions and arguments and more specifically showing four positions and seven arguments with the upper limit clipper window set point of a first position controlled by the modified value of a fourth position and lower limit clipper window set point of that first position controlled by the modified value of a third position and with an argument value for a second position then controlled by the clipper window.

Referring now to FIG. 9, the operation of position modified value to clipper upper limit and position modified value to clipper lower limit connections or linkages 110 and 112 between positions 15 and 17 and the clipper associated with position 12 are shown. The linkages 110 and 112 allow the operation of the clipper window to be modified by having the set points associated with its upper and lower limit connection points 32 and 36 automatically adjusted. The modified value of position 17 is wired or connected at connection point 43 to clipper upper limit connection point 32. Similarly, the modified value of position 15 is wired or connected at connection point 41 to clipper lower limit connection point 36. The linkages 110 and 112 are created by clicking on the position modified value connection point 43 with the cursor and then dragging and dropping the cursor onto the clipper upper limit connection point 32 and by clicking on the position modified value connection point 41 with the cursor and then dragging and dropping the cursor onto the clipper lower limit connection point 36. The clipper window for position 12 is also linked or wired at clipper connection point 32 to argument 54 at argument connection point 84 by linkage 106. The modified values of positions 17 and 15 thereby drive the values of the set points for the upper and lower limits of the clipper of position 12. For illustrative purposes, the supporting argument 50 is manually set to an argument value of 50. The modified value of the position 12 registers as 50. By operation of the linkages 110 and 112 the set point of the clipper upper limit is set to 70 percent (or 70 counts) and the set point of the clipper lower limit is set to 20 percent or 14 counts) in accordance with the modified values of the positions 17 and 15. The clipper window for position 12 and linkage 106 drive the modified value of position 14 to 36 since the modified value of position 12 is 36 counts higher than the clipper lower limit count or set point of 14. The graphical programming interface 10 may include a large number of linkages such as the linkages 106, 110 and 112.

Figure 10:
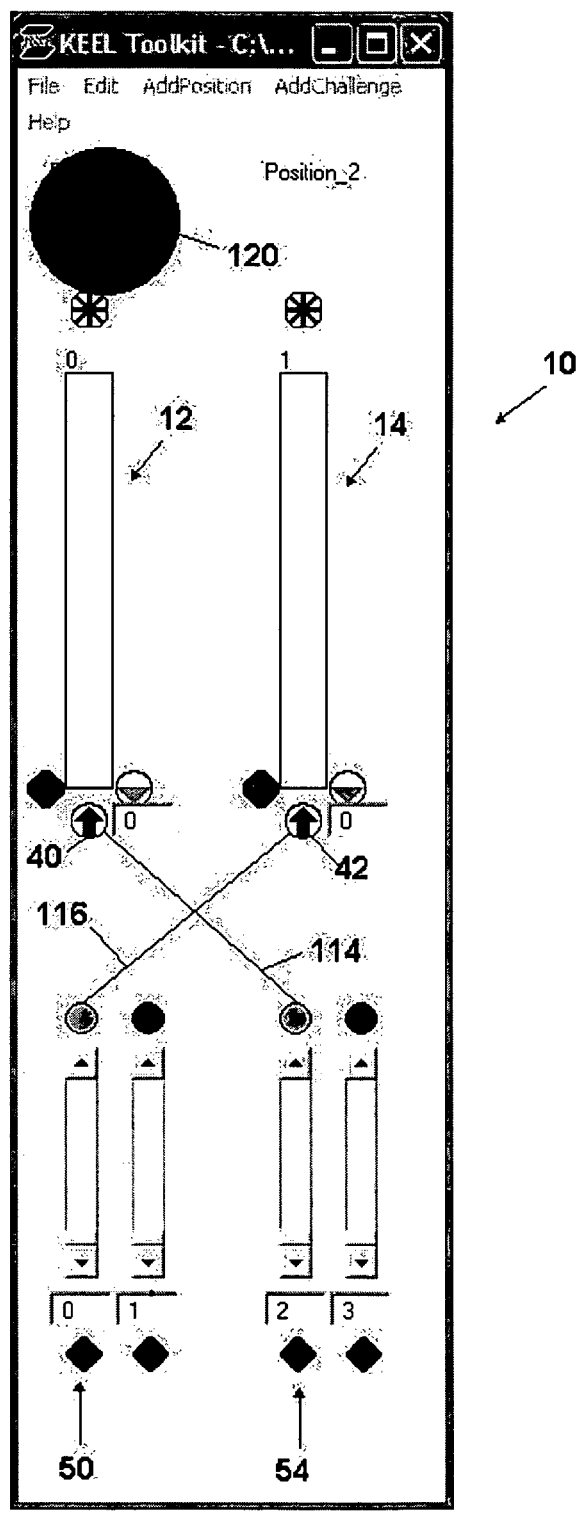
FIG. 10 provides a screen view of the main programming window of the graphical programming interface of the present invention illustrating linkages between positions which may create feedback problems and more specifically showing two positions and four arguments with an argument for a first position controlled by the modified value of a second position and an argument for the second position controlled by the modified value of the first position.

Referring now to FIG. 10, the position modified value to argument linkages 114 and 116 link position 12 to position 14 through argument 54 and position 14 to position 12 through argument 50 in a potentially unstable feedback loop. The interface program detects this and presents the icon 120 in the shape of a large circular ball above the first position 12 as a warning. The developer using the interface may manually override this warning using menu entries under the Edit menu as will be later described.

Figure 11:
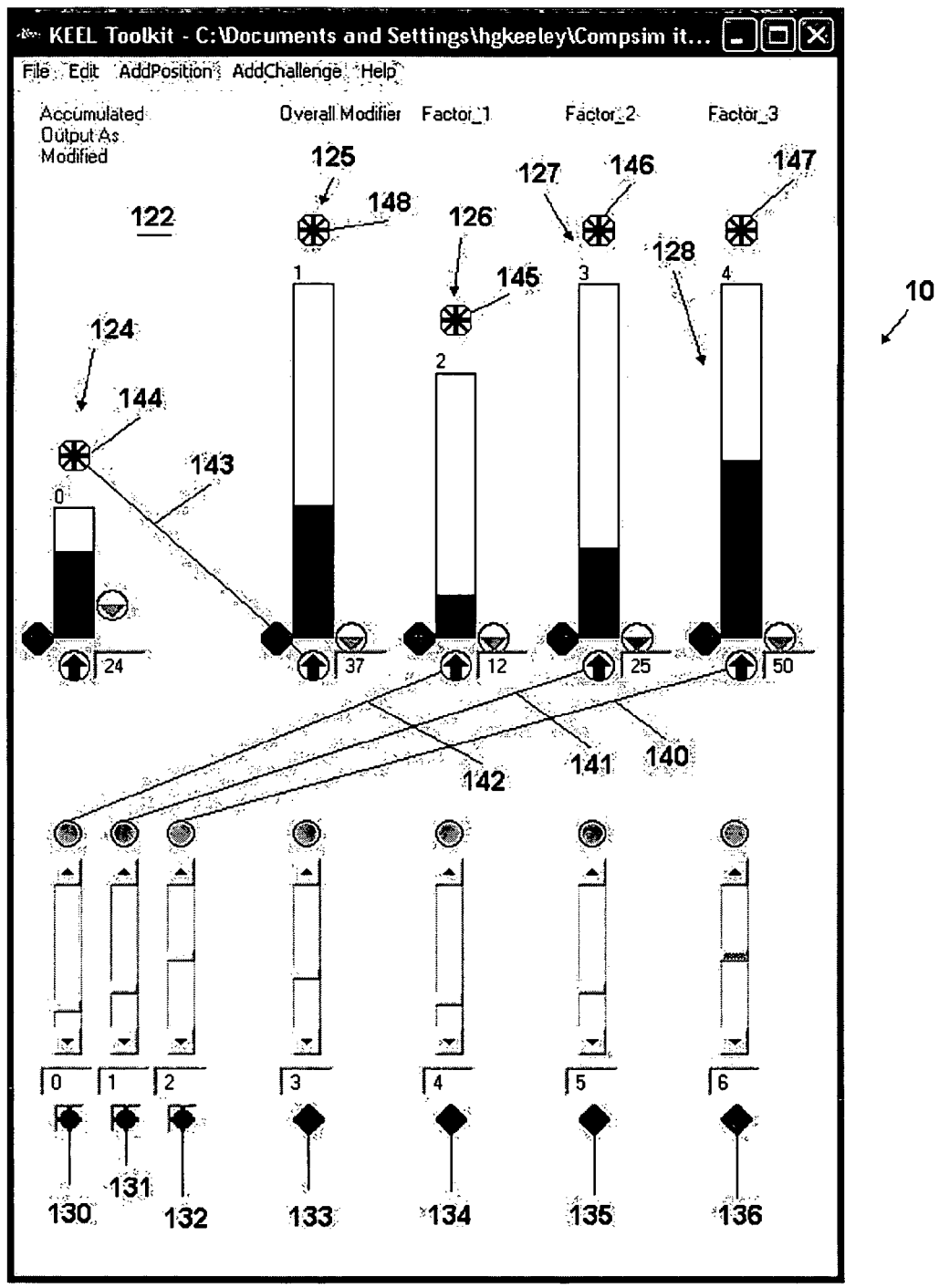
FIG. 11 provides a screen view of the main programming window of the graphical programming interface of the present invention illustrating a sample program in which three input factors are combined and modified by a fourth input to produce a final result and more specifically showing five positions and seven arguments having various linkages.

Referring now to FIG. 11, the sample interface program 122 includes five positions 124-128, seven arguments 130-136 and four linkages 140-143. The position modified value to argument linkages 140-142 are operative for transferring the modified values from the positions 126-128 to the position 124 through the arguments 130-132. These modified values reflect the arguments 134-136 that act as inputs to the system. The modified arguments are scaled relative to one another in accordance with the fixed importance values of the positions 126-128. However, the position 125 and its supporting argument 133 control the importance of position 124 through the position modified value to importance linkage 143. It should also be noted that the modified value of position 125 is also scaled in accordance a fixed importance value. The position 125 effectively modifies or controls the overall combined values of positions 126-128 and the inputs represented by arguments 133-136 as they are accumulated at position 124. In overall function the program collects, scales, and combines a set of inputs and allows the accumulated value to be modified and then expressed as a single output for control purposes.

Figure 12:
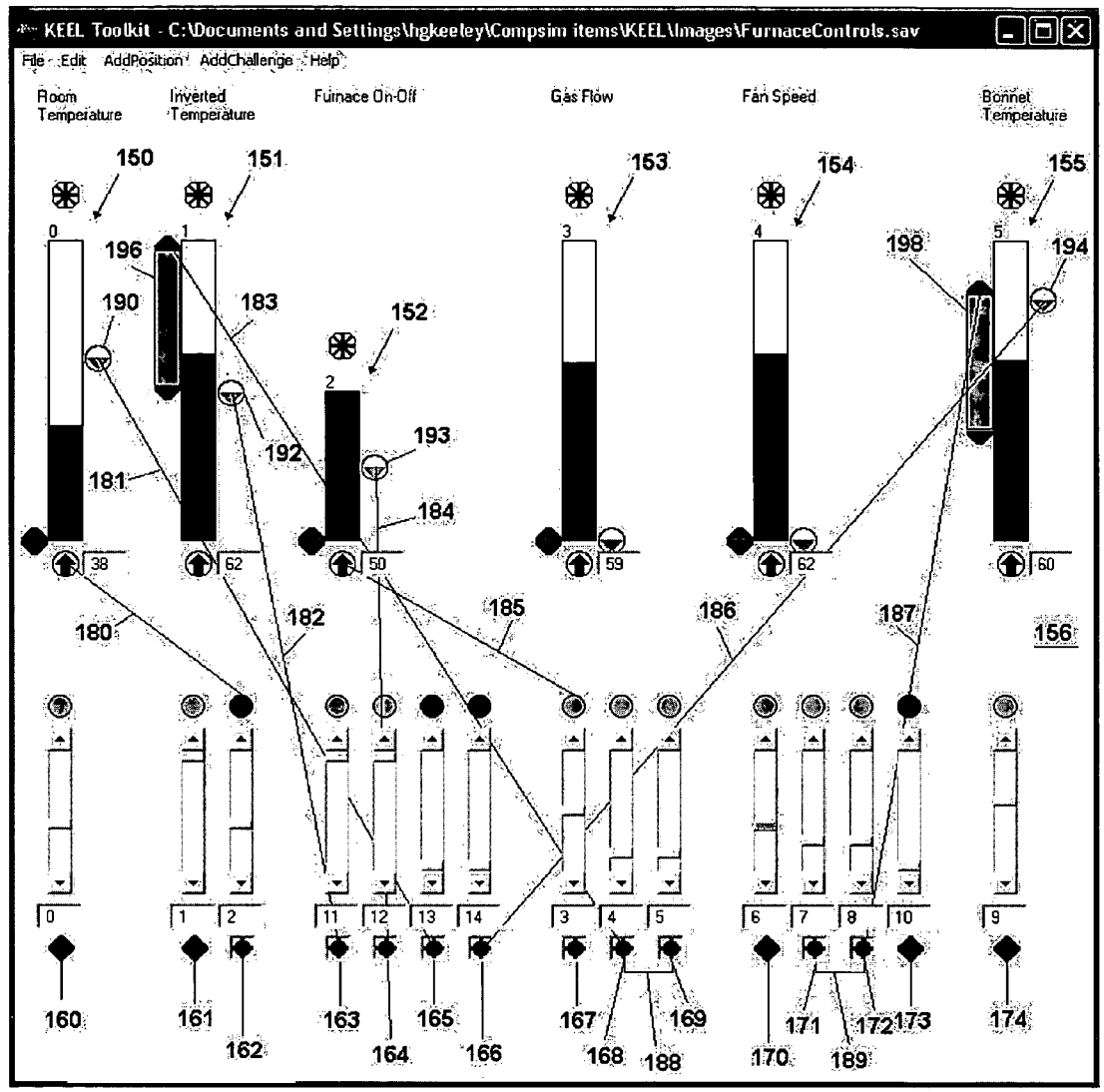
FIG. 12 provides a view of the main programming screen of the graphical programming interface of the present invention illustrating a sample program for controlling a furnace in which the gas flow and fan speed are controlled in accordance with room temperature and bonnet temperature and more specifically showing six positions and fifteen arguments having a large variety of linkages.

Referring now to FIG. 12, the furnace control program 156 includes six positions 150-155, fifteen arguments 160-174 and ten linkages 180-189. The position 150 reflects room temperature within the input range as provided at argument 160 as the primary system input. The position 151 reflects "inverted" room temperature as transferred from position 150 through objecting argument 162. As room temperature goes down the modified value of position 151 goes up thereby allowing the functionality of threshold 192 and clipper window 196 to be properly enabled. The position 152 acts as an on-off switch for the furnace. When the temperature falls and the inverted temperature rises above the set point of the threshold 192 the furnace is turned on through the action of linkage 182 which drives the argument 163 to full value and position modified value of position 152 to its full value of 50 as scaled by the fixed importance of position 152. The position 153 is latched "on" or at full value by the linkage 184 from the threshold 193 to the argument 164 which drives the position 153 itself. Even if the modified value of the position 151 falls below the threshold 192 thereby dropping the value of the argument 163 to zero the position 152 will stay at full value due to the threshold 193 driving the argument 164. The modified value of the position 152 can only be "reset" by the action of the linkage 181 driving the objecting argument 165 to full value when the modified value of position 150 (reflecting room temperature) rises above the threshold 190. The furnace is thereupon turned off as the modified value of position 152 is driven to zero. Position 153 represents the volume of gas flow to be supplied to the burner of the furnace and is controlled by linkages 185 and 183. Linkage 185 operates to apply the modified value of position 152 to argument 167 that provides a minimum value of 50 to the gas flow whenever the furnace is turned on and the position 152 is accordingly at full value. Linkage 183 operates to apply the count value of clipper window 196 of position 151 to argument 168 which augments the gas flow as the room temperature falls and the inverted temperature rises within the range above the lower limit of the clipper 196. Arguments 168 and 169 are connected together by linkage 188 whereby the value of argument 168 drives argument 169 thereby increasing the contribution of the clipper count value to the modified value of the position 153 and further increasing the gas flow. Position 154 represents the speed of the furnace fan and is controlled by the values of arguments 170 and 173 and the linkage 187 which drives arguments 171 and 172. Argument 170 is manually set to a fixed value to provide for a minimum fan speed 18 to provide for continuous ventilation unless the fan is manually turned off by supply of a full value input at objecting argument 173. Linkage 187 operates to apply the count value of clipper window 198 of position 155 to argument 172 which augments the fan speed to provide more cooling and heat transfer as the furnace bonnet temperature which is input at argument 174 and represented by the modified value of position 155 rises within the range above the lower limit of the clipper window 198. Arguments 171 and 172 are connected together by linkage 189 whereby the value of argument 172 drives argument 171 thereby increasing the contribution of the clipper count value to the modified value of the position 154 and further increasing the fan speed. The threshold 194 for position 155 is connected by linkage 186 to objecting argument 166 of position 152. The set point of the threshold is adjusted to reflect the maximum safe operating temperature for the furnace. If the threshold 194 is exceeded by the modified value of position 155 representing the furnace bonnet temperature the threshold 194 and linkage 186 operate to drive the objecting argument 166 to full value and drive the modified value of position 152 to zero thereby shutting off the furnace except for the operation of the fan at minimum ventilation speed.

The graphical programming interface 10 allows for the efficient development of effective software programs using a highly visual programming approach. However, the interface is only one part of the software system of the present invention. As positions, arguments and linkages and other graphical artifacts are configured on the interface screen programming code implementing the application being specified is automatically generated by the computer running the development system. This code is fully functional and enabled to run in the background. The code is coupled to the application programming interface and the graphical artifacts shown on the development screen so the application can be tested as it is being developed. Arguments can be manually manipulated to simulate different levels of inputs and the results can be immediately seen in turns of position values and the operation of the application can be visually demonstrated as has been shown with many of the program examples already given. After program development is complete the code can be reconfigured by dropping its connections to the graphical interface adapting it to a container so it can be ported to a different system and adding the glue logic necessary for it to coupled to inputs and outputs and run as an independent software program.

Figure 13:
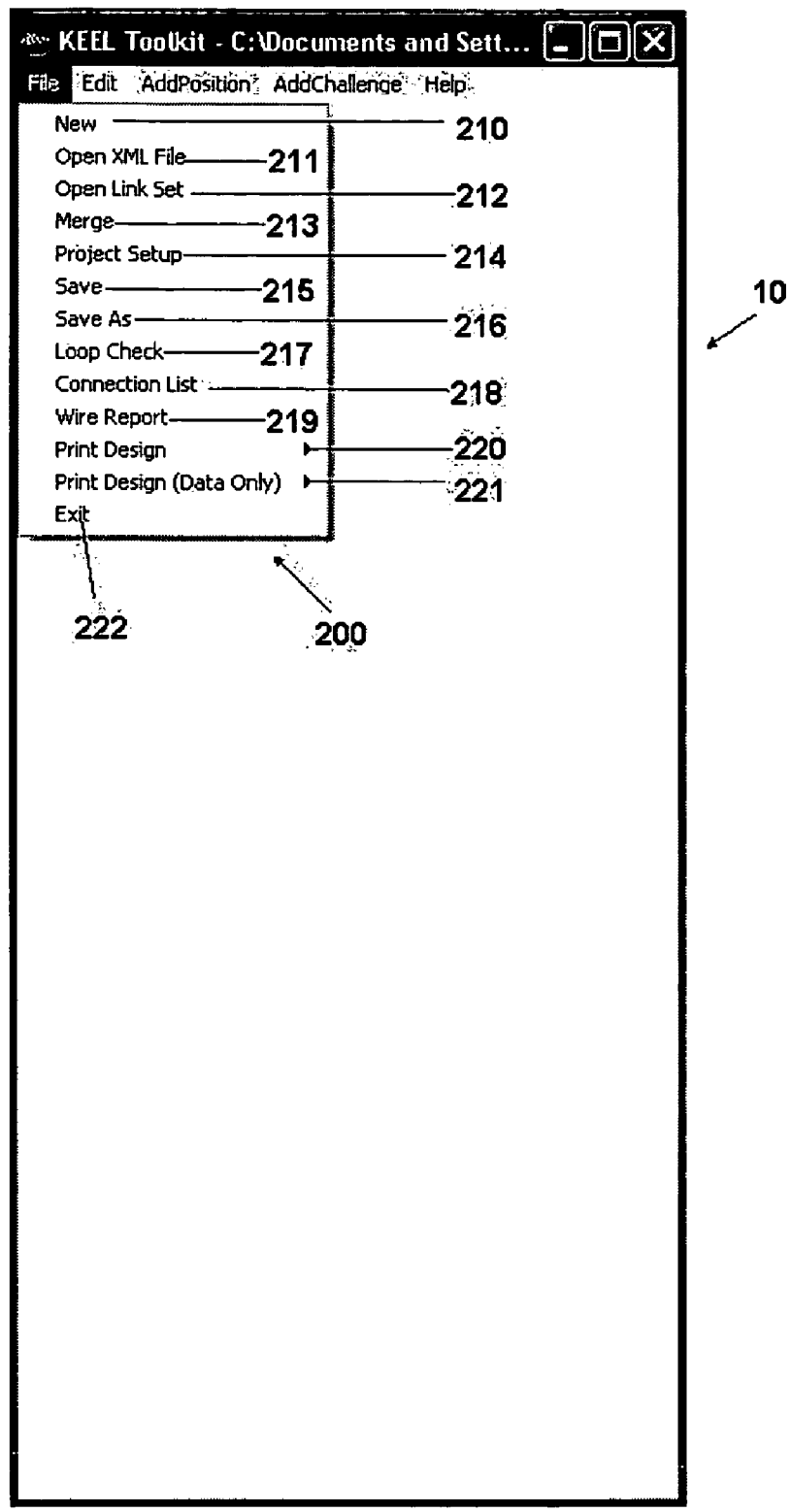
FIG. 13 provides a screen view of the main File menu for the graphical programming interface of the present invention showing the thirteen menu items available under that menu.
Figure 14:
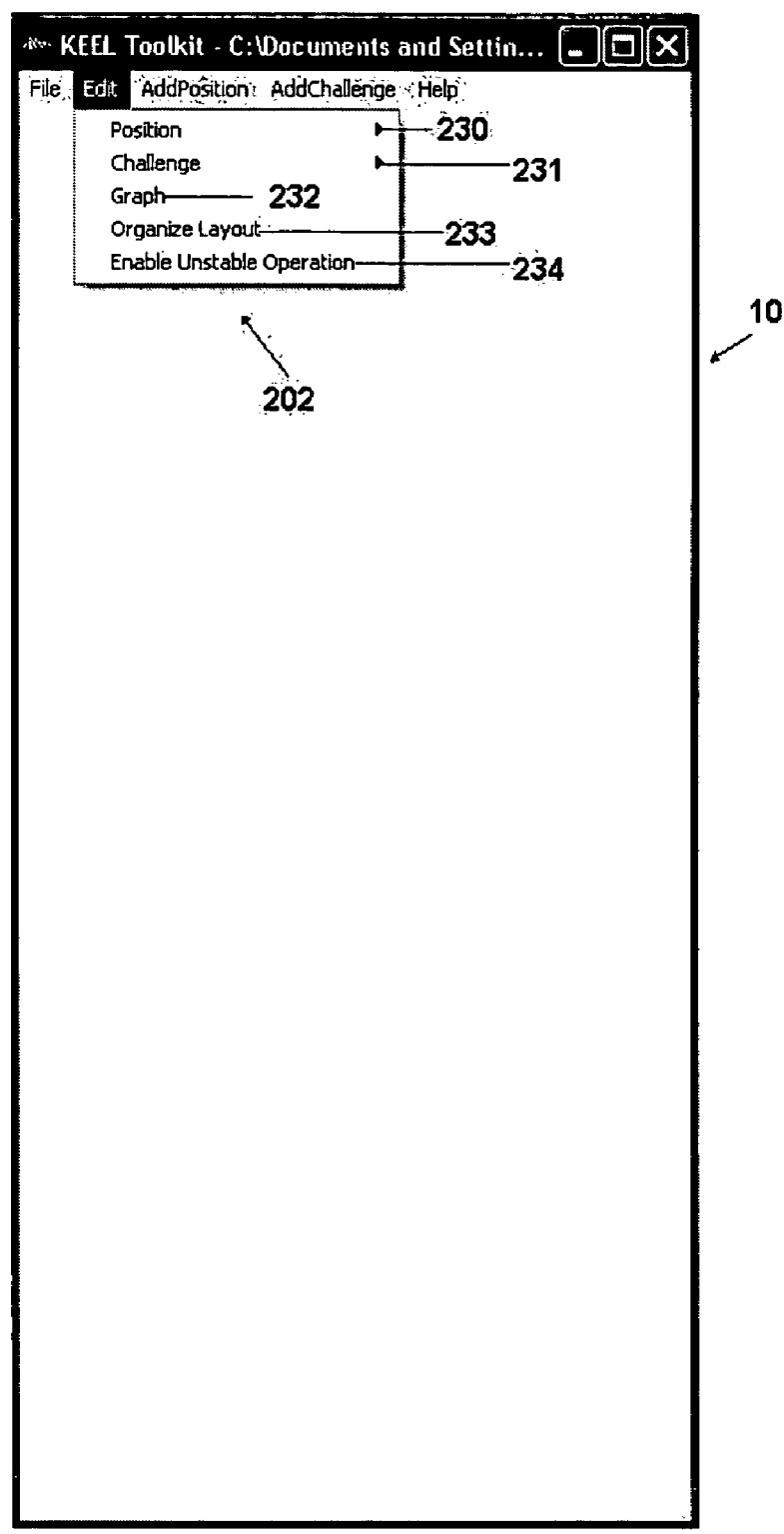
FIG. 14 provides a screen view of the main Edit menu for the graphical programming interface of the present invention showing the five menu items available under that menu.

Referring now to FIGS. 13 and 14, the File and the Edit buttons on the main development program toolbar open menus 200 and 202 which present several useful menu items any one of which may be selected by highlighting and clicking on the items with the cursor. The New item 210 allows programs to be started under a new name. The Open XML File and Open Link Set items 211 and 212 allow different types of existing program files to be opened for further work. The Merge item 213 opens a window which enables another existing program to be combined or merged with the current program at a point after a specific selected position. The Project Setup item 214 opens a window having text boxes for appending a title, author, and description to the program file. The Save and Save As items 215 and 216 perform their traditional functions in saving program files under existing or new names. The Loop Check item 217 initiates a manual check of the design loops in the current application. The Connection List item 218 invokes a function which displays and allows a Connection Chart to be printed out showing a list of positions and their respective supporting and objecting arguments for the current application under development. The Wire Report item 219 invokes a function which displays and allows a Wire Report to be printed out showing a list of categories of linkages and the specifics for such linkages existing in the current application under development. The Print Design item 220 opens a small window allowing a choice between Visual Basic and C Programming Language menu items and then according to this selection will display and allow print out of a file listing the program code for the current software application which is under development. The Print Design (Data Only) item 221 opens a small window allowing a choice between Visual Basic and C Programming Language and then according to this selection will display and allow print out of the data portion of the program code for the current software application under development. The Exit item 222 exits the development environment. The Position item 230 opens a small window allowing a choice between Adding, Editing and Deleting menu items which allow for new positions to be added or existing positions edited in accordance with the window 13 of FIG. 2 or for selected positions to be deleted. The Challenge item 231 opens a small window allowing a choice between Adding, Editing and Deleting menu items which allow for new arguments to be added or existing arguments edited in accordance with the window 53 of FIG. 3 or for a selected argument to be deleted. The Graph item 232 opens a window listing all positions on one side and all arguments on the other for the program under development. After a specific position and a specific argument are selected an execute button on the window invokes a program execution and plotting function which runs through the full range of argument values and calculates the corresponding position values and displays a graph of the position value as a function of the argument value. This graph may then be printed out by clicking on a print button associated with the display window for the position-argument graph. This plotting function enhances the ability of the program to be tested and debugged during development. The Organize Layout item 233 opens a window listing positions in the current program under development and allowing different positions to be deselected in accordance with check boxes. The deselected positions are hidden from view and are not displayed in the programming interface window which can assist in avoiding screen clutter. The Enable Unstable Operation item 234 allows the developer to override the warnings illustrated in FIG. 10 with respect to feedback and possible unstable operation of the program.

Figure 33:
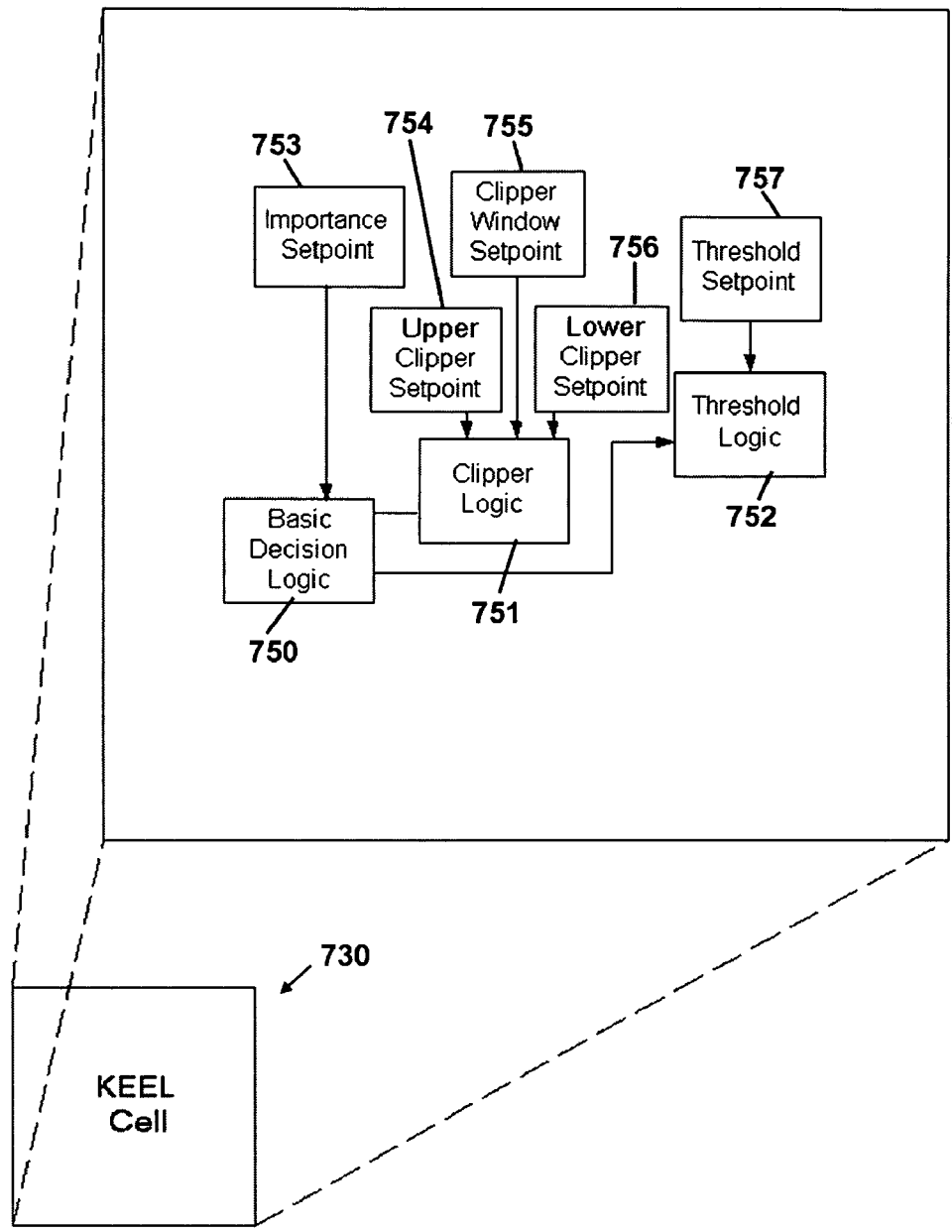
FIG. 33 provides an exploded view of a KEEL Cell showing its internal logic as functional blocks.

Referring now again to FIG. 34, the graph 570 also illustrates the output and operation of the plotting function which may be activated using Graph item 232 of menu 200. In this case the modified value of position 510 which serves as the output signal of the system 500 of FIG. 33 is plotted against the value of the argument 511 which serves as the input to the system. After the execute button is engaged the program runs through the full range of argument values and calculates the corresponding position values and displays the graph 570 of the position value as a function of the argument value. This graph 570 may then be printed out by clicking on a print button associated with the display window for the position-argument graph to provide the graphical result shown in the figure.

Figure 15:
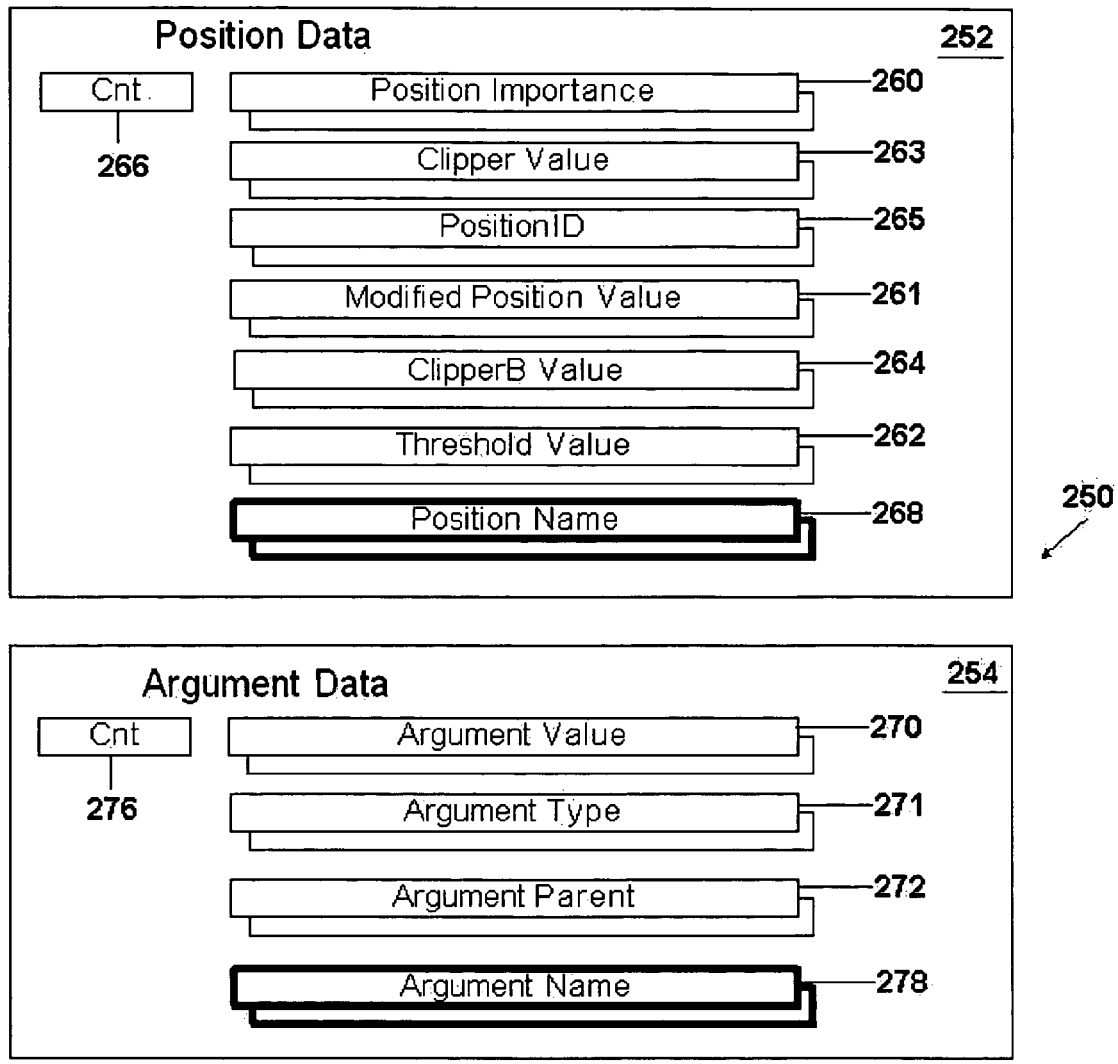
FIG. 15 provides a diagrammatic illustration of the data structure and data tables for the position and argument related data in accordance with the computer programs of the present invention.

Referring now to FIG. 15, the data memory structures 250 underlying the positions and arguments forming the basic tree structure part of the software programs which may be developed using the programming interface 10 are shown. Position data table 252 specifies seven data arrays 260-265 and 268 containing data relating to each position as developed and specified on screen with the programming interface. Argument data table 254 specifies four data arrays 270-272 and 278 containing data relating to each argument as developed and specified on screen with the programming interface. The arrays 260, 261, 262, 263, 264 and 265 represent one dimensional arrays that contain data elements relating to position importance (Position Importance), modified position value (Modified Position Value), threshold set point (Threshold Value), clipper upper limit set point (Clipper Value), clipper lower limit set point (ClipperB Value), and position ID, respectively. The count array 266 tracks the number of positions in a program. The count values index all of the data elements and identify them with the positions to which they belong. The data elements for position importance, modified position value, threshold set point, clipper upper limit set point, clipper lower limit set point have the functions and characteristics previously described. The position ID data array 265 provides convenient entries by which arguments can be efficiently linked to the different positions with which they are associated. The position name data array 268 stores the name given each position for display on screen as part of the programming interface. The arrays 270, 271 and 272 represent one-dimensional arrays that contain data elements relating to argument value, argument type (supporting or objecting) and the argument parent (its parent position), respectively. The count array 276 tracks the number of arguments in a program and indexes all of the data elements to the argument to which they belong. The data elements for argument value and argument type have the functions and characteristics previously described. The argument parent array 272 provides convenient entries of the Position IDs of the positions which the arguments are associated with by which the arguments can be efficiently linked with their positions. The argument name data array 278 stores the name given each argument for display on the screen as part of the programming interface.

Figure 16:
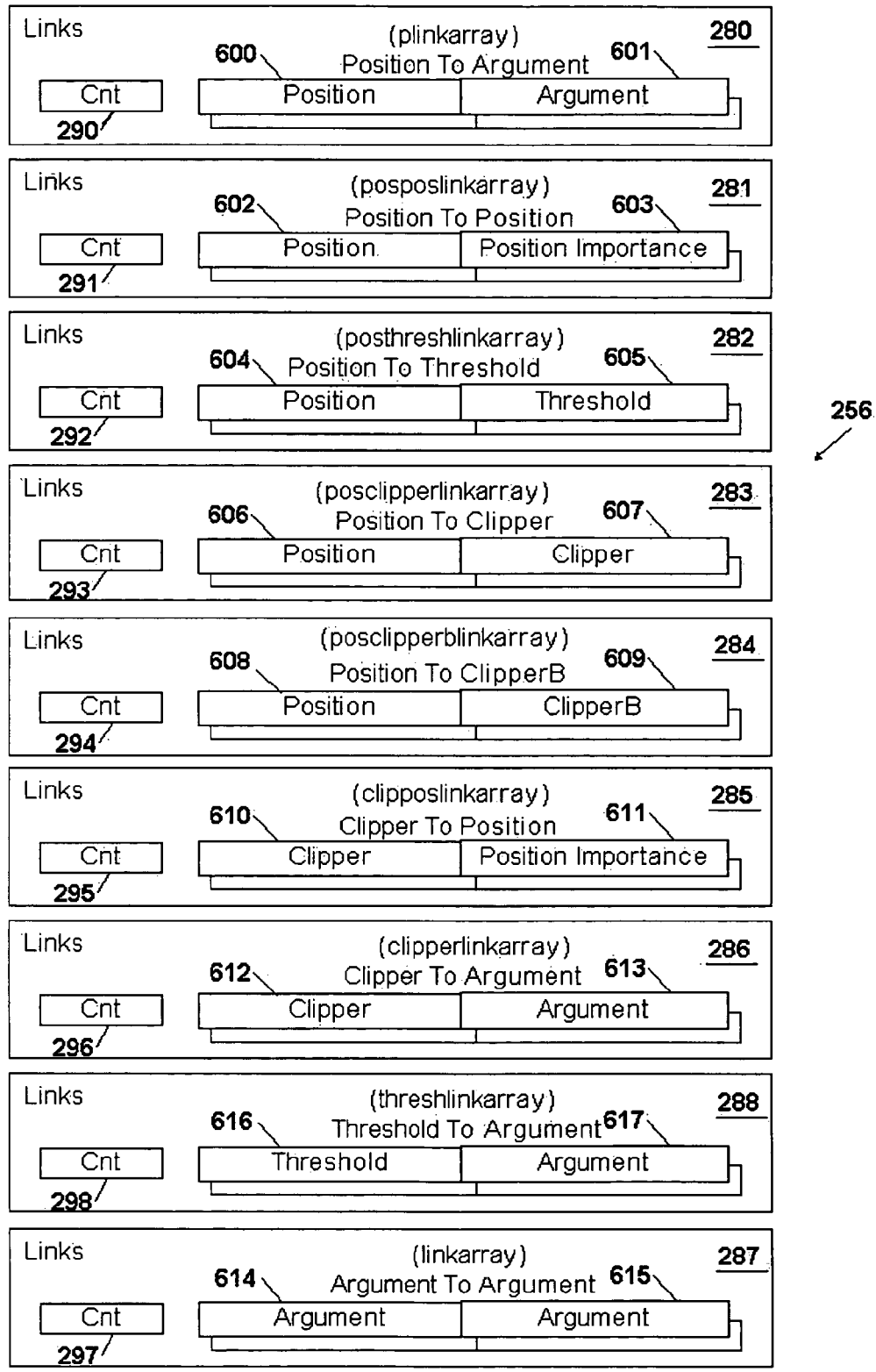
FIG. 16 provides a diagrammatic illustration of the data structure and data arrays for linkage related data in accordance with the computer programs of the present invention.

Referring now to FIG. 16, the data memory structures 256 underlying the connections or linkages part of the software programs that may be developed using the programming interface 10 are shown. The data arrays 280-288 represent two-dimensional arrays that contain source and destination data elements 600-617 specifying the source and destination positions and arguments related to the connection points for the linkages. Data array 280 contains modified position to argument connection data. Data array 281 contains modified position to position importance connection data. Data array 282 contains modified position to threshold (set point) connection data. Data array 283 contains modified position to clipper upper limit (set point) connection data. Data array 284 contains modified position to clipper lower limit (set point) connection data. Data array 285 contains clipper window to position importance connection data. Data array 286 contains clipper window to argument connection data. Data array 287 contains argument to argument connection data. Data array 288 contains threshold to argument connection data. As previously shown the linkages can be used to form a linkage system or web which defines and enables complex functionality in conjunction with the tree structure of positions and arguments.

Figure 17:
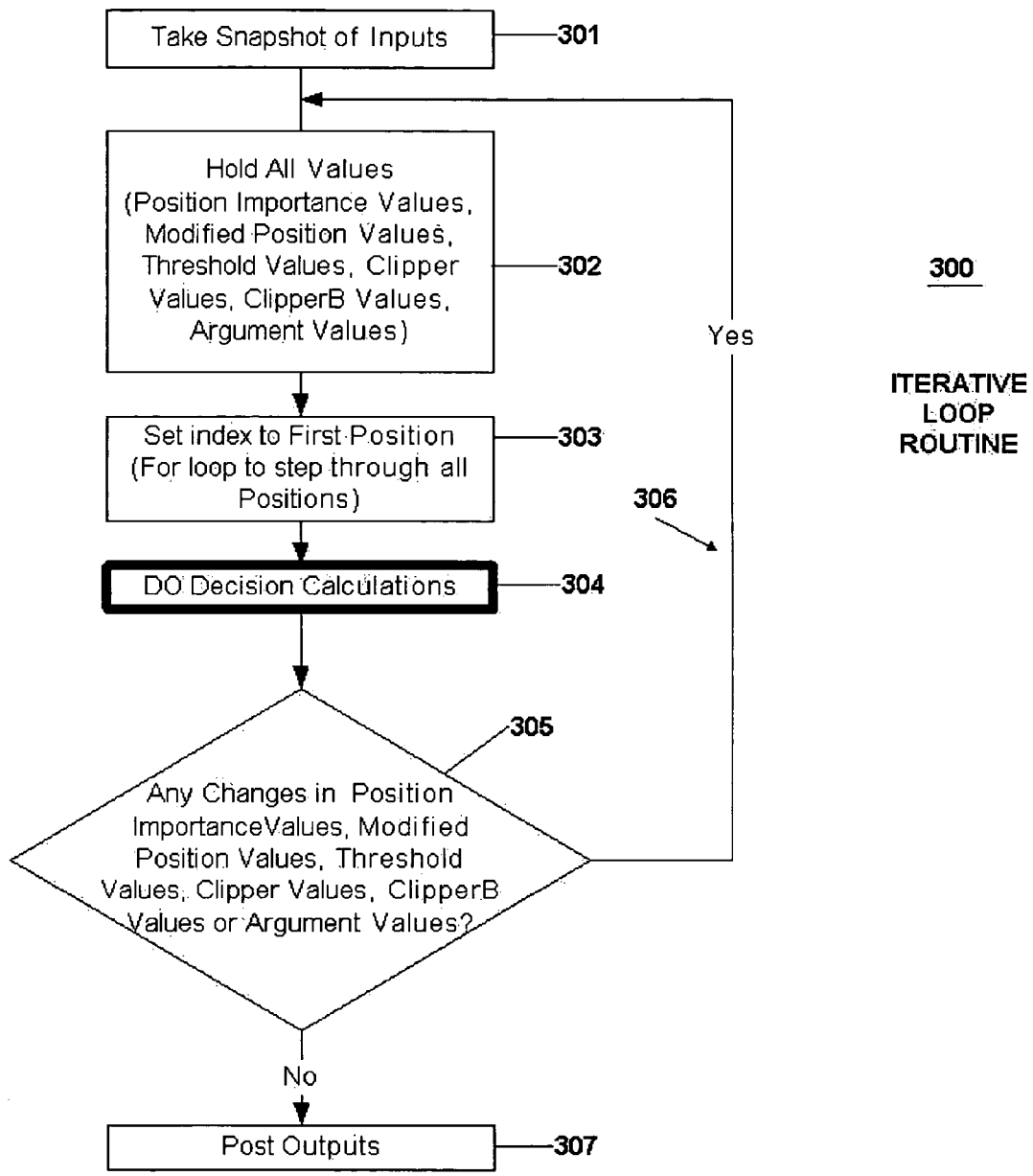
FIG. 17 provides a flowchart showing the Iterative Loop Routine by which the software program of the present invention iterates to find a solution for all importance values, modified position values, threshold set points, clipper upper and lower limit set points and argument values.

Referring now to FIG. 17, the flowchart 300 shows the main Iterative Loop Routine of the execution engine by which the software program of the present invention settles on solutions for all importance (position) values, modified position values, threshold set points, clipper upper and lower limit set points and argument values. In step 301 new values for all outside inputs to the arguments are accepted. In step 302 all importance (position) values, modified position values, threshold set points, clipper upper and lower limit set points and argument values are saved to memory. In step 303 the index for the main program loop 306 is set to point to the first position. In step 304 the program enters the Do Decision Routine 310 (FIG. 18) which thereafter leads to the calculation routines representing the primary data processing elements of the program. When the Do Decisions Routine 310 is completed the program returns to decision step 305 in which it compares all newly calculated importance (position) values, modified position values, threshold set points, clipper upper and lower limit set points and argument values to the importance (position) values, modified position values, threshold set points, clipper upper and lower limit set points and argument values previously saved to memory in step 302. If there are any differences the program returns back along loop 306 to step 302 and restarts all calculations for the importance (position) values, modified position values, threshold set points, clipper upper and lower limit set points and argument values. The execution engine continues calculating and recalculating these basic values in order to converge on stable values for which no further changes are detected in step 305 in which event the program moves to step 307 and the final outputs are posted for all values and set points.

Figure 18:
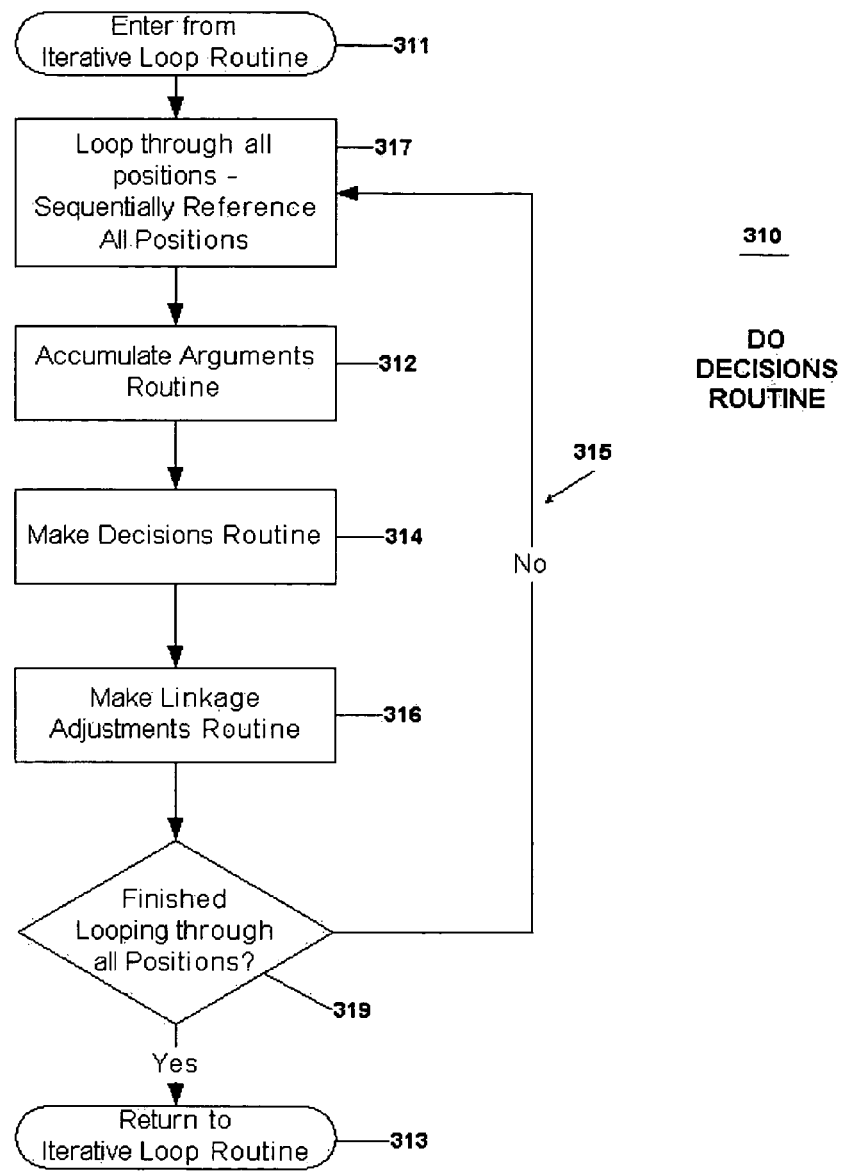
FIG. 18 provides a flowchart for the Do Decisions Routine which includes three major routines for accumulating arguments, making decisions and adjusting for linkages.

Referring now to FIG. 18, the Do Decisions Routine 310 is entered from the Iterative Loop Routine at step 311, returns to the Iterative Loop Routine at step 313 and includes three major subroutines 312, 314 and 316 for accumulating arguments, making decisions and adjusting for linkages. These subroutines are encompassed by a large loop 315 which begins at step 317 and ends at decision step 319. The loop 315 runs through all positions by sequentially indexing to each position so that the subroutines 312, 314 and 316 are run for all positions present on the graphical interface and in the program.

Figure 19:
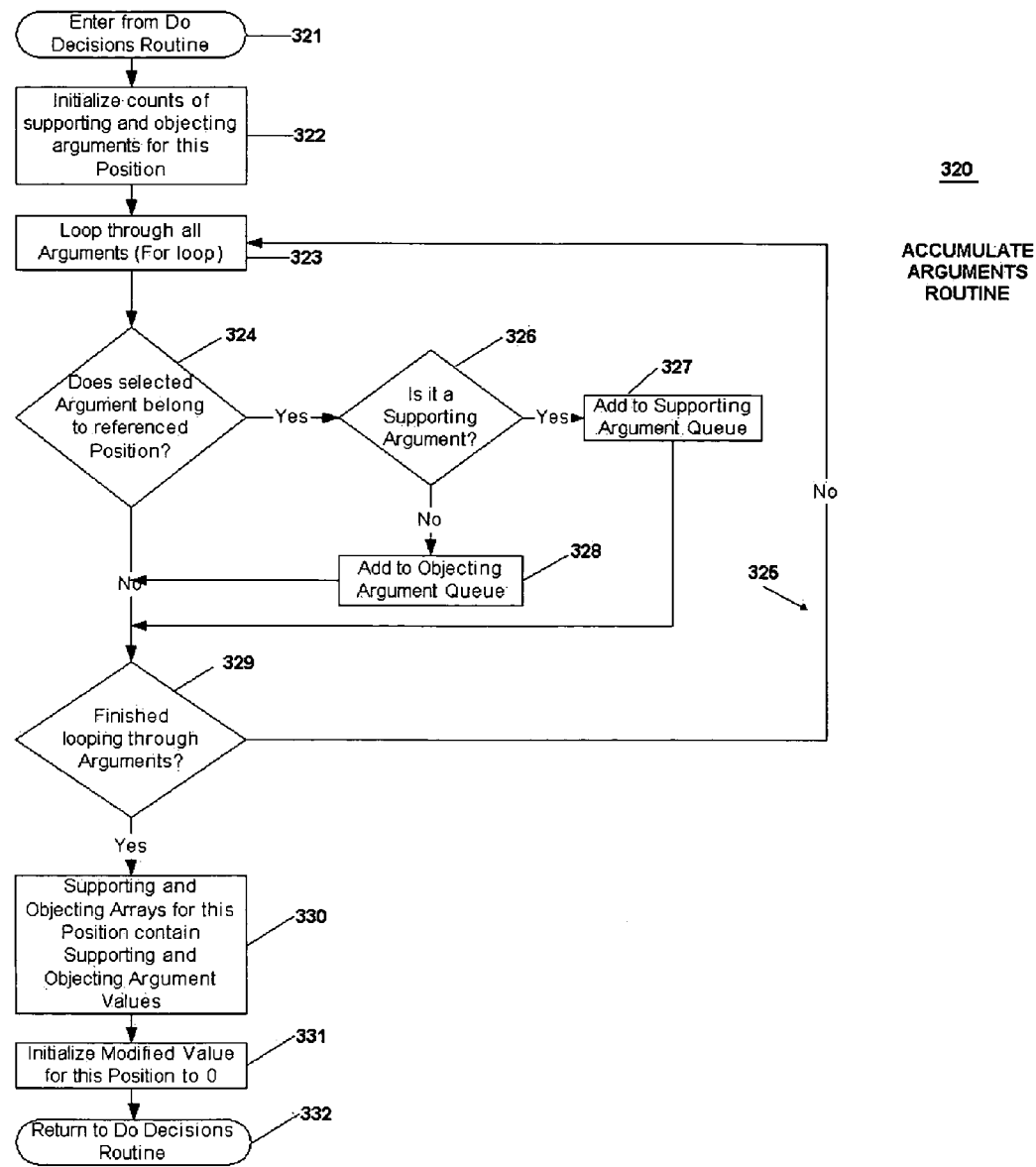
FIG. 19 provides a flowchart for the Accumulate Arguments Routine which includes a loop for sorting through all the arguments, identifying the arguments for the selected position and building a queue of supporting and a queue of objecting arguments which apply to that position.

Referring now to FIG. 19, the Accumulate Arguments Routine 320 is entered from the Do Decisions Routine 310 at step 321, returns to the Do Decisions Routine at step 332 and includes a loop 325 for sorting through all the arguments, identifying the arguments belonging to the selected position (see step 317 in FIG. 18) and building a queue of supporting and a queue of objecting arguments which apply to that position. Supporting and objecting argument counts are initialized in step 322 and the loop 325 is entered at step 323. At decision step 324 arguments belonging to the selected position are identified and when identified control is passed to decision step 326. In decision step 326 the arguments are parsed according to whether they are supporting or objecting arguments. If they are supporting arguments the routine passes to step 327 where a queue of supporting arguments is built. If they are objecting arguments the routine passes to step 328 where a queue of objecting arguments is built. In the event the argument is not identified as for the selected position in step 324 or after processing in steps 327 and 328, decision step 329 for loop 325 is entered. If the last argument has been processed by the loop 325, the routine passes to step 330. In the event the last argument has not been processed the routine returns to step 323 where the next argument is selected. In step 330 the values of the supporting and objecting arguments in the queues are collected and thereafter the modified position value is initialized to zero in accordance with step 331 in preparation for the Make Decisions Routine.

Figure 20:
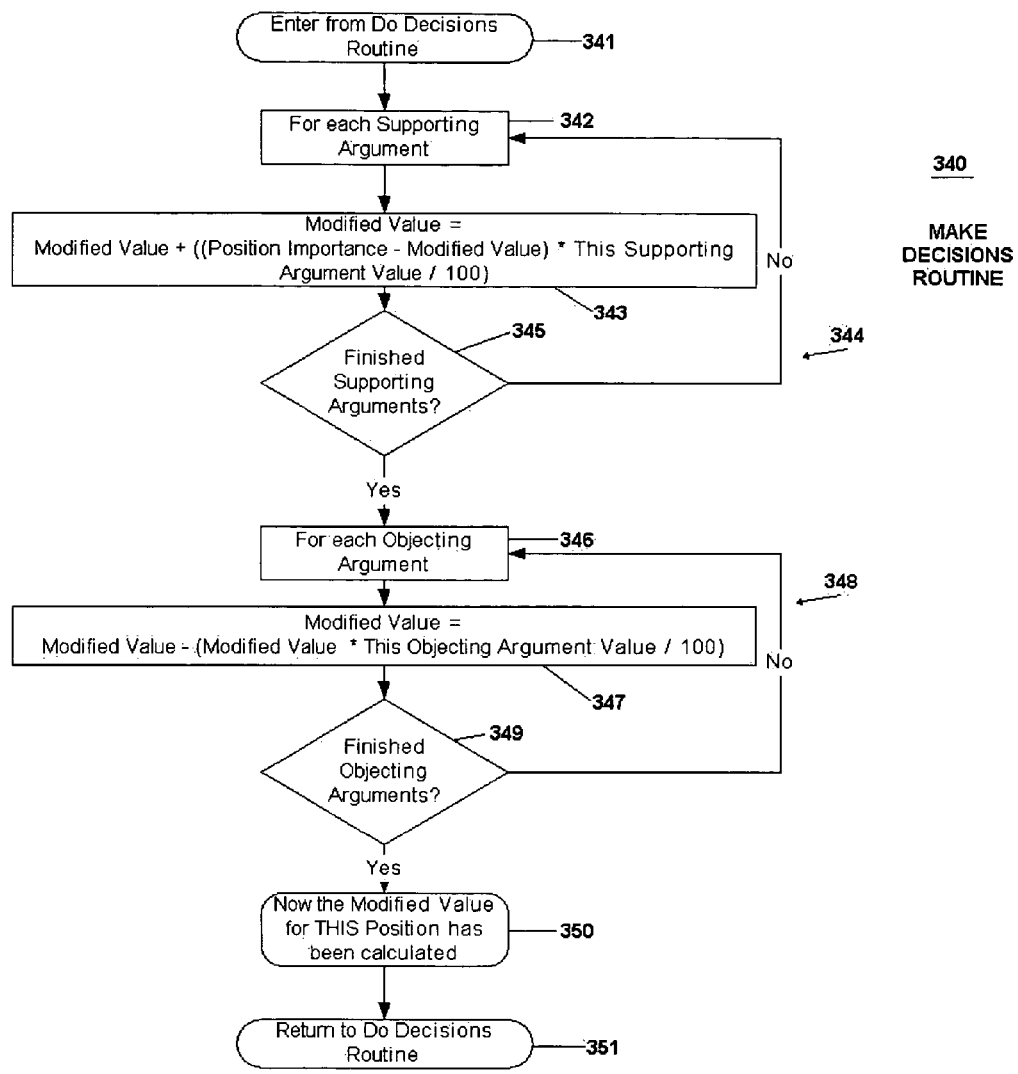
FIG. 20 provides a flowchart for the Make Decisions Routine which includes a supporting argument evaluation loop and an objecting argument evaluation loop.

Referring now to FIG. 20, the Make Decisions Routine 340 is entered from the Do Decisions Routine 310 at step 341, returns to the Do Decisions Routine at step 351 and includes a supporting argument evaluation loop 344 and an objecting argument evaluation loop 348. In loop 344 each supporting argument is sequentially referenced in step 342 and the modified position value is successively recalculated in accordance with the formula of step 343. At decision step 345 the routine passes to the objecting argument evaluation loop 348 if all supporting arguments have been processed or otherwise returns to step 342 to select and process another supporting argument. In accordance with the loop 348 each objecting argument is sequentially referenced in step 346 and the modified position value is successively recalculated accordance with the formula of step 347. At decision step 349 the routine passes to step 350 if all supporting arguments have been processed or otherwise returns to step 346 to select and process another objecting argument. In step 350 the program confirms that a final position modified value output has been calculated and saves this value to memory.

Figure 21:
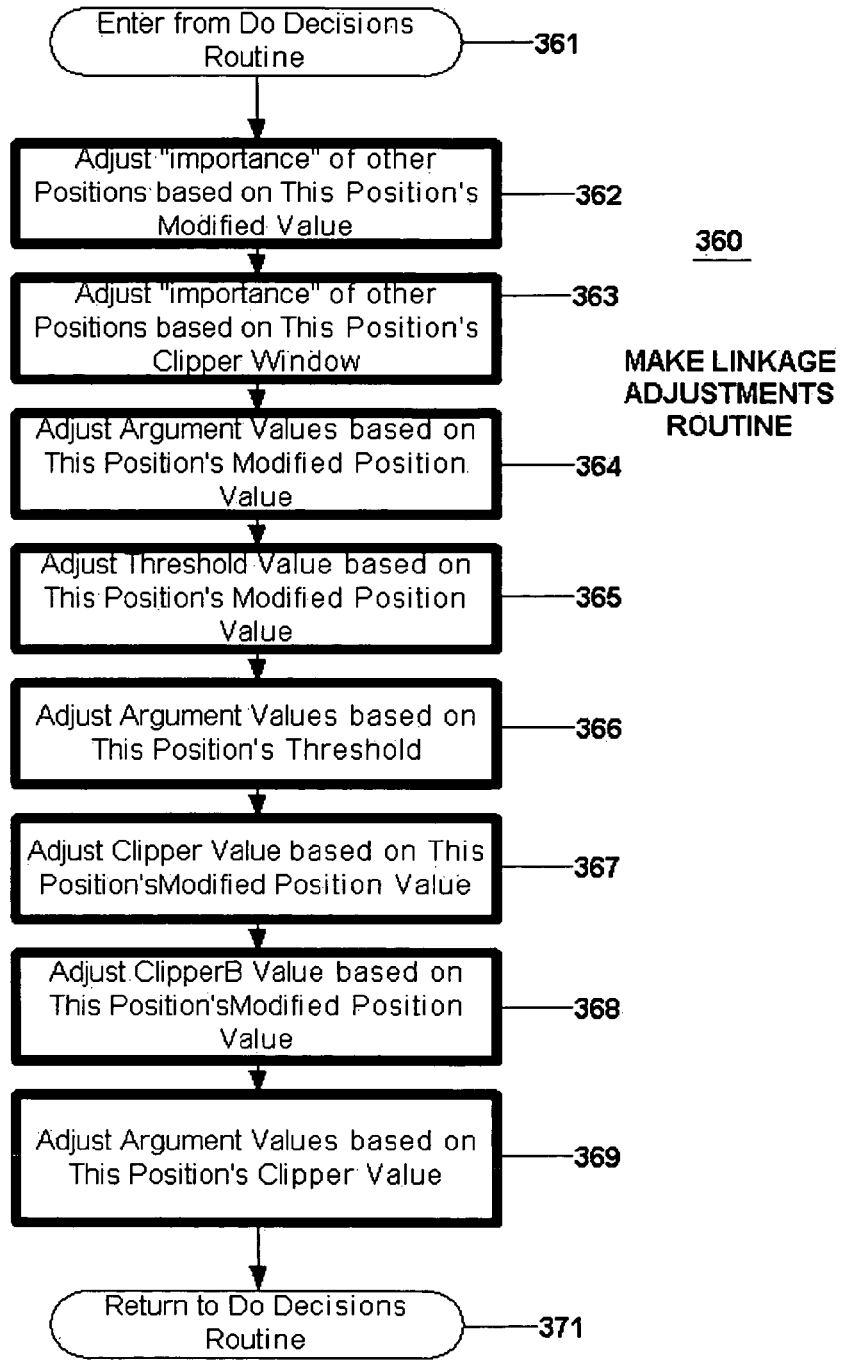
FIG. 21 provides a flowchart for the Make Linkage Adjustments Routine which includes a series of eight code segments for adjusting various position, argument, threshold and clipper values in accordance with the various linkages specified in the application program and the new modified value of the selected position as calculated in the Make Decisions Routine.

Referring now to FIG. 21, the Make Linkage Adjustments Routine 360 is entered from the Do Decisions Routine 310 at step 361, returns to the Do Decisions Routine at step 371 and includes a series of eight steps 362-369 corresponding to eight code segments for adjusting various position, argument, threshold and clipper values in accordance with the various linkages specified in the application program and the new modified value (see step 350 in FIG. 20) for the selected position (see step 317 in FIG. 18) as previously calculated in the Make Decisions Routine. The code segments 362-369 reflect the different kinds of linkages which may be included in application programs in accordance with the application programming interface 10.

Figure 22:
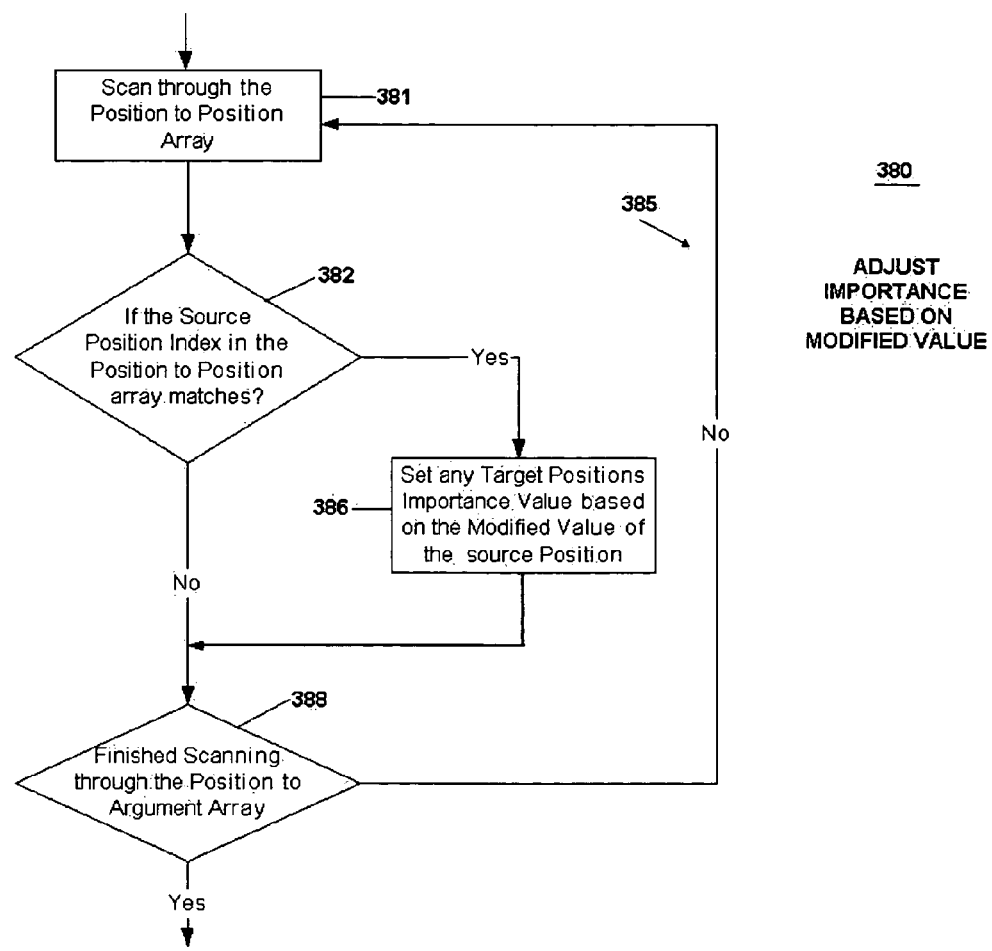
FIG. 22 provides a flowchart for the Adjust Importance Based On Modified Value Code Segment which is entered from the Make Linkage Adjustments Routine and includes a loop for sequentially running through or scanning the position (modified value) to position importance array and finding the positions affected by any changes in the modified value of the selected position and resetting the position importance of those positions.

Referring now to FIG. 22, the Adjust Importance Based On Modified Value Code Segment 380 is entered from the Make Linkage Adjustments Routine 360 at step 381, moves to the next code segment shown in the Make Linkage Adjustments Routine at step 363 from step 388 and includes a loop 385 for sequentially running through or scanning the position (modified value) to position importance array 281 (FIG. 16) and finding the positions affected by any changes in the modified value of the selected position and resetting the position importance of those positions. In decision step 382 the program checks for matches between source position entries in the array 281 and the index of the currently selected position. When a match is found the program moves to step 386 and resets the position importance of the affected position. In the event no match is found in step 382 the program passes to decision step 388 at which a check is made to determine if the entire position to position importance array has been scanned. If more entries remain to be scanned the program returns to step 381 and a new entry is identified, or if all entries have been scanned the program passes to the next code segment.

Figure 23:
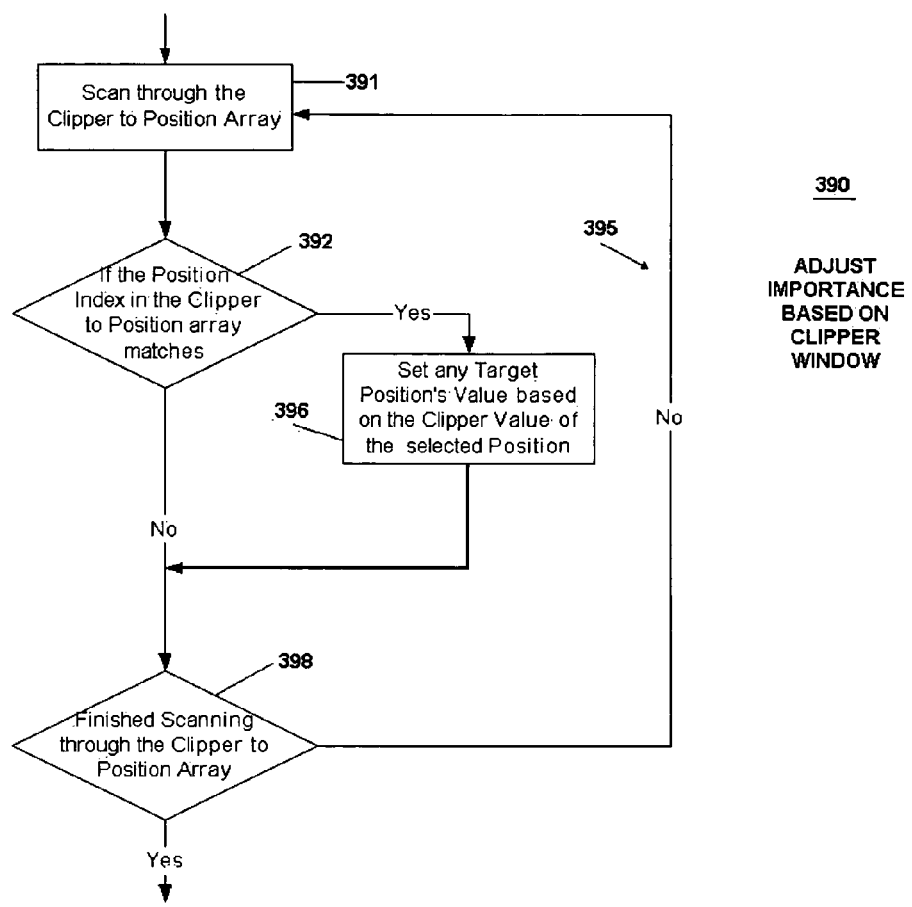
FIG. 23 provides a flowchart for the Adjust Importance Based On Clipper Window Code Segment which is entered from the Adjust Importance Based On Modified Value Code Segment and includes a loop for sequentially running through or scanning the clipper to position importance array and finding the positions affected by any changes in the clipper window value of the selected position and resetting the position importance of those positions.

Referring now to FIG. 23, the Adjust Importance Based On Clipper Window Code Segment 390 is entered from the Adjust Importance Based On Modified Value Code Segment 380 at step 391, moves to the next code segment shown in the Make Linkage Adjustments Routine at step 364 from step 398 and includes a loop 395 for sequentially running through or scanning the clipper to position importance array 285 (FIG. 16) and finding the positions affected by any changes in the clipper window value of the selected position and resetting the position importance of those positions. In decision step 392 the program checks for matches between source position entries in the array 285 and the index of the currently selected position. When a match is found the program moves to step 396 and resets the position importance of the affected position. In the event no match is found in step 392 the program passes to decision step 398 at which a check is made to determine if the entire position to position importance array has been scanned. If more entries remain to be scanned the program returns to step 391 and a new entry is identified, or if all entries have been scanned the program passes to the next code segment.

Figure 24:
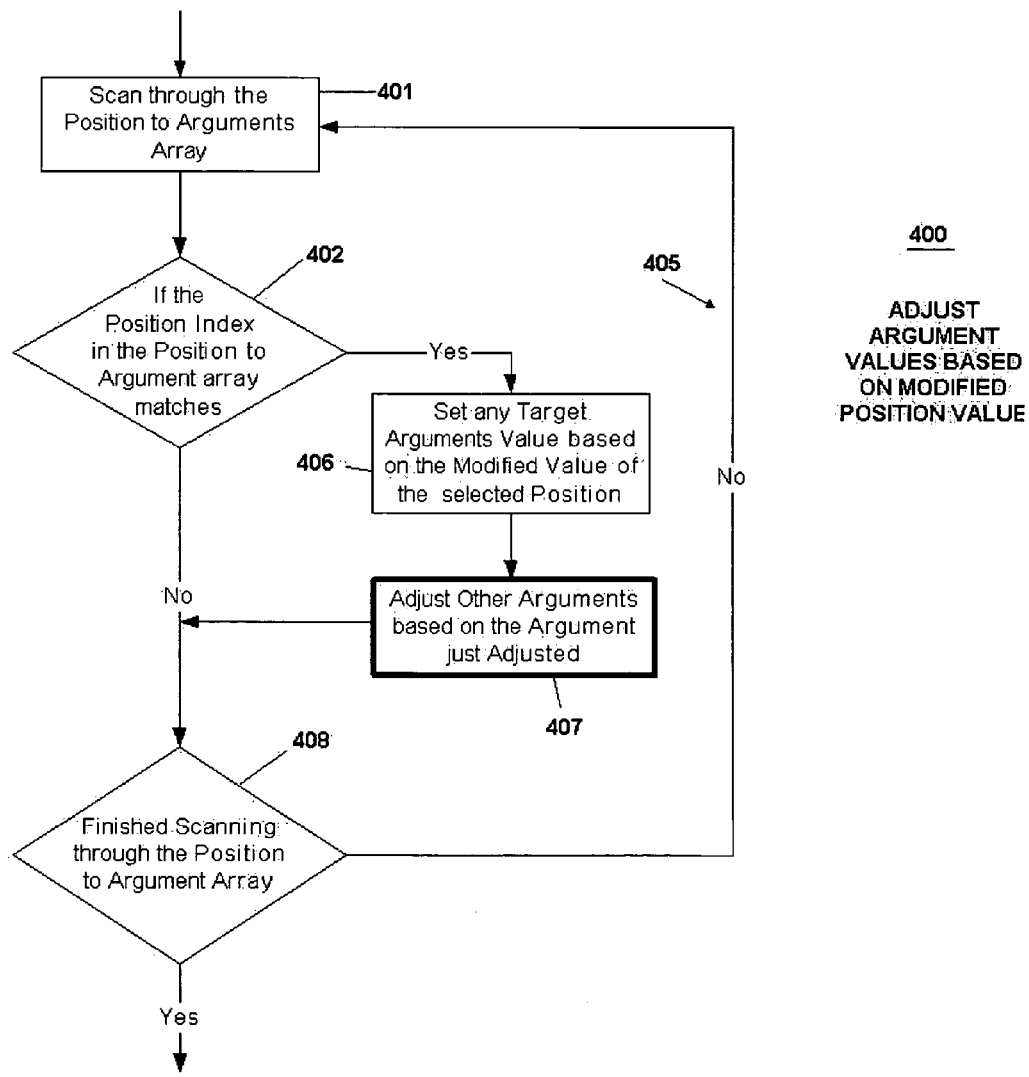
FIG. 24 provides a flowchart for the Adjust Argument Values Based On Modified Position Value Code Segment which is entered from the Adjust Importance Based On Clipper Window Code Segment and includes a loop for sequentially running through or scanning the position (modified value) to argument array and finding the arguments affected by any changes in the modified position value of the selected position and resetting those argument values FIG. 25 provides a flowchart for the Adjust Threshold Based On Modified Position Value Code Segment which is entered from the Adjust Argument Values Based On Modified Position Value Code Segment and includes two nested loops and for sequentially running through all positions and for each position sequentially running through or scanning the position (modified value) to threshold array and finding the thresholds affected by any changes in the modified position values and resetting those thresholds.

Referring now to FIG. 24, the Adjust Argument Values Based On Modified Position Value Code Segment 400 is entered from the Adjust Importance Based On Clipper Window Code Segment 390 at step 401, moves to the next code segment shown in the Make Linkage Adjustments Routine at step 365 from step 408 and includes a loop 405 for sequentially running through or scanning the position (modified value) to argument array 280 (FIG. 16) and finding the arguments affected by any changes in the modified position value of the selected position and resetting those argument values. In decision step 402 the program checks for matches between source position entries in the array 280 and the index of the currently selected position. When a match is found the program moves to step 406 and resets the value of the affected argument and at step 407 enters the Adjust Arguments Routine which will be described later. In the event no match is found in step 402 or after the Adjust Arguments Routine is completed in step 407 the program passes to decision step 408 at which a check is made to determine if the entire position to argument array has been scanned. If more entries remain to be scanned the program returns to step 401 and a new entry is identified, or if all entries have been scanned the program passes to the next code segment.

Figure 25:
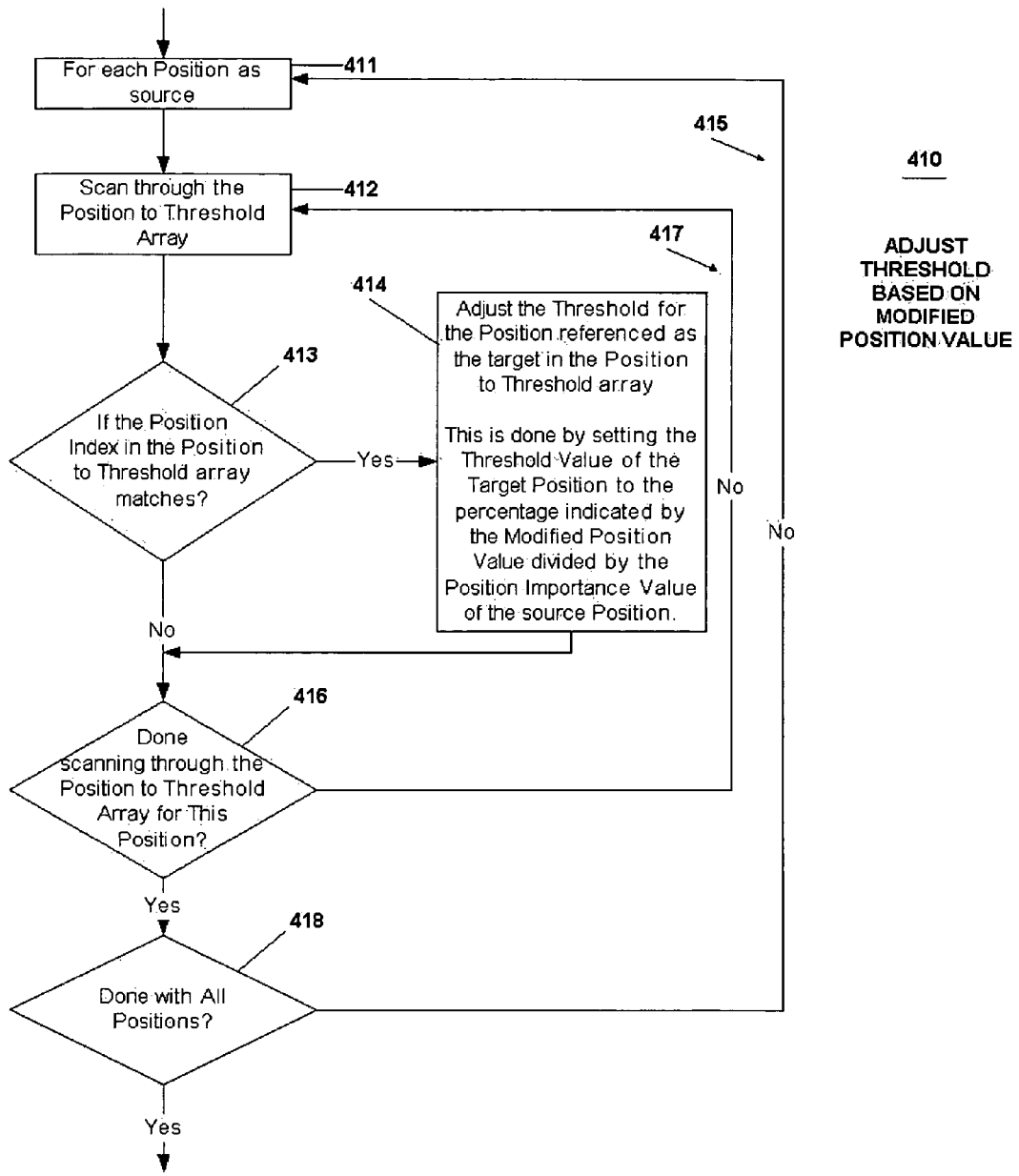

Referring now to FIG. 25, the Adjust Threshold Based On Modified Position Value Code Segment 410 is entered from the Adjust Argument Values Based On Modified Position Value Code Segment 400 at step 411, moves to the next code segment shown in the Make Linkage Adjustments Routine at step 366 from step 418 and includes two nested loops 415 and 417 for sequentially running through all positions and for each position sequentially running through or scanning the (modified) position to threshold array 282 (FIG. 16) and finding the thresholds affected by any changes in the modified position values and resetting those thresholds. In step 411 the program counts through all the positions as a function of the loop 415. In step 412 the program counts through all entries in the position to threshold array and checks for matches between the source position entries in the array 282 and the index of the position currently selected in accordance with the loop 415. When a match is found in decision step 413, the program moves to step 414 and resets and recalculates the value of the threshold set point as a function of the percentage defined by the source modified value over its position importance (full position value). In the event no match is found in step 413 or after the step 414 is completed the program passes to decision step 416 at which a check is made to determine if the entire position to threshold array has been scanned. If more entries remain to be scanned in loop 417, the program returns to step 412 and a new entry is identified or if all entries have been scanned the program passes to step 418 at which a check is made to determine if all the positions have been processed by loop 415. If more positions remain to be processed the program returns to step 411 and a new position entry is identified, or if all entries have been scanned in loop 415 the program passes to the next code segment.

Figure 26:
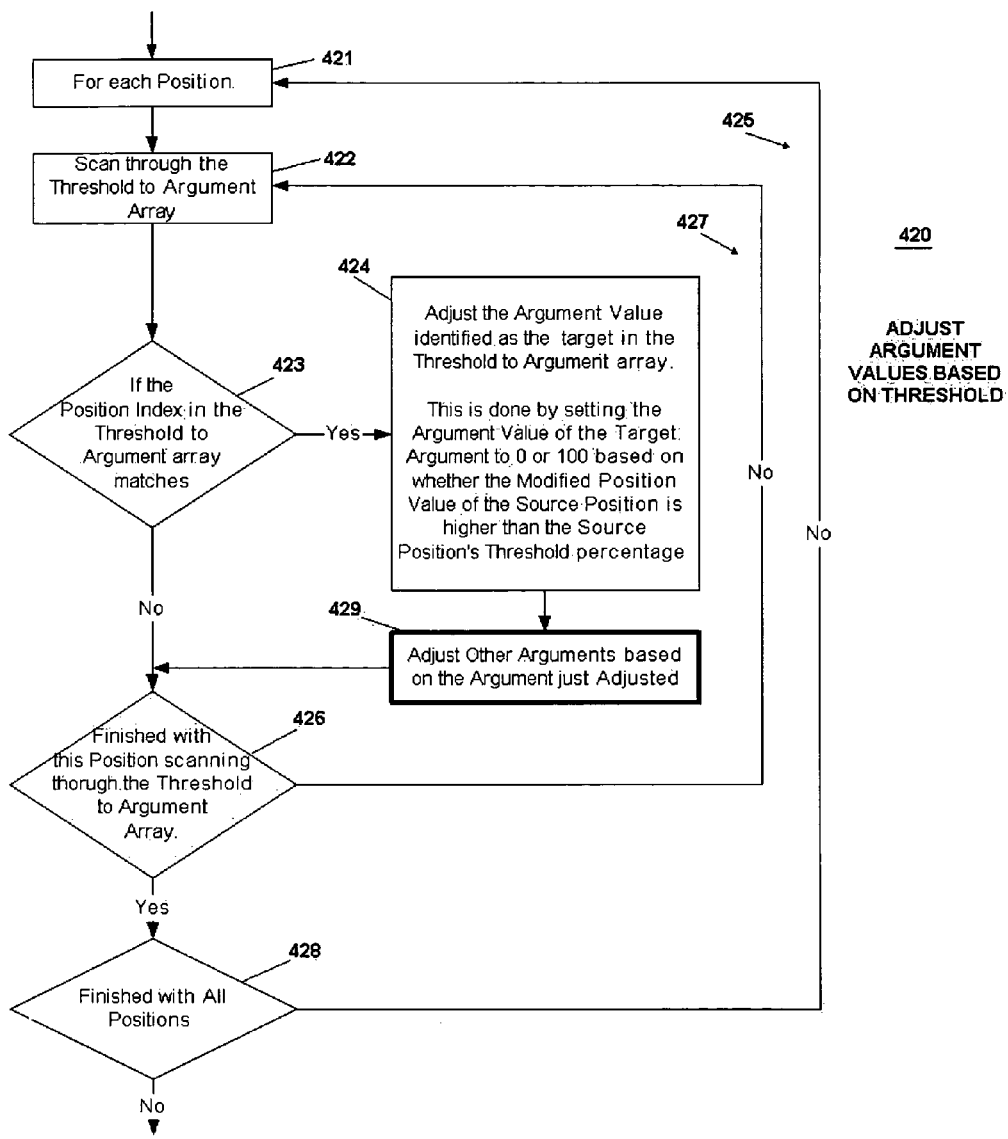
FIG. 26 provides a flowchart for the Adjust Argument Values Based On Threshold Code Segment which is entered from the Adjust Threshold Based On Modified Position Value Code Segment and includes two nested loops for sequentially running through all positions and for each position sequentially running through or scanning the threshold to argument array and finding the arguments affected by any changes in the thresholds and resetting those arguments.

Referring now to FIG. 26, the Adjust Argument Values Based On Threshold Code Segment 420 is entered from the Adjust Threshold Based On Modified Position Value Code Segment 410 at step 421, moves to the next code segment shown in the Make Linkage Adjustments Routine at step 367 from step 428 and includes two nested loops 425 and 427 for sequentially running through all positions and for each position sequentially running through or scanning the threshold to argument array 288 (FIG. 16) and finding the arguments affected by any changes in the thresholds and resetting those arguments. In step 421 the program counts through all the positions as a function of the loop 425. In step 422 the program counts through all entries in the threshold to argument array and checks for matches between the source position entries in the array 288 and the index of the position currently selected in accordance with the loop 425. When a match is found in decision step 423, the program moves to step 424 and resets the argument value to 0 or 100 as a function of whether the modified value of the source position equals or exceeds the threshold set point. After resetting the argument value in step 424 the program passes to step 429 and runs the Adjusts Other Arguments Routine which will be described later. In the event no match is found in step 423 or after the steps 424 and 429 are completed the program passes to decision step 426 at which a check is made to determine if the entire threshold to argument array has been scanned. If more entries remain to be scanned the program returns to step 422 and a new entry is identified or if all entries have been scanned the program passes to step 428 at which a check is made to determine if all positions have been processed by loop 425. If more positions remain to be processed the program returns to step 421 and a new position entry is identified, or if all entries have been scanned the program passes to the next code segment.

Figure 27:
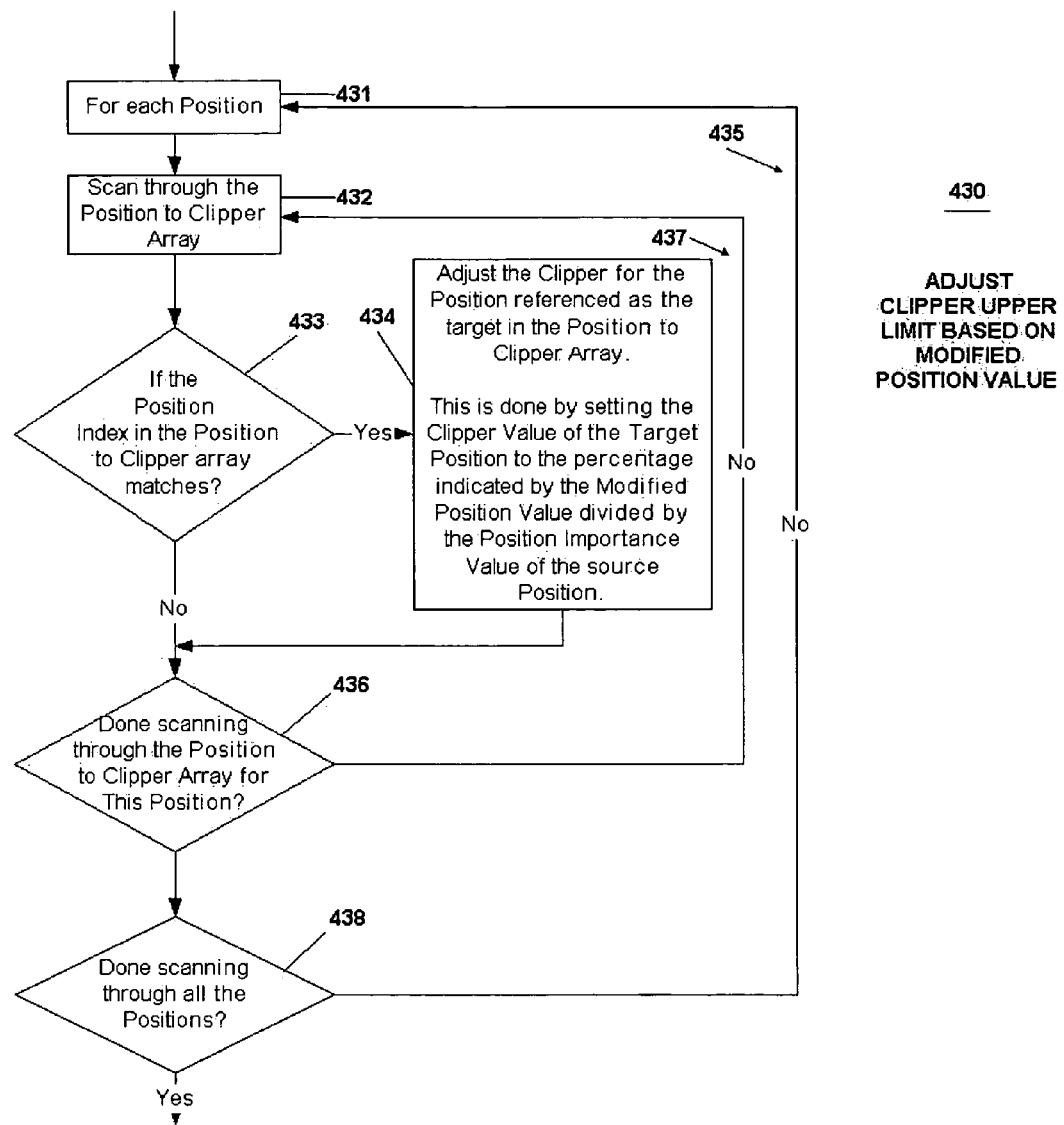
FIG. 27 provides a flowchart for the Adjust Clipper Upper Limit Based On Modified Position Value Code Segment which is entered from the Adjust Argument Values Based On Threshold Code Segment and includes two nested loops for sequentially running through all positions and for each position sequentially running through or scanning the position (modified value) to clipper array and finding the clipper upper limits affected by any changes in the modified position values and resetting those clipper upper limits.

Referring now to FIG. 27, the Adjust Clipper Upper Limit Based On Modified Position Value Code Segment 430 is entered from the Adjust Argument Values Based On Threshold Code Segment 420 at step 431, moves to the next code segment shown in the Make Linkage Adjustments Routine at step 368 from step 438 and includes two nested loops 435 and 437 for sequentially running through all positions and for each position sequentially running through or scanning the position (modified value) to clipper array 283 (FIG. 16) and finding the clipper upper limits affected by any changes in the modified position values and resetting those clipper upper limits. In step 431 the program counts through all the positions as a function of the loop 435. In step 432 the program counts through entries in the position to clipper array and checks for matches between the source position entries in the array 283 and the index of the position currently selected in accordance with the loop 435. When a match is found in decision step 433, the program moves to step 434 and recalculates the value of the clipper upper limit set point as a function of the percentage defined by the source modified value over its position importance (full position value). In the event no match is found in decision step 433 or after the step 434 is completed the program passes to decision step 436 at which a check is made to determine if the entire position to clipper array has been scanned. If more entries remain to be scanned the program returns to step 432 and a new entry is identified or if all entries have been scanned the program passes to step 438 at which a check is made to determine if all positions have been processed by loop 435. If more positions remain to be processed the program returns to step 431 and a new position entry is identified, or if all entries have been scanned the program passes to the next code segment.

Figure 28:
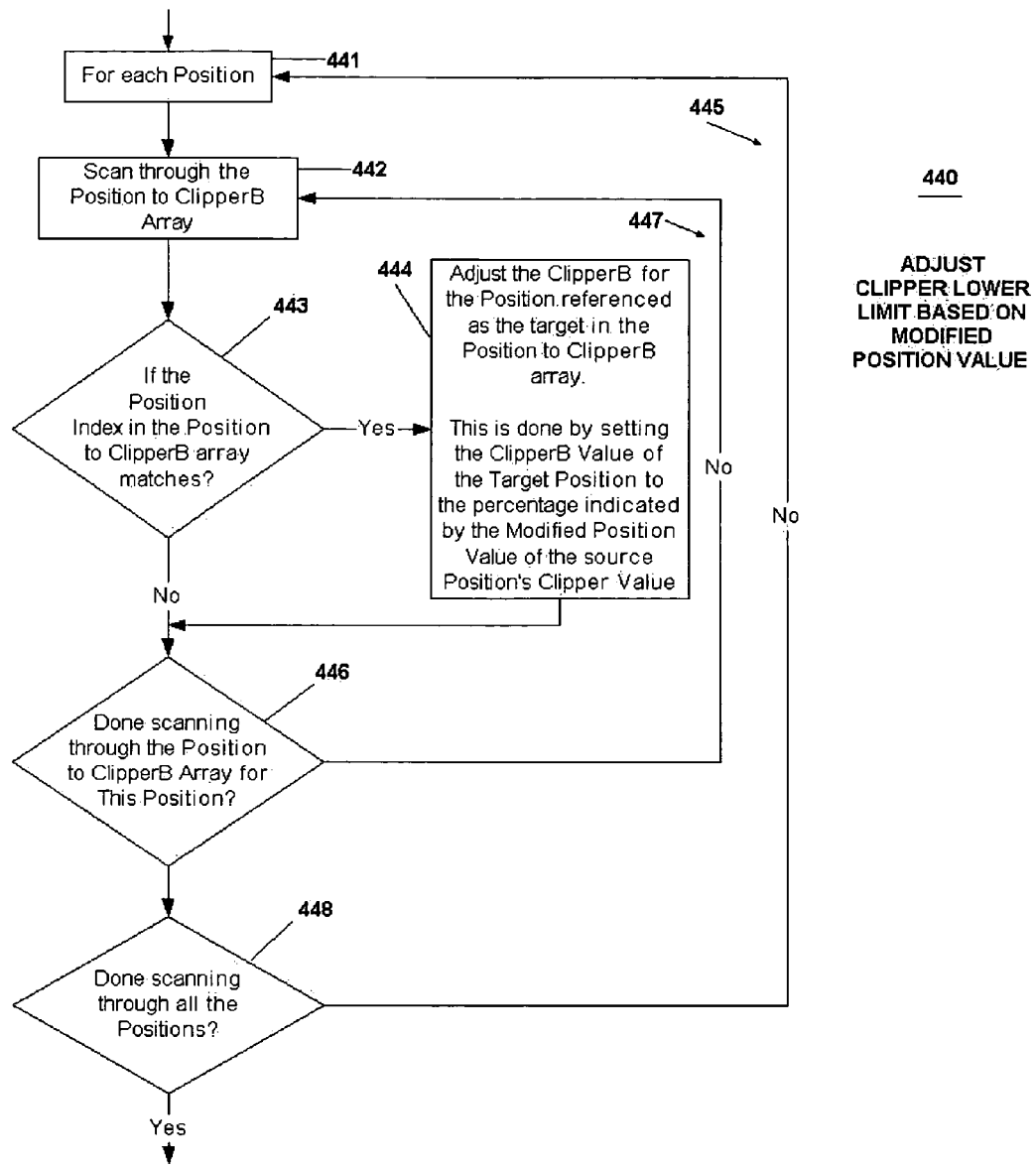
FIG. 28 provides a flowchart for the Adjust Clipper Lower Limit Based On Modified Position Value Code Segment which is entered from the Adjust Clipper Upper Limit Based On Modified Position Value Code Segment and includes two nested loops for sequentially running through all positions and for each position sequentially running through or scanning the (modified) position to clipper B array and finding the clipper lower limits affected by any changes in the modified position values and resetting those clipper lower limits.

Referring now to FIG. 28, the Adjust Clipper Lower Limit Based On Modified Position Value Code Segment 440 is entered from the Adjust Clipper Upper Limit Based On Modified Position Value Code Segment 430 at step 441, moves to the next code segment shown in the Make Linkage Adjustments Routine at step 369 from step 448 and includes two nested loops 445 and 447 for sequentially running through all positions and for each position sequentially running through or scanning the position (modified value) to clipperB array 284 (FIG. 16) and finding the clipper lower limits affected by any changes in the modified position values and resetting those clipper lower limits. In step 441 the program counts through all the positions as a function of the loop 445. In step 442 the program counts through all entries in the position to clipper B array and checks for matches between the source position entries in the array 284 and the index of the position currently selected in accordance with the loop 445. When a match is found in decision step 443, the program moves to step 444 and recalculates the value of the clipper lower limit set point as a function of the percentage defined by the source modified value over its position importance (full position value). In the event no match is found in decision step 443 or after the step 444 is completed the program passes to decision step 446 at which a check is made to determine if the entire position to clipperB array has been scanned. If more entries remain to be scanned the program returns to step 442 and a new entry is identified or if all entries have been scanned the program passes to decision step 448 at which a check is made to determine if all positions have been processed by loop 445. If more positions remain to be processed the program returns to step 441 and a new position entry is identified, or if all entries have been scanned the program passes to the next code segment.

Figure 29:
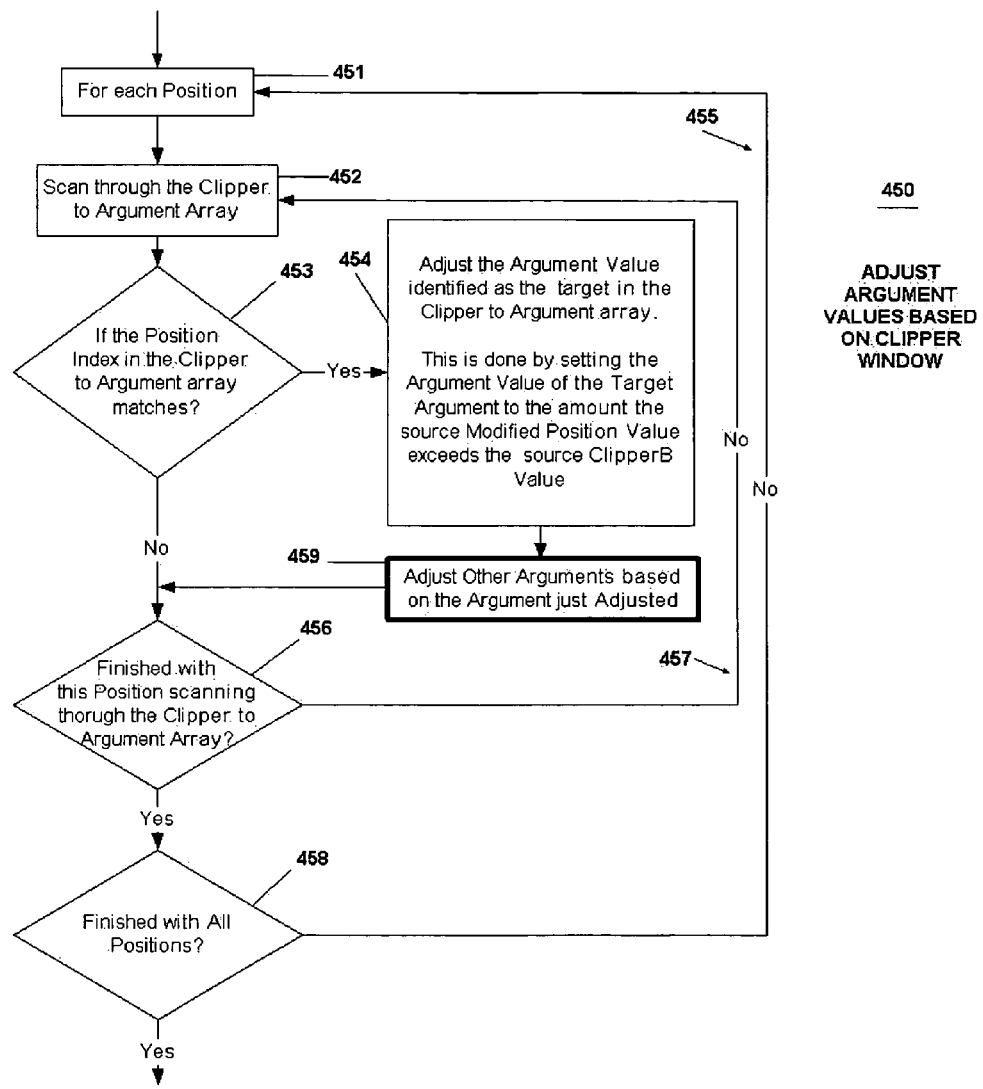
FIG. 29 provides a flowchart for the Adjust Argument Values Based On Clipper Window Code Segment which is entered from the Adjust Clipper Lower Limit Based On Modified Position Value Code Segment and includes two nested loops for sequentially running through all positions and for each position sequentially running through or scanning the clipper to argument array and finding the arguments affected by any changes in the value of the clipper window and resetting those arguments.

Referring now to FIG. 29, the Adjust Argument Values Based On Clipper Window Code Segment 450 is entered from the Adjust Clipper Lower Limit Based On Modified Position Value Code Segment 440 at step 451, moves to the next code segment shown in the Make Linkage Adjustments Routine at step 371 from step 458 and includes two nested loops 455 and 457 for sequentially running through all positions and for each position sequentially running through or scanning the clipper to argument array 286 (FIG. 16) and finding the arguments affected by any changes in the value of the clipper window and resetting those arguments. In step 451 the program counts through all the positions as a function of the loop 455. In step 452 the program counts through all entries in the clipper to argument array and checks for matches between the source clipper entries in the array 286 and the index of the position currently selected in accordance with the loop 455. When a match is found in decision step 453, the program moves to step 454 and recalculates the argument value to equal the amount by which the source position modified value exceeds the clipper lower limit (lower set point). After resetting the argument value in step 454 the program passes to step 459 and runs the Adjusts Other Arguments Routine which will be described later. In the event no match is found in decision step 453 or after the steps 454 and 459 are completed the program passes to decision step 456 at which a check is made to determine if the entire clipper to argument array has been scanned. If more entries remain to be scanned the program returns to step 452 and a new entry is identified or if all entries have been scanned the program passes to decision step 458 at which a check is made to determine if all positions have been processed by loop 455. If more positions remain to be processed the program returns to step 451 and a new position entry is identified, or if all entries have been scanned the program passes to the next code segment.

Figure 30:
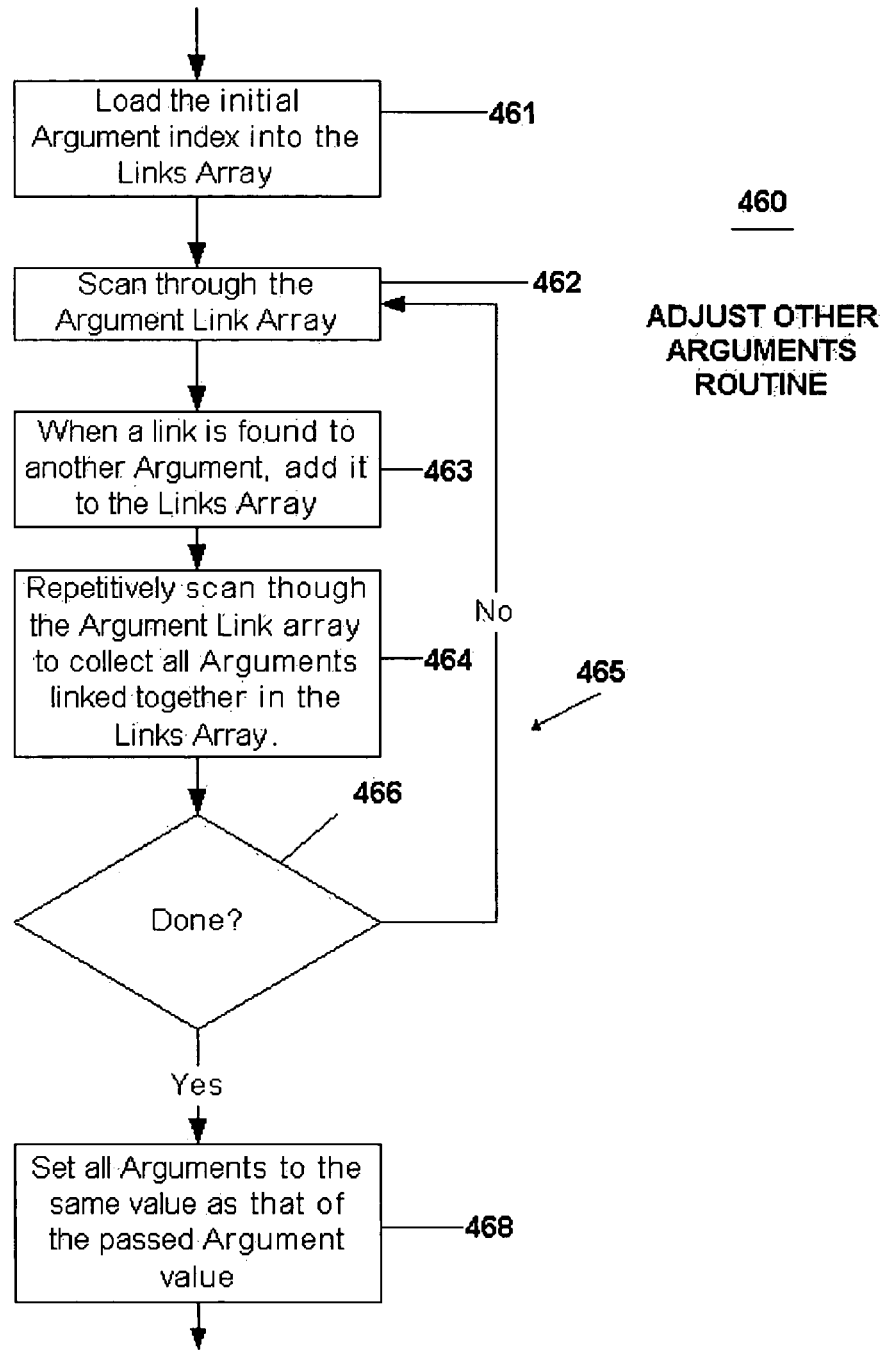
FIG. 30 provides a flowchart for the Adjust Other Arguments Routine that may be entered from other code segments and includes a loop and steps for sequentially running through or scanning the argument to argument array and finding all the arguments affected by changes in an argument value and resetting all those argument values.

Referring now to FIG. 30, the Adjust Other Arguments Routine 460 is entered from the Adjust Argument Values Based On Position Modified Value (FIG. 24), Adjust Argument Values Based On Clipper Window (FIG. 29) and Adjust Argument Values Based On Threshold (FIG. 26) Code Segments at step 461 and includes a loop 465 for sequentially running through or scanning the argument to argument array 287 (FIG. 16) and finding all the arguments affected by changes in a source argument value and adjusting all linked argument values. In step 461 the program sets up a temporary argument Links Array queue and enters the index value of the current affected argument as first entry in this queue. In step 462 the program scans through the argument to argument array in accordance with the loop 465 and checks for matches between the source argument entries in the array 287 and the index of the affected (newly changed) argument. In step 463 arguments are added to the Links Array queue when matches are found. In step 464 the program follows up by scanning the argument to argument array to further identify all arguments linked to arguments newly added to the Links Array queue and likewise adds them to the Links Array queue. After completing step 464 the program enters decision step 466 and checks to see if the argument to argument array 287 has been completely scanned. If the argument to argument array has been fully scanned the program passes to step 468 and otherwise the program returns to step 462 so that the remaining entries can be scanned. In step 468 all the entries in the Links Array queue are set to the same value as the affected argument first entered into the Links Array queue. Thereafter the program returns to the code segment from which it entered the Adjust Other Arguments Routine.

Figure 31:
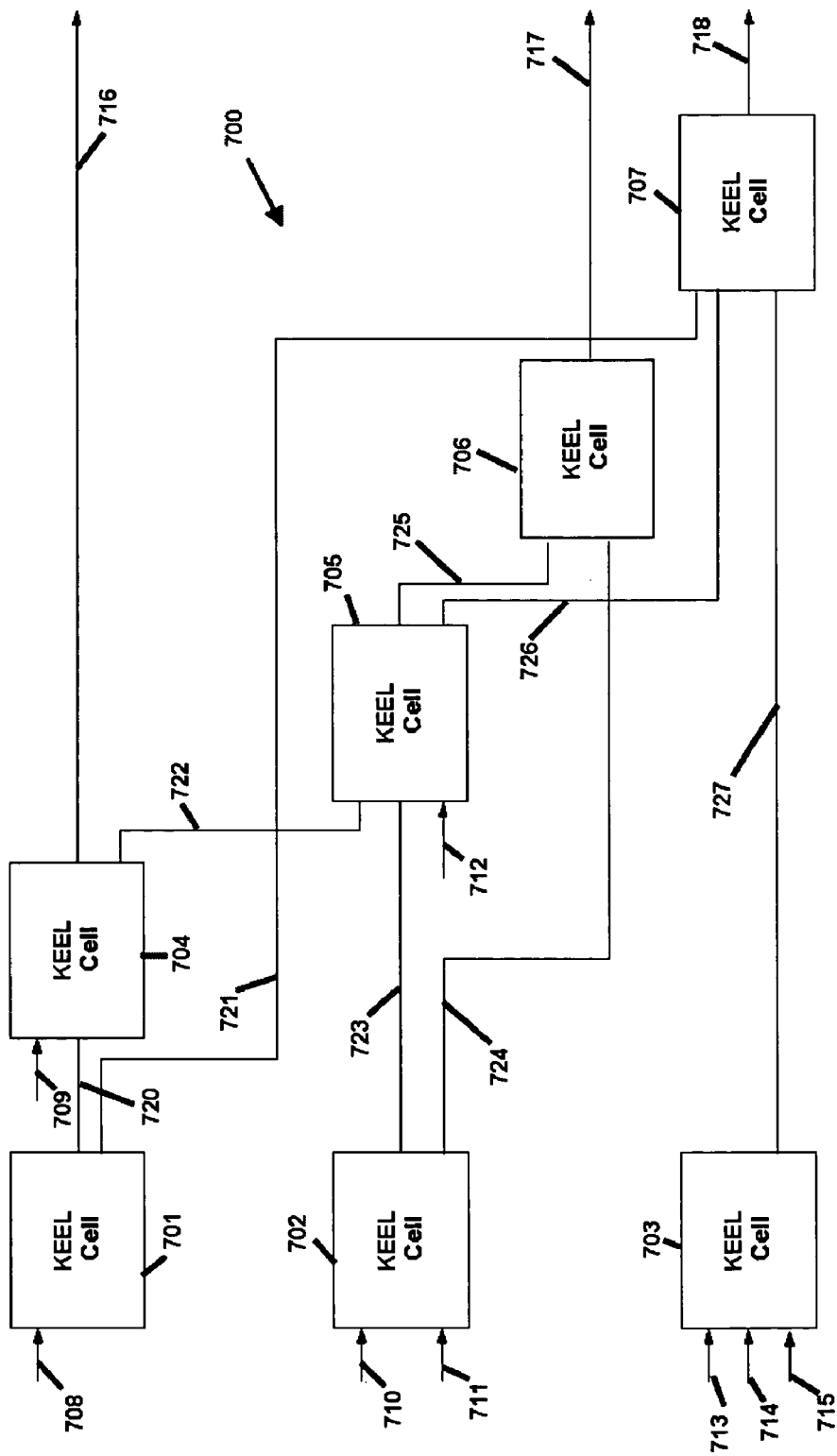
FIG. 31 provides a high level view of a KEEL Circuit composed of a hierarchy of KEEL Cells.

Referring now to FIG. 31, an electrical circuit 700 is shown as a hierarchy of KEEL Cells in accordance with the present invention. KEEL Cells (701, 702, 703) are independent of any other KEEL cells and KEEL Cells (704, 705, 706 and 707) are dependent upon the electrical evaluation of earlier cells. External argument input signals (708-715) provide inputs to the electrical circuit 700. Decision output signals (716-178) provide the outputs from the electrical circuit. Interconnecting Signals (720-727) are used to describe the functional relationships between the KEEL cells. All signals in the circuit equate to normalized values such that they can be related to values between 0 and 100 or min and max.

Figure 32:
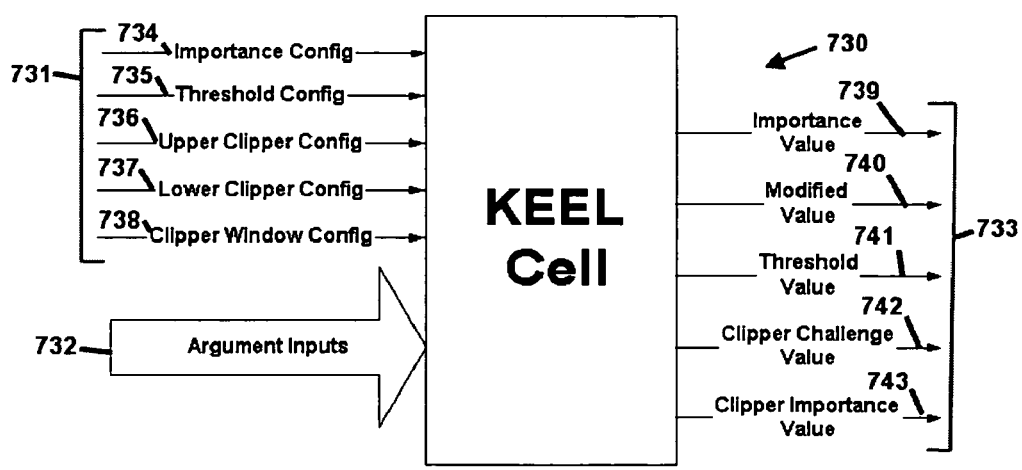
FIG. 32 provides a high level view of a KEEL Cell with its associated input and output signals.

Referring now to FIG. 32, an individual decision-making KEEL Cell 730 is shown with configuration inputs 731, argument input signals 732 and output values 733 in accordance with the present invention. An individual KEEL Cell can contain one or more argument input signals. The presence of the individual configuration input signals and the individual output value signals are dependent upon the complete circuit design. If selective configuration input signals and output value signals are not used are not included in the circuit. Each KEEL Cell in the circuit can contain an Importance Config signal 734. Each KEEL Cell in the circuit can contain a Threshold Config signal 735. Each KEEL Cell in the circuit can contain an Upper Clipper Config signal 736. Each KEEL Cell in the circuit can contain a Lower Clipper Config signal 737. Each KEEL Cell in the circuit can contain a Clipper Window Config signal 738. Each KEEL Cell in the circuit can expose an Importance Value signal 739. Each KEEL Cell in the circuit can expose a Modified Value signal 740. Each KEEL Cell in the circuit can expose a Threshold Value signal 741. Each KEEL Cell in the circuit can expose a Clipper Challenge Value signal 742. Each KEEL Cell in the circuit can expose a Clipper Importance Value signal 743.

Referring now to FIG. 33, a KEEL Cell 730, is shown in exploded form to highlight three subassemblies: the Basic Decision Logic 750, the Clipper Logic 751 and the Threshold Logic 752. This diagram also shows that the Importance Set Point 753 is used by the Basic Decision Logic 750. It also shows that the Upper Clipper Set Point 754, the Lower Clipper Set Point 756, and the Clipper Window Set Point 755 are used by the Clipper Logic 751. It also shows that the Threshold Set Point 757 is used by the Threshold Logic 752. It also shows that the Clipper Logic 751 is dependent upon the Basic Decision Logic 750, as is the Threshold Logic 752.

Figure 34:
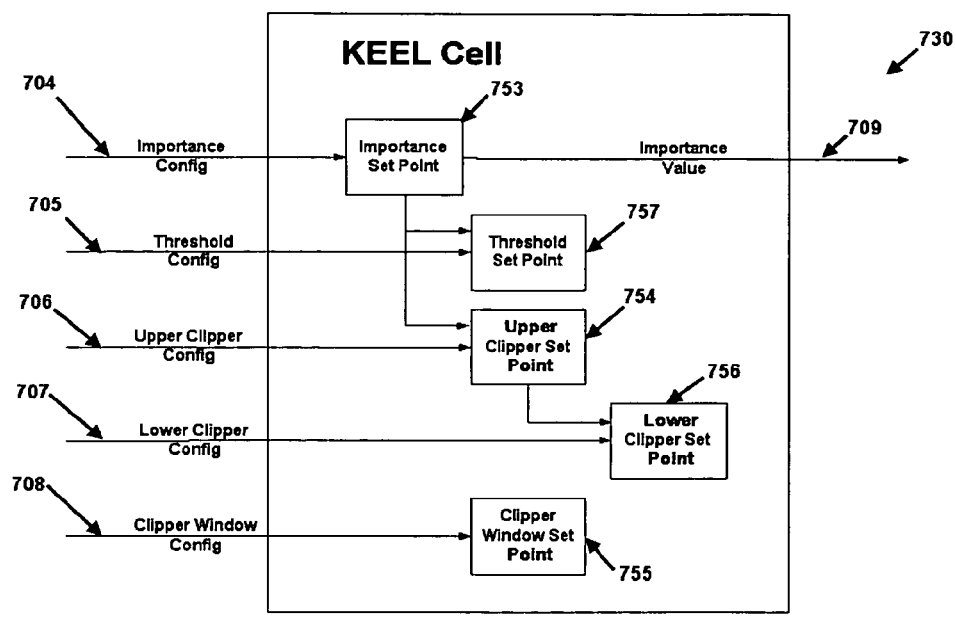
FIG. 34 provides a block diagram of the portion of the KEEL Cell with configuration parameters and internal set points.

Referring now to FIG. 34, the relationships between the input configuration signals of a KEEL cell 704, 705, 708, 706, and 707 and their respective set points 753, 757, 755, 754, and 756 are shown. Also shown is the importance value signal 709 that can be exposed as an external output from the KEEL cell. Configuration signal values are normalized signals such that their range can be equated to percentage values. The resulting set point values can also be equated to percentage values. The importance config value 707 equals the importance set point value 753 and the importance value 709. There is no transformation. The threshold set point value 757 is determined by the percentage of the importance set point value 753 multiplied by the threshold config value 705. The upper clipper set point value 754 is determined by the percentage of the importance set point value 753 multiplied by the upper clipper config 706 value. The lower clipper set point value 756 is determined by the percentage of the upper clipper set point value 706 multiplied by the lower clipper config 707 value. The clipper window set point value 755 is equal to the clipper window config value 708 and is retained as a percentage.

Figure 35:
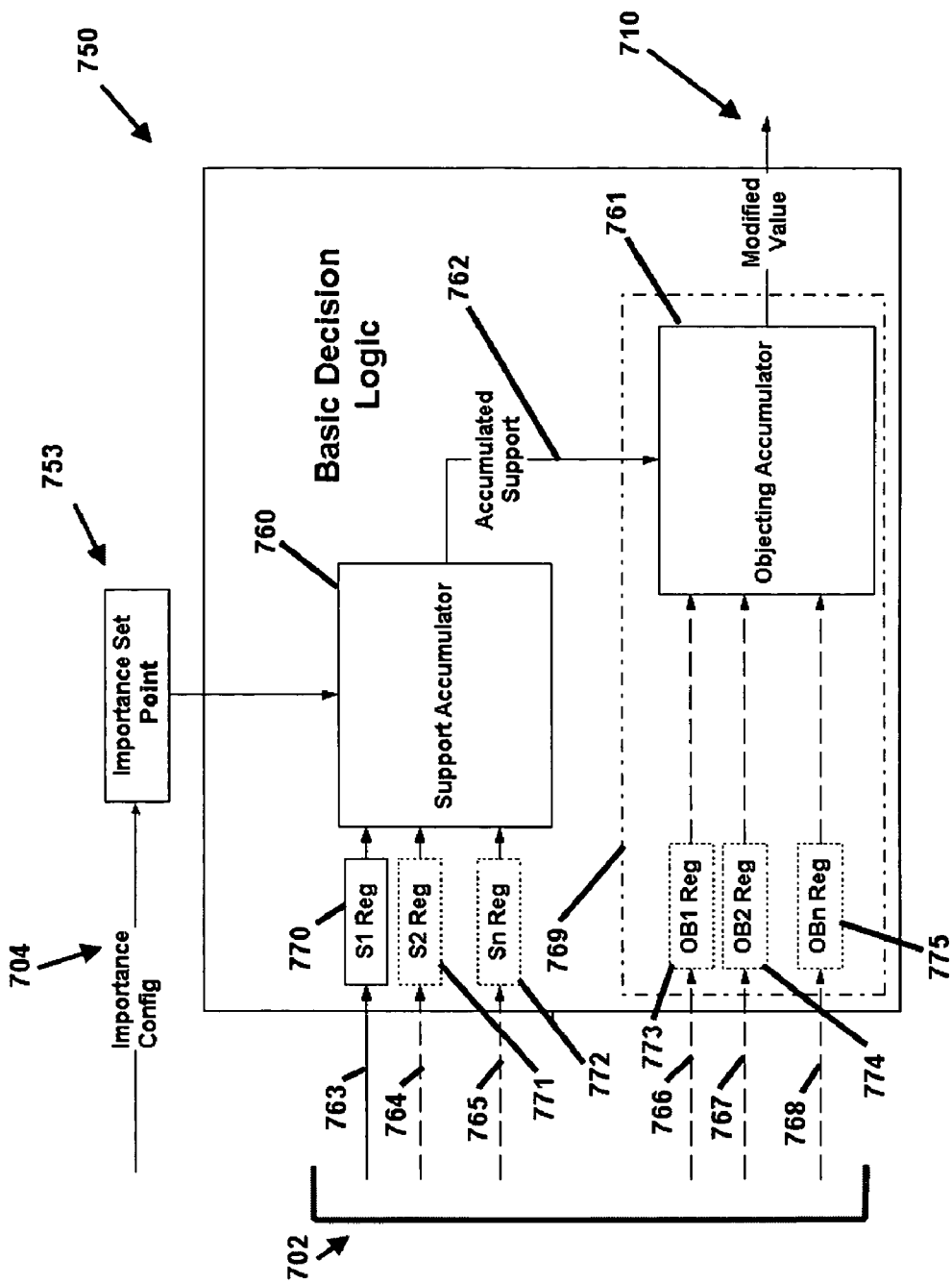
FIG. 35 provides a block diagram of the Basic Decision Accumulator logic of a KEEL Cell.

Referring now to FIG. 35, the Basic Decision Logic 750 is broken down into its sub-assemblies of Support Accumulator 760 and Objecting Accumulator 761. The importance set point 753 of the cell is set dynamically with the importance config signal 704. If, in the graphical design environment the importance set point is set manually, then the importance set point signal 753 may be preconfigured, which would negate the need for the importance config signal 704. In this case, the importance set point 753 would be static for this cell.

Still referring to FIG. 35, the argument input signals 702 are shown, in this case, to include supporting argument input signals 763, 764, and 765 and objecting argument input signals 766, 767, and 768. The argument input signals 702 are loaded into holding locations. There is a holding location for each input signal. The dotted lines and boxes indicate that the number of input signals for any given cell has as a minimum of 1 supporting argument input signal 763 and one associated holding location 770. There is no upper limit to the number of supporting or objecting input signals. Dashed-Box 769 indicates that the entire section of logic associated with Objecting Arguments is optional if there are no objecting arguments for the respective KEEL cell. Internal clocking logic is used to insure that the Supporting Accumulator 760 is processed before the Objecting Accumulator, thus insuring that the accumulated support signal 762 is available at the time the Objecting Accumulator logic 761 is processed. The output of the Objecting Accumulator logic is the modified value signal 710. If the Objecting Accumulator is not utilized because there are no objecting argument input signals, then the Accumulated Support signal 762 is tied directly to the Modified Value signal 710.

Figure 36:
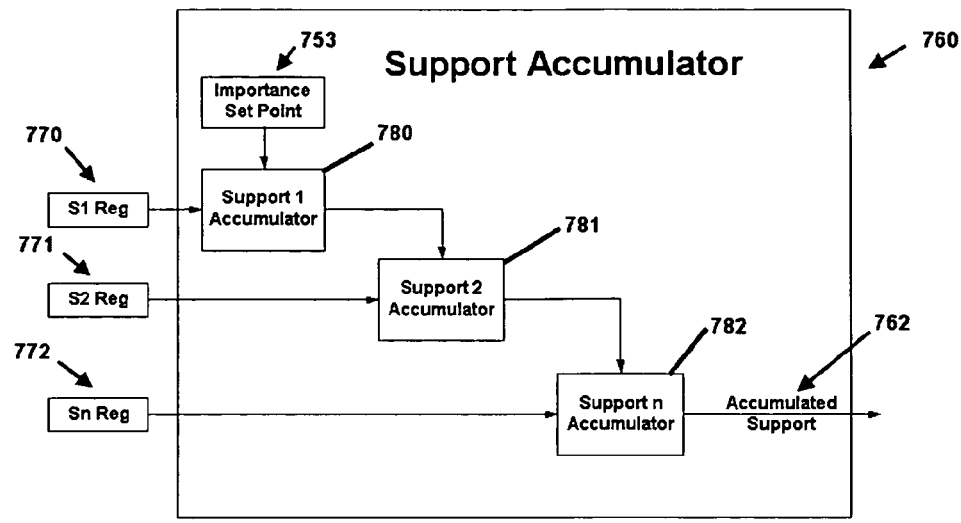
FIG. 36 provides a block diagram of the Support Accumulator subassembly of the Basic Decision Accumulator.

Referring now to FIG. 36, a representative Supporting Accumulator 760 is shown with internal accumulators 789, 781, and 782. The first accumulator 780 combines the first supporting argument held in S1Reg holding location 770 with the Importance Set Point 753 for its respective KEEL Cell according to the mechanism described earlier. Additional supporting arguments may be included in the Support Accumulator 760. In this figure, supporting arguments are held in S2Reg 771 through SnReg 772 indicating that n supporting arguments can be so included. The figure shows that the number of internal Support Accumulators will increase as the number of supporting arguments increases. It also shows that they are processed one after the other. This is shown in FIG. 36 as processing Support 1 Accumulator 780 with its output feeding Support 2 Accumulator 781 where it is combined with S2Reg 771 value. Then the output of Support 2 Accumulator 781 feeds Support n Accumulator 782 and combines it with the SnReg 771 value. When all inputs are combined, the Accumulated Support signal 762 is created.

Figure 37:
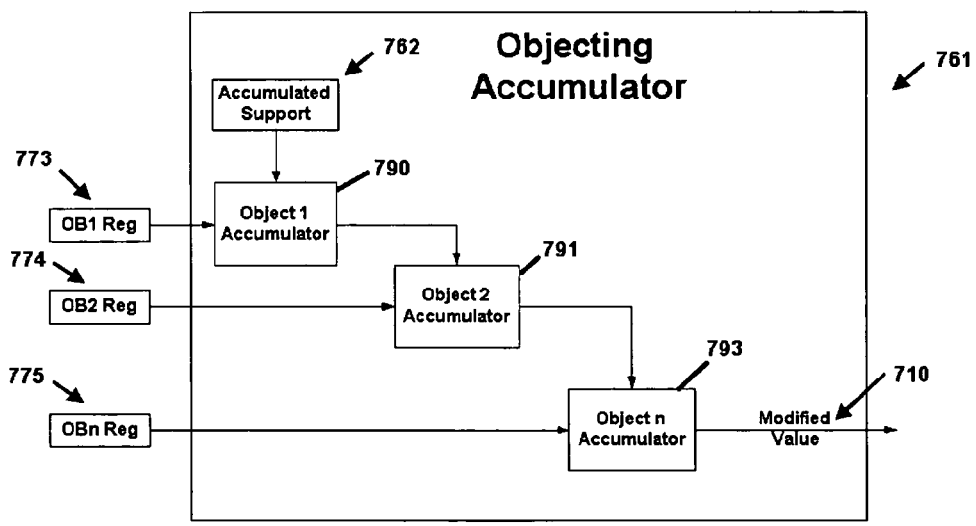
FIG. 37 provides a block diagram of the Objecting Accumulator subassembly of the Basic Decision Accumulator.

Referring now to FIG. 37, a representative Objecting Accumulator 761 is shown with internal accumulators 790, 791, and 792. The first accumulator 790 combines the first objecting argument value held in OB1Reg 773 with the Accumulated Support 753 signal according to the mechanism described earlier. The output of Object 1 Accumulator 790 is fed into the Object 2 Accumulator 791 where it is combined with the objecting argument 2 value held in OB2Reg 774. The output of OB2Reg 791 is fed into the following accumulator. There is no limit to the number of objecting accumulators that can be included in a KEEL cell. They are always processed one after the other. Order is not important. In FIG. 37, this is shown by the output of Object 2 Accumulator 791 being fed into Object n Accumulator 792 where it is combined with the objecting argument value n stored in OBnReg 775 and yields the modified value 710.

Figure 38:
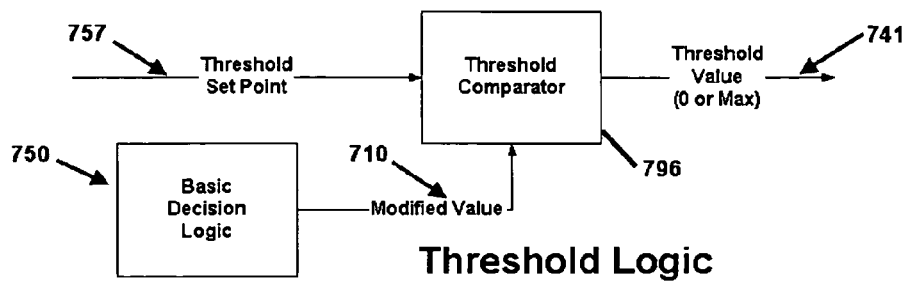
FIG. 38 provides a block diagram of the Threshold Logic subassembly of a KEEL Cell.

Referring now to FIG. 38, the Threshold Logic is exposed. The Threshold Comparator 796 compares two signals: the signal value stored as the Threshold Set Point 757 and the Modified Value 710 that comes from the KEEL Cell's Basic Decision Logic 750. If the Modified Value 710 is less than or equal to the Threshold Set Point 757, then the resulting Threshold Value 741 is set to minimum value. If the Modified Value 710 signal is greater than the Threshold Set Point 757 signal, then the Threshold Value 741 signal is set to maximum.

Figure 39:
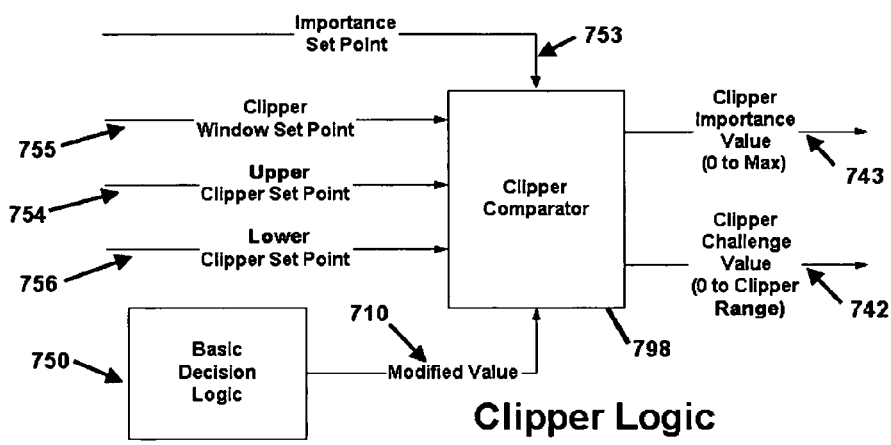
FIG. 39 provides a block diagram of the Clipper Logic subassembly of a KEEL Cell.

Referring now to FIG. 39, the Clipper Logic is exposed. The clipper importance value 743 ranges from minimum to maximum as the modified value signal 710 ranges between the lower clipper set point value 756 and the upper clipper set point value 754. The clipper challenge value 742 ranges from minimum to the differential between the lower clipper set point value and the upper clipper set point value.

Also referring to FIG. 39, the Clipper Logic can be configured in several ways depending on the design requirements. The design tools allow for either of the two designs and insure that only one of the two solutions is provided for at any one time. If the clipper window set point value 755 is manipulated by an external signal then the upper clipper config signal and the lower clipper config signal are not used. The upper clipper set point and the lower clipper set point are preset based on the design settings. The converse is also true: if either the upper clipper config or the lower clipper config signals are used, then the clipper window config and the clipper window set point 755 are not used. If none of the clipper config signals are used, but the clipper importance value signal 743 or the clipper challenge value signal 742 are used then the upper clipper set point 754 and the lower clipper set point 756 are defined at design time and the register values are fixed in the design. The clipper logic can produce either or both of the clipper importance value 743 and the clipper challenge value 742 depending on the design. It is possible that either or both the upper clipper set point 754 and the lower clipper set point 756 are set at design time.

Also referring to FIG. 39, if the clipper window set point value 755 is driven externally then this signal is used to adjust the upper clipper set point 754 and the lower clipper set point 756 such that the differential between them remains the same and the upper clipper set point signal 754 is driven up toward the importance set point when the clipper window set point 755 rises to its max and drives the lower clipper window set point 756 to its minimum when the clipper window set point 755 lowers to its minimum.

Figure 40:
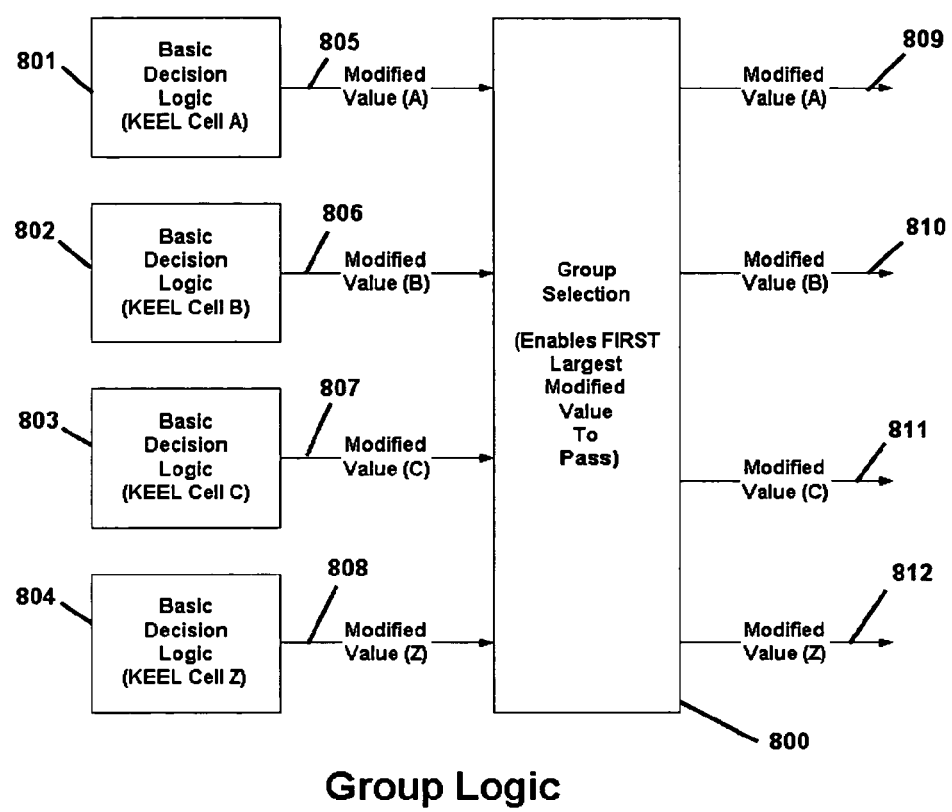
FIG. 40 provides a block diagram of a Group Logic subassembly that may be included in a KEEL system design.

Now referring to FIG. 40, the Group Selection Logic 800 is exposed. Any number of KEEL cells can be part of a group. Each produces its own modified value signal. In this figure, four KEEL Cells are displayed showing their Basic Decision Logic: 801, 802, 803 and 804. The modified value signals for these four entities are 805, 806, 807 and 808 respectively. The group selection logic 800 operates such that only one of the modified value signals will be passed through. The logic is such that the first highest modified value will be passed through to signal points 809, 810, 811, or 812. The others will be driven to 0. This functionality is used in selection processes and insures that there will always be one modified value selected. The modified value signals that come out from the group selection logic 800 can be used to drive any point that can be driven by a modified value from a KEEL cell. If all modified value input signals as shown in this example as 805, 806, 807 and 808 are 0 or minimum, then even though modified value (A) would be selected because it was the first one processed, the outputs from the group selection logic 800 would be the same 0 or minimum value.

Figure 41:
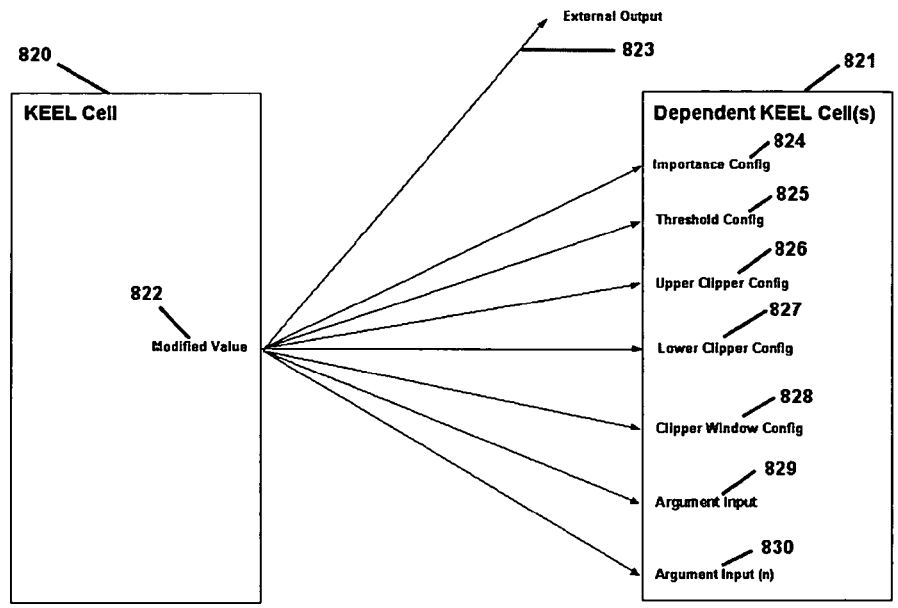
FIG. 41 shows all of the types of connections that might be derived from a modified value of an independent KEEL cell to a dependent KEEL cell.

Referring now to FIG. 41, this shows the optional connections for the modified value signal 822 from an independent KEEL Cell 820 to a dependent KEEL Cell 821. Based on the graphical design, the modified value signal 822 can be wired to the importance config 824, threshold config 825, upper clipper config 826, lower clipper config 827, clipper window config 828, or any argument inputs 829-830. The argument input 829 and argument input (n) 830 indicates that there can be any number of connections to arguments. This figure also indicates that the modified value signal 822 can be exposed outside the circuit as a control output signal 823 to control external actions.

Figure 42:
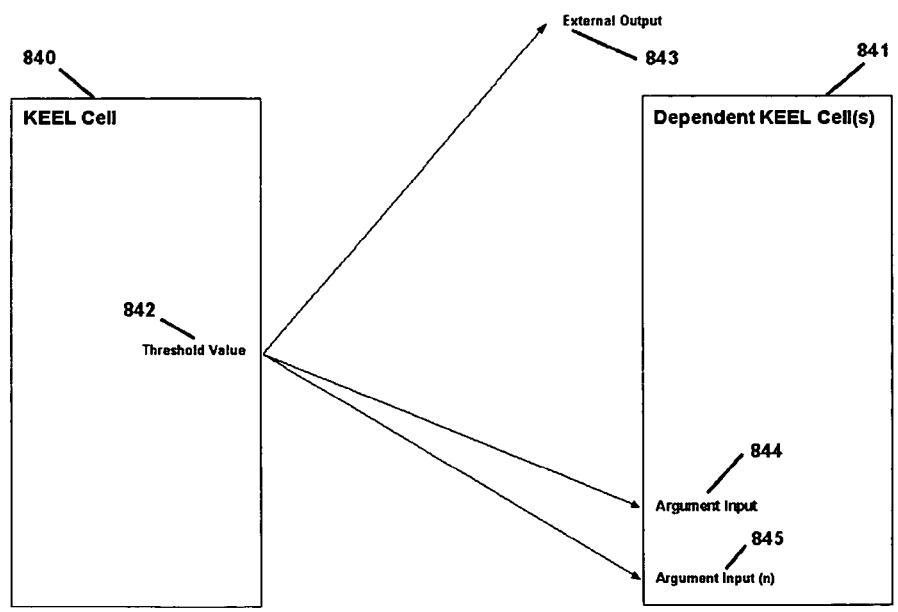
FIG. 42 shows all of the types of connections that might be derived from a threshold value of an independent KEEL cell to a dependent KEEL cell.

Referring now to FIG. 42, this shows the optional connections for the threshold value 842 signal from an independent KEEL cell to a dependent KEEL Cell 841. Based on the graphical design, the Threshold Value 842 signal (which will be minimum or maximum based on the Threshold Logic) can be wired to any number of argument inputs in any dependent KEEL Cell 842. This figure shows this by representing the input arguments as argument input 844 and argument input (n) 845. This figure also shows that the Threshold Value signal 842 can also be exposed as an external circuit output 843 where it can be used to control external actions.

Figure 43:
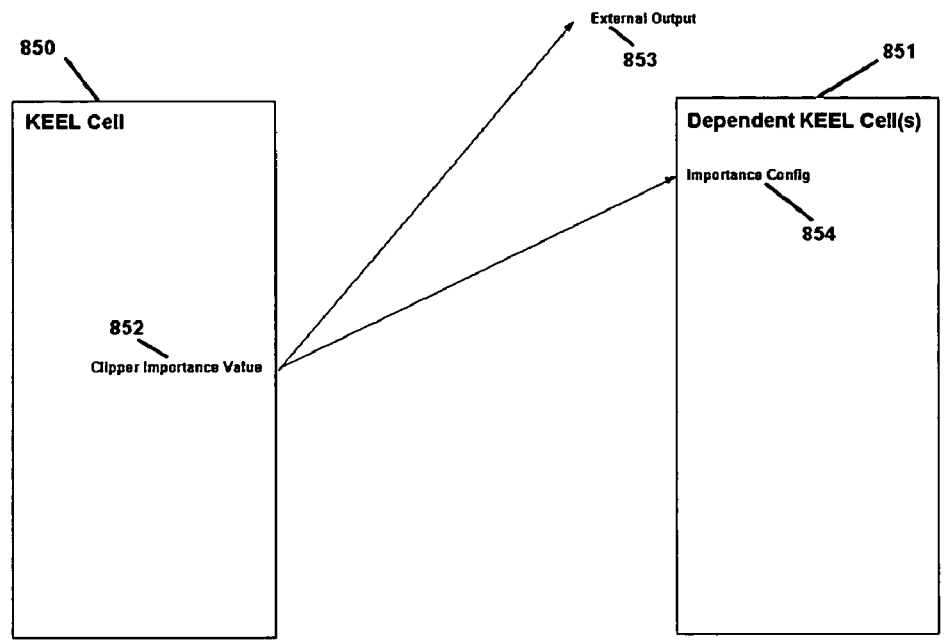
FIG. 43 shows all of the types of connections that might be derived from a clipper importance value of an independent KEEL cell to a dependent KEEL cell.

Referring now to FIG. 43, this shows the optional connections for the Clipper Importance Value 852 from an independent KEEL Cell 850 to a dependent KEEL Cell 851. Based on the graphical design, the Clipper Importance Value 852 can be wired to the Importance Config connection point 854 of the dependent KEEL Cell 851. The Clipper Importance Value 852 can also be exposed as an external output 853 to control external actions.

Figure 44:
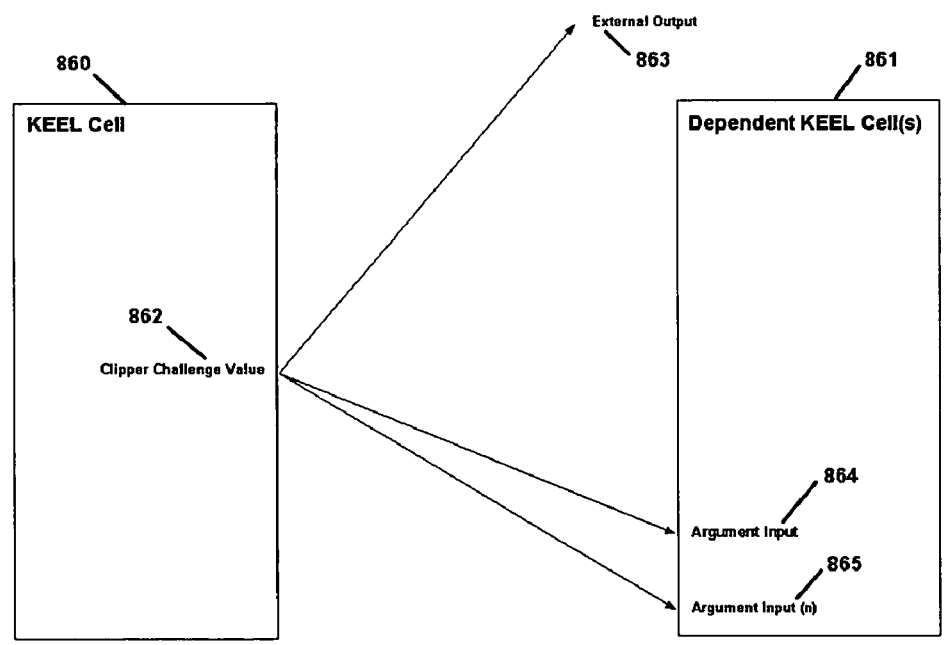
FIG. 44 shows all of the types of connections that might be derived from a clipper challenge value of an independent KEEL cell to a dependent KEEL cell.

Referring now to FIG. 44, this shows the optional connections for the Clipper Challenge Value 862 from an independent KEEL Cell 860 to a dependent KEEL Cell 861. Based on the graphical design, the Clipper Challenge Value 862 can be wired to any argument inputs on any dependent KEEL Cells. This is shown by the wires to Argument Input 864-Argument Input (n) 865. The Clipper Challenge Value 862 can also be exposed as an external output 863 to the circuit and be used to control external actions.

Figure 45:
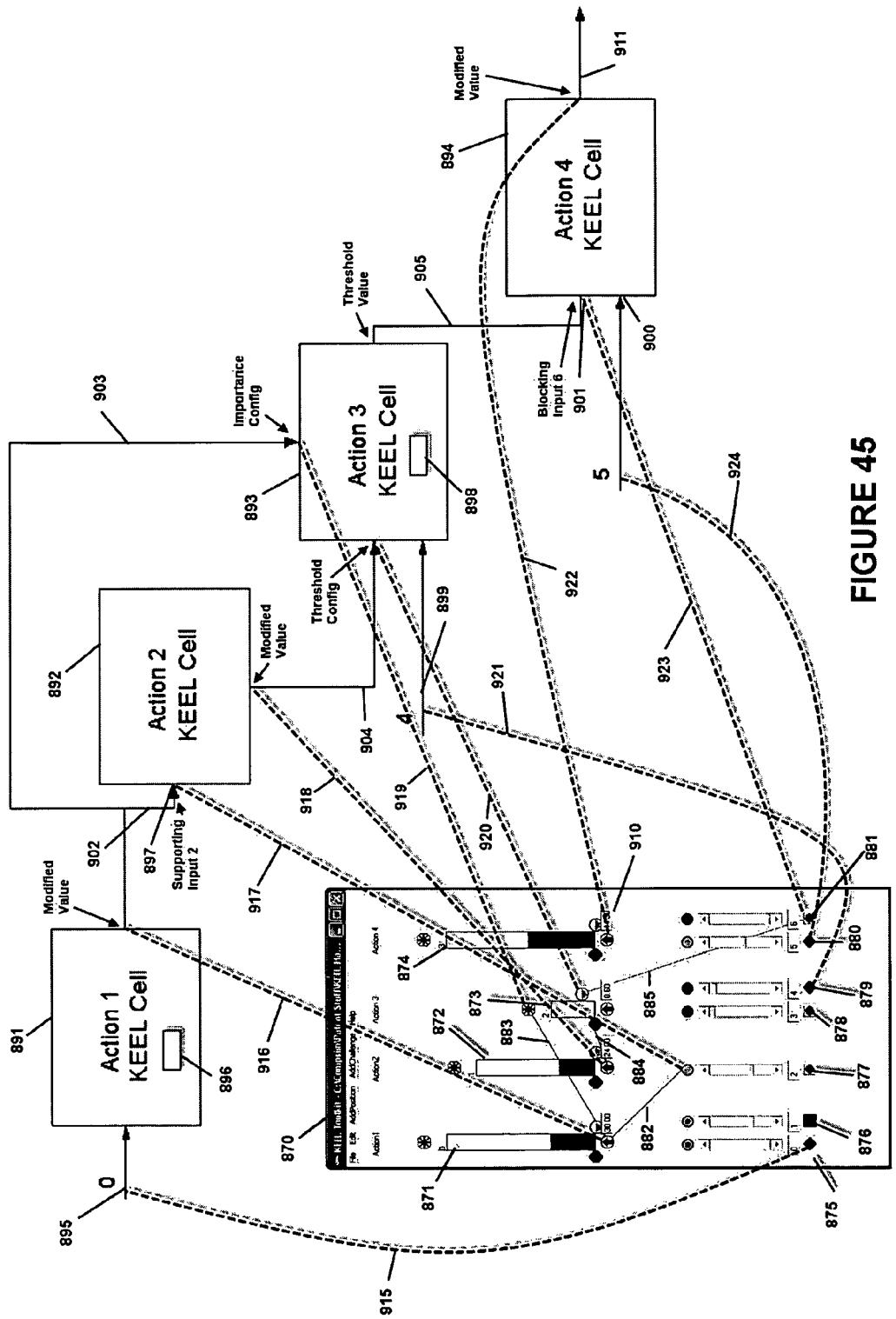
FIG. 45 shows the relationships between a KEEL system design as viewed from the graphical development environment and a series of KEEL Cells linked together to provide the same system services in the form of an electronic circuit.

Referring now to FIG. 45, an example of the graphical design 870 and the resulting circuit is provided. In the graphical design 870, a system showing four positions 871, 872, 873, and 874 is developed. Position 871 has two supporting arguments 875 (index 0) and 876 (index 1) displayed. Argument index 1 (876) is shown as locked indicating that the value is fixed. Position 2 is shown with a single supporting argument 877. This argument is driven by the modified value of Position 1 871 and is shown with the wire 882. Position 3 873 is driven by bias index 3 878 which performs as a 100% supporting argument and by objecting argument 879. The importance of Position 3 873 is driven by the modified value of Position 1 by wire 883. The Threshold of Position 3 873 is driven by the modified value of Position 2 872 by through wire 884. Position 4 874 is supported by one supporting argument 880 and one objecting argument 881. Objecting argument 881 is driven by the Threshold value of Position 3 873 through wire 885. The modified value 910 of Position 4 874 is the output of this sample design.

Still referring to FIG. 45, the top of the figure shows the resulting KEEL circuit design highlighting only the components utilized. The four Positions 871, 872, 873, 874 in the graphical design environment 870 are translated to four KEEL Cells 891, 892, 893, and 894. Input index 0 875 to Position 1 871 is translated to input argument 0 895 to Action 1 KEEL Cell 891. The locked input 876 is translated to preset internal holding location 896 in KEEL Cell 891. The modified value of Position 1 871 is tied to Position 3 873 importance and input index 2 877 in the graphical design 870. This is shown in the circuit diagram as wires 902 and 903 connecting the modified value output of Action 1 KEEL Cell 891 to Importance Config of Action 3 KEEL Cell and Supporting Input 2 of Action 2 KEEL Cell. The Bias input 878 of Position 3 is shown as an internal preset value 898 in Action 3 KEEL Cell 893. The control of Position 3 873 threshold by the modified value of Position 2 872 through linkage 884 is shown in the circuit by wire 904. The Threshold Value of Action 3 KEEL Cell 898 is used to drive the objecting argument 6 of Position 4 874 in the design environment. This is shown in the circuit with wire 905. There are three external inputs to this design. These are shown as follows: Supporting argument index 0 875 is shown in the circuit pin 0 895. Their equivalence is highlighted with dashed line 915. Objecting argument index 4 879 is shown in the circuit pin 4 899. Their equivalence is highlighted with dashed line 921. Supporting argument index 5 880 is shown in the circuit pin 5 900. Their equivalence is shown with dashed line 924. The output of the design is shown as the modified value 910 of Position 4 874. This is shown in the circuit as the output of Action 4 KEEL Cell 894 with the modified value 911 signal. Their equivalence is shown with the dashed line 922. Action 1 KEEL Cell 891 does not include clipper logic or threshold logic; nor does it include the Objecting Accumulator logic. Therefore there are no associated set points for these features. Action 2 KEEL Cell 982 does not include clipper logic or threshold logic; nor does it include the Objecting Accumulator logic. Therefore there are no associated set points for these features. Action 3 KEEL Cell 893 does not include clipper logic. Therefore there are no associated set points for these features. Action 4 KEEL Cell 894 does not include clipper logic; nor does it include threshold logic. Therefore there are no associated set points for these features. The circuit does not include any group logic.

It should be apparent to one of ordinary skill in the art, from the foregoing description, that the present invention provides one or more scaled and interrelated outputs that are related to one or more positions and are based on inputs which come from subservient arguments or challenges, each of which may have been assigned quantitative weights. The inputs are combined as described above according to their dependency hierarchy and according to the wiring that allow different positions and arguments to interact in a simple manner which reflects human decision-making. This basic framework is applicable to a wide range of real world applications.

This framework of providing a web or network of interrelated outputs based on inputs can be used for direct control in a number of application areas such as: aircraft and rail systems, automotive systems, financial systems like insurance underwriting, bank loan administration and brokerage systems, industrial and home automation systems, military and homeland security systems, medical diagnostic and treatment systems and the like where the output values are translated into proportional electrical signals and the inputs are obtained from electrical signals from sensors or other input devices and may or may not be entered by a human operator. The high performance of the electrical circuit makes it effective in time critical embedded applications. In these types of applications, the present invention provides an intuitive programming mechanism where the programming is in terms if weighted importance of information and linkages between one position or action and another that compete in a hierarchical interaction. In these applications systems may configured to be responsible for evaluating changes in inputs so they can automatically react to changes in environmental factors, changes in its available resources or manual inputs from operators.

This framework of providing a web or network of interrelated outputs based on inputs can also be used for analysis of data and the like where the output values are translated into diagnostic recommendations or adaptive behavior. This diagnostic information can be used identify faulty or degrading segments of a complete system or to cause systems to adapt and reconfigure themselves without direct human intervention. By packaging the expertise of the best maintenance personnel or the best operators in the current invention by defining inputs as arguments and outputs as actions and wiring the system features through linkages, the most effective functionality can be integrated into these systems.

This framework of providing a web or network of interrelated outputs based on inputs can also be used for information synthesis in a number of application areas such as computer based gaming, economic simulations, and strategic planning and the like where output values are translated into proportional values and the inputs are obtained from real or synthetic databases or other input mechanisms as well as human operators. The ability to model different environments with an intuitive programming mechanism where the programming is in terms of importance of information and linkages between one position or action and another, allows users to create interactive models without legacy programming techniques that require specific implantation skills or traditional scripting models.

It is specifically intended that the present invention not be limited to the embodiments and illustrations contained herein. Modified forms of the embodiments shown and described including portions of the embodiments and including combinations of elements from different embodiments are intended to come within the scope of the following claims.

We claim:

1. An electronic circuit for use in computational decision making based on a using a hierarchical tree structure, including:
   a) a plurality of positions having modified values which positions may correspond to outputs,
   b) a plurality of supporting and objecting arguments having values each of which is associated with one of said positions and which may correspond to input data and
   c) a plurality of linkages between said positions and arguments representing functional relationships between said positions and arguments, the hierarchical tree structure operating according to the steps of:
   a) sequentially selecting each of said positions in said tree structure;
   b) calculating a position modified value for each selected position by accumulating and mathematically combining the supporting arguments and objecting arguments associated with the position; and
   c) adjusting a plurality of position and argument related values for all other positions after said modified position value for each selected position is calculated based on the functional relationships defined in said linkage data structure to arrive at adjusted values for said other positions and arguments;
   wherein the positions are implemented by circuitry cells accepting as inputs the supporting and objecting arguments and producing as outputs the modified values, the linkages between positions represented by electrical interconnections between the circuitry cells.

2. The electronic circuit of claim 1 wherein the step of adjusting position and argument values includes the sub-step of: adjusting the position importance of one position in accordance in accordance with the modified value of another.

3. The electronic circuit of claim 1 wherein the step of adjusting position and argument values includes the sub-step of: adjusting an argument value for one position in accordance with the modified value of another position.

4. The electronic circuit of claim 1 wherein the step of adjusting position and argument values includes the sub-step of: adjusting an argument value for one position in accordance with a threshold associated with another position.

5. The electronic circuit of claim 1 wherein the step of adjusting position and argument values includes the sub-step of: adjusting an argument value for one position in accordance with a clipper window associated with another position.

6. The electronic circuit of claim 1 wherein the step of adjusting position and argument values includes the sub-step of: adjusting an argument value for one position in accordance with an argument value associated with another position.

7. The electronic circuit of claim 1 wherein the step of adjusting position and argument values includes the sub-step of: adjusting the position importance of one position in accordance with a clipper window associated with another position.

8. The electronic circuit of claim 1 wherein the step of adjusting position and argument values includes the sub-step of: adjusting the threshold set point for one position in accordance with the modified value of another position.

9. The electronic circuit of claim 1 wherein the step of adjusting position and argument values includes the sub-steps of: adjusting the clipper upper limit set point for one position in accordance with the modified value of another position; and adjusting the clipper lower limit set point for one position in accordance with the modified value of another position.

10. The electronic circuit of claim 1 wherein the step of: iteratively evaluating said position and argument related values in order to settle on a stable set of such values by reselecting, recalculating and readjusting all said position and argument related values until they remain unchanged from one calculation to another.

* * * * *